US010936173B2

(12) United States Patent
Ubillos et al.

(10) Patent No.: US 10,936,173 B2
(45) Date of Patent: Mar. 2, 2021

(54) UNIFIED SLIDER CONTROL FOR MODIFYING MULTIPLE IMAGE PROPERTIES

(71) Applicant: Apple Inc., Cupertino, CA (US)

(72) Inventors: Randy Ubillos, San Francisco, CA (US); Garrett M. Johnson, San Francisco, CA (US); Russell Y. Webb, San Jose, CA (US); Timothy D. Cherna, San Francisco, CA (US); Samuel M. Roberts, Santa Cruz, CA (US); Peter Warner, Paris (FR)

(73) Assignee: Apple Inc., Cupertino, CA (US)

(*) Notice: Subject to any disclaimer, the term of this patent is extended or adjusted under 35 U.S.C. 154(b) by 941 days.

(21) Appl. No.: 14/809,126

(22) Filed: Jul. 24, 2015

(65) Prior Publication Data

US 2015/0331595 A1 Nov. 19, 2015

Related U.S. Application Data

(63) Continuation of application No. 13/629,514, filed on Sep. 27, 2012, now Pat. No. 9,131,192.
(Continued)

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 3/0482* (2013.01); *G06F 3/0485* (2013.01);
(Continued)

(58) Field of Classification Search
CPC ........ G06F 3/01; G06F 3/048; G06F 3/04817; G06F 3/0482; G06F 3/0485; G06F 1/26;
(Continued)

(56) References Cited

U.S. PATENT DOCUMENTS 5,287,448 A   2/1994  Nicol et al.
5,491,782 A   2/1996  King et al.
(Continued)

FOREIGN PATENT DOCUMENTS

CN    1099885       3/1995
CN    1710521 A    12/2005
(Continued)

OTHER PUBLICATIONS

Author: Adobe Press Title: Adobe PhotoshopLightroom 3 Classrom in a Book Date: Jul. 2010 pp. 20-35 of Chapter 6 (Year: 2010).*
(Continued)

*Primary Examiner* — Ajay M Bhatia
*Assistant Examiner* — Phoebe X Pan
(74) *Attorney, Agent, or Firm* — Invoke

(57) ABSTRACT

Some embodiments provide a novel user interface (UI) tool that is a unified slider control, which includes multiple sliders that slide along a region. The region is a straight line in some embodiments, while it is an angular arc in other embodiments. In some embodiments, the unified slider control is used in a media editing application to allow a user to modify several different properties of the image by moving several different sliders along the region. Each slider is associated with a property of the image. A position of the slider in the region corresponds to a value of the property associated with the slider.

19 Claims, 23 Drawing Sheets

Related U.S. Application Data

(60) Provisional application No. 61/607,554, filed on Mar. 6, 2012, provisional application No. 61/607,525, filed on Mar. 6, 2012.

(51) Int. Cl.
   *G06F 3/0482* (2013.01)
   *G06F 3/0485* (2013.01)
   *H04N 1/60* (2006.01)

(52) U.S. Cl.
   CPC ...... *G06F 3/04817* (2013.01); *G06F 3/04842* (2013.01); *G06F 3/04847* (2013.01); *G06F 3/04855* (2013.01); *H04N 1/6027* (2013.01)

(58) Field of Classification Search
   CPC ...... G06F 1/32; G06F 1/3212; G06F 3/04847; G06F 3/0481; G06F 3/04845; G06F 3/04855; G06F 3/04842; H04N 1/00; H04N 1/46; H04N 1/56; H04N 1/6027; G10K 11/00; G10K 11/16; G10K 11/175
   See application file for complete search history.

(56) References Cited

U.S. PATENT DOCUMENTS

| | | |
|---|---|---|
| 5,517,335 A | 5/1996 | Shu |
| 5,615,347 A * | 3/1997 | Davis .................. G06F 3/04847 715/833 |
| 5,774,112 A | 6/1998 | Kasson |
| 5,808,610 A | 9/1998 | Benson et al. |
| 5,908,997 A * | 6/1999 | Arnold .................. G09B 15/04 84/478 |
| 5,915,250 A | 6/1999 | Jain et al. |
| 5,977,972 A | 11/1999 | Bates et al. |
| 5,995,101 A | 11/1999 | Clark et al. |
| 5,999,190 A | 12/1999 | Sheasby et al. |
| 6,035,323 A | 3/2000 | Narayen et al. |
| 6,058,428 A | 5/2000 | Wang et al. |
| 6,115,717 A * | 9/2000 | Mehrotra ............. G06K 9/3233 |
| 6,118,385 A * | 9/2000 | Leard ..................... G01D 7/04 340/441 |
| 6,201,539 B1 | 3/2001 | Miller et al. |
| 6,238,217 B1 | 5/2001 | Mirando et al. |
| 6,262,817 B1 | 7/2001 | Sato et al. |
| 6,281,872 B1 | 8/2001 | Cariffe |
| 6,348,936 B1 | 2/2002 | Berteig |
| 6,351,557 B1 | 2/2002 | Gonsalves |
| 6,373,979 B1 | 4/2002 | Wang |
| 6,400,375 B1 | 6/2002 | Okudaira |
| 6,438,264 B1 | 8/2002 | Gallagher et al. |
| 6,463,432 B1 | 10/2002 | Murakawa |
| 6,542,171 B1 | 4/2003 | Satou et al. |
| 6,567,983 B1 | 5/2003 | Shiimori |
| 6,636,648 B2 | 10/2003 | Loui et al. |
| 6,680,749 B1 | 1/2004 | Anderson et al. |
| 6,686,953 B1 * | 2/2004 | Holmes ................. H04N 1/6033 348/179 |
| 6,758,403 B1 | 7/2004 | Keys et al. |
| 6,778,186 B2 | 8/2004 | Mehigan |
| 6,842,541 B2 | 1/2005 | Curry |
| 6,850,259 B1 * | 2/2005 | Rzepkowski ....... G06F 3/04847 345/689 |
| 6,883,143 B2 | 4/2005 | Driskell |
| 6,922,816 B1 * | 7/2005 | Amin .................. G06F 3/04847 715/732 |
| 6,944,335 B2 | 9/2005 | Pettigrew et al. |
| 7,012,621 B2 | 3/2006 | Crosby et al. |
| 7,034,881 B1 | 4/2006 | Hyodo et al. |
| 7,079,707 B2 | 7/2006 | Baron |
| 7,085,604 B2 | 8/2006 | Turney et al. |
| 7,092,122 B2 | 8/2006 | Iwaki |
| 7,095,434 B1 | 8/2006 | Ikeda |
| 7,148,990 B2 | 12/2006 | Atkins et al. |
| 7,184,056 B2 | 2/2007 | Brody et al. |
| 7,188,310 B2 | 3/2007 | Schwartzkopf |
| 7,215,813 B2 | 5/2007 | Graves et al. |
| 7,227,990 B2 | 6/2007 | Hirao |
| 7,242,409 B2 | 7/2007 | Cain |
| 7,292,370 B2 | 11/2007 | Iwaki |
| 7,302,650 B1 | 11/2007 | Allyn et al. |
| 7,304,753 B1 | 12/2007 | Richter et al. |
| 7,366,307 B2 | 4/2008 | Yanz et al. |
| 7,382,915 B2 | 6/2008 | Bala et al. |
| 7,408,673 B1 * | 8/2008 | Chinn ..................... G01J 3/02 345/593 |
| 7,467,222 B2 | 12/2008 | Kacker |
| 7,479,949 B2 | 1/2009 | Jobs et al. |
| 7,489,305 B2 | 2/2009 | Salisbury et al. |
| 7,502,033 B1 | 3/2009 | Axelrod |
| 7,546,532 B1 | 6/2009 | Nichols et al. |
| 7,558,835 B1 | 7/2009 | Shafer |
| 7,559,034 B1 | 7/2009 | Paperny et al. |
| 7,561,157 B2 | 7/2009 | Fagans et al. |
| 7,562,310 B2 | 7/2009 | Champion et al. |
| 7,576,752 B1 | 8/2009 | Benson et al. |
| 7,598,964 B2 | 10/2009 | Olson |
| 7,602,991 B2 | 10/2009 | Kokemohr |
| 7,623,722 B2 | 11/2009 | Prentice et al. |
| 7,636,108 B2 | 12/2009 | Suzuki et al. |
| 7,636,485 B2 | 12/2009 | Simon et al. |
| 7,656,847 B2 | 2/2010 | Mela et al. |
| 7,660,510 B2 | 2/2010 | Kawahara et al. |
| 7,675,648 B2 | 3/2010 | Ernst et al. |
| 7,689,933 B1 | 3/2010 | Parsons |
| 7,693,679 B1 * | 4/2010 | Warnke .................. G01J 5/02 116/207 |
| 7,702,149 B2 | 4/2010 | Ohkubo et al. |
| 7,702,728 B2 | 4/2010 | Zaner et al. |
| 7,705,860 B2 | 4/2010 | Sloo et al. |
| 7,706,606 B1 | 4/2010 | Ruzon et al. |
| 7,750,947 B2 | 7/2010 | Ahn |
| 7,765,491 B1 * | 7/2010 | Cotterill ............... G06F 3/0485 345/156 |
| 7,768,535 B2 | 8/2010 | Reid et al. |
| 7,770,148 B2 | 8/2010 | Stallo et al. |
| 7,783,983 B1 | 8/2010 | Mayers et al. |
| 7,849,116 B2 | 12/2010 | Jacobs et al. |
| 7,853,094 B2 | 12/2010 | Pan et al. |
| 7,864,347 B2 | 1/2011 | Moran et al. |
| 7,870,412 B2 | 1/2011 | Maes |
| 7,873,710 B2 | 1/2011 | Kiley et al. |
| 7,898,529 B2 | 3/2011 | Fitzmaurice et al. |
| 7,903,904 B1 | 3/2011 | Loeb et al. |
| 7,907,152 B2 | 3/2011 | Sloo et al. |
| 7,907,776 B2 | 3/2011 | Ubillos |
| 7,920,739 B2 | 4/2011 | Chien et al. |
| 7,921,370 B1 | 4/2011 | Legault |
| 7,932,909 B2 * | 4/2011 | Niles .................... G06F 3/04815 345/419 |
| 7,954,067 B2 | 5/2011 | Breglio |
| 7,974,486 B2 | 7/2011 | Seely |
| 7,978,938 B1 | 7/2011 | Wilensky |
| 8,001,470 B1 | 8/2011 | Chen et al. |
| 8,009,177 B2 * | 8/2011 | Kawano ................ H04N 1/6011 345/156 |
| 8,023,164 B2 | 9/2011 | Ogawa |
| 8,024,658 B1 | 9/2011 | Fagans et al. |
| 8,031,365 B2 | 10/2011 | Oka |
| 8,055,067 B2 | 11/2011 | Petrescu et al. |
| 8,068,121 B2 | 11/2011 | Williamson et al. |
| 8,081,221 B2 | 12/2011 | Chou et al. |
| 8,098,259 B2 | 1/2012 | Kondo et al. |
| 8,098,964 B2 | 1/2012 | Kasperkiewicz et al. |
| 8,103,094 B2 | 1/2012 | Wilensky |
| 8,117,542 B2 | 2/2012 | Radtke et al. |
| 8,130,208 B2 | 3/2012 | Arimoto |
| 8,139,080 B2 | 3/2012 | Relyea et al. |
| 8,144,234 B2 | 3/2012 | Morita |
| 8,146,016 B2 | 3/2012 | Himberger et al. |
| 8,155,465 B2 | 4/2012 | Cho et al. |
| 8,159,506 B2 | 4/2012 | Yano et al. |
| 8,214,766 B1 | 7/2012 | Berger et al. |

(56) References Cited

U.S. PATENT DOCUMENTS

| | | |
|---|---|---|
| 8,259,208 B2 | 9/2012 | Ciurea et al. |
| 8,261,212 B2 | 9/2012 | Wigdor et al. |
| 8,341,542 B2 | 12/2012 | Brody et al. |
| 8,355,566 B2 | 1/2013 | Ng |
| 8,380,005 B1 | 2/2013 | Jonsson |
| 8,441,499 B2 | 5/2013 | Heynen et al. |
| 8,464,173 B2 | 6/2013 | Victor |
| 8,468,465 B2 | 6/2013 | Warner et al. |
| 8,526,719 B2 | 9/2013 | Lee et al. |
| 8,533,598 B2 | 9/2013 | Meaney et al. |
| 8,564,618 B2 | 10/2013 | Ryu et al. |
| 8,582,834 B2 | 11/2013 | Tong et al. |
| 8,594,419 B2 | 11/2013 | Majewicz et al. |
| 8,627,232 B2 | 1/2014 | Stiso et al. |
| 8,631,326 B2 | 1/2014 | Meaney et al. |
| 8,660,345 B1 | 2/2014 | Fang et al. |
| 8,661,418 B2 | 2/2014 | Saji et al. |
| 8,666,223 B2 | 3/2014 | Momosaki |
| 8,686,962 B2 | 4/2014 | Christie |
| 8,713,479 B2 | 4/2014 | Mikawa et al. |
| 8,731,322 B2 | 5/2014 | Lee |
| 8,732,187 B1 | 5/2014 | Jing et al. |
| 8,743,139 B2 | 6/2014 | Pettigrew et al. |
| 8,744,231 B2 | 6/2014 | Lee et al. |
| 8,767,970 B2 | 7/2014 | Eppolito |
| 8,793,619 B2 * | 7/2014 | Roe ............... G06F 3/04815 715/851 |
| 8,806,331 B2 | 8/2014 | Grosz et al. |
| 8,810,535 B2 | 8/2014 | Moosavi |
| 8,970,629 B2 | 3/2015 | Kim et al. |
| 8,971,617 B2 | 3/2015 | Ubillos et al. |
| 9,009,612 B2 | 4/2015 | Fleizach et al. |
| 9,041,727 B2 | 5/2015 | Ubillos et al. |
| 9,131,192 B2 | 9/2015 | Ubillos et al. |
| 9,523,772 B2 | 12/2016 | Rogan et al. |
| 2001/0028738 A1 | 10/2001 | Pettigrew et al. |
| 2001/0036310 A1 | 11/2001 | Pettigrew et al. |
| 2002/0033850 A1 | 3/2002 | Bates et al. |
| 2002/0040375 A1 | 4/2002 | Simon et al. |
| 2002/0097914 A1 | 7/2002 | Yaung |
| 2002/0109728 A1 | 8/2002 | Tiongson et al. |
| 2003/0012437 A1 * | 1/2003 | Zaklika ............... G06T 5/40 382/169 |
| 2003/0021488 A1 | 1/2003 | Shaw et al. |
| 2003/0025835 A1 | 2/2003 | Segman |
| 2003/0038832 A1 | 2/2003 | Sobol |
| 2003/0103057 A1 * | 6/2003 | Graves ............... G06T 5/009 345/589 |
| 2003/0103234 A1 | 6/2003 | Takabayashi et al. |
| 2003/0125776 A1 * | 7/2003 | Turney ............... A61N 1/37247 607/27 |
| 2003/0151611 A1 | 8/2003 | Turpin et al. |
| 2004/0165012 A1 | 8/2004 | Nelson et al. |
| 2004/0192365 A1 | 9/2004 | Dalton et al. |
| 2004/0201752 A1 | 10/2004 | Parulski et al. |
| 2004/0205286 A1 | 10/2004 | Bryant et al. |
| 2004/0208475 A1 | 10/2004 | Ohmura et al. |
| 2004/0212605 A1 * | 10/2004 | Fitzmaurice ........ G06F 3/0481 345/184 |
| 2004/0223004 A1 | 11/2004 | Lincke et al. |
| 2004/0225961 A1 | 11/2004 | Ohashi et al. |
| 2005/0010258 A1 * | 1/2005 | Peterson ............ A61N 1/37247 607/32 |
| 2005/0034083 A1 | 2/2005 | Jaeger |
| 2005/0047681 A1 | 3/2005 | Hori et al. |
| 2005/0094014 A1 * | 5/2005 | Haas ............... H04N 1/00458 348/333.01 |
| 2005/0204305 A1 | 9/2005 | Keely, Jr. et al. |
| 2005/0212824 A1 | 9/2005 | Marcinkiewicz et al. |
| 2005/0262451 A1 * | 11/2005 | Remignanti ........ G06F 3/04847 715/833 |
| 2005/0268234 A1 | 12/2005 | Rossi, Jr. et al. |
| 2005/0276573 A1 | 12/2005 | Abbate |
| 2005/0281482 A1 | 12/2005 | Nishiyama |
| 2005/0289478 A1 | 12/2005 | Landman et al. |
| 2006/0004914 A1 | 1/2006 | Kelly et al. |
| 2006/0022953 A1 | 2/2006 | Franttila |
| 2006/0028483 A1 | 2/2006 | Kondo et al. |
| 2006/0036959 A1 | 2/2006 | Heatherly et al. |
| 2006/0053374 A1 | 3/2006 | Wilensky |
| 2006/0095865 A1 | 5/2006 | Rostom |
| 2006/0109517 A1 | 5/2006 | Catalan |
| 2006/0119619 A1 | 6/2006 | Fagans et al. |
| 2006/0150091 A1 | 7/2006 | Suzuki et al. |
| 2006/0203004 A1 | 9/2006 | Hwang et al. |
| 2006/0204034 A1 | 9/2006 | Steinberg et al. |
| 2006/0284895 A1 | 12/2006 | Marcu et al. |
| 2006/0291666 A1 * | 12/2006 | Ball ............... G06F 3/165 381/58 |
| 2007/0021152 A1 | 1/2007 | Jung |
| 2007/0055940 A1 | 3/2007 | Moore et al. |
| 2007/0061723 A1 | 3/2007 | Ohga et al. |
| 2007/0064011 A1 | 3/2007 | Barnes et al. |
| 2007/0065006 A1 | 3/2007 | Wilensky |
| 2007/0065011 A1 | 3/2007 | Schiehlen |
| 2007/0094597 A1 | 4/2007 | Rostom |
| 2007/0110422 A1 | 5/2007 | Minato et al. |
| 2007/0113180 A1 | 5/2007 | Danninger |
| 2007/0113183 A1 * | 5/2007 | Brinkmann ........ G06F 3/04847 715/723 |
| 2007/0171443 A1 | 7/2007 | Pan |
| 2007/0174790 A1 | 7/2007 | Jing et al. |
| 2007/0189627 A1 | 8/2007 | Cohen et al. |
| 2007/0195343 A1 | 8/2007 | Yoneda |
| 2007/0216773 A1 | 9/2007 | Kojima et al. |
| 2007/0229465 A1 | 10/2007 | Sakai et al. |
| 2007/0236475 A1 | 10/2007 | Wherry |
| 2007/0291140 A1 | 12/2007 | Baba et al. |
| 2007/0294634 A1 | 12/2007 | Kokemohr |
| 2008/0034289 A1 | 2/2008 | Doepke et al. |
| 2008/0046218 A1 | 2/2008 | Dontcheva et al. |
| 2008/0049256 A1 | 2/2008 | Ohkubo et al. |
| 2008/0056564 A1 | 3/2008 | Lindbloom et al. |
| 2008/0056598 A1 | 3/2008 | Murakata |
| 2008/0062443 A1 | 3/2008 | Olson |
| 2008/0091723 A1 | 4/2008 | Zuckerberg et al. |
| 2008/0109722 A1 | 5/2008 | Gengler et al. |
| 2008/0117333 A1 | 5/2008 | Walsh |
| 2008/0119237 A1 | 5/2008 | Kim |
| 2008/0120565 A1 * | 5/2008 | Stiso ............... G06F 3/04847 715/771 |
| 2008/0152297 A1 | 6/2008 | Ubillos |
| 2008/0155413 A1 | 6/2008 | Ubillos |
| 2008/0155421 A1 | 6/2008 | Ubillos et al. |
| 2008/0163053 A1 | 7/2008 | Hwang et al. |
| 2008/0194326 A1 | 8/2008 | Brunet De Courssou et al. |
| 2008/0225058 A1 | 9/2008 | Hertzfeld et al. |
| 2008/0229232 A1 | 9/2008 | Schulz et al. |
| 2008/0250314 A1 | 10/2008 | Larsen |
| 2008/0256489 A1 | 10/2008 | Maurer et al. |
| 2008/0301237 A1 | 12/2008 | Parsons et al. |
| 2008/0309644 A1 | 12/2008 | Arimoto |
| 2009/0019397 A1 | 1/2009 | Buffet et al. |
| 2009/0023513 A1 | 1/2009 | Shibata et al. |
| 2009/0049410 A1 | 2/2009 | Fagans et al. |
| 2009/0060378 A1 * | 3/2009 | Curtis ............... G06T 11/60 382/274 |
| 2009/0067753 A1 | 3/2009 | Hanechak |
| 2009/0070675 A1 | 3/2009 | Li |
| 2009/0080801 A1 | 3/2009 | Hatfield et al. |
| 2009/0094557 A1 | 4/2009 | Howard |
| 2009/0138625 A1 | 5/2009 | Duarte |
| 2009/0146961 A1 * | 6/2009 | Cheung ............... G06F 3/0219 345/172 |
| 2009/0147011 A1 | 6/2009 | Buck et al. |
| 2009/0154795 A1 | 6/2009 | Tan et al. |
| 2009/0169132 A1 | 7/2009 | Sagawa |
| 2009/0172532 A1 | 7/2009 | Chaudhri |
| 2009/0199126 A1 | 8/2009 | Kumar et al. |
| 2009/0201310 A1 | 8/2009 | Weiss |
| 2009/0202170 A1 * | 8/2009 | Weiss ............... G06K 9/4652 382/275 |
| 2009/0202173 A1 | 8/2009 | Weiss et al. |

(56) References Cited

U.S. PATENT DOCUMENTS

| | | | |
|---|---|---|---|
| 2009/0204538 A1* | 8/2009 | Ley | G06Q 20/10 705/40 |
| 2009/0204894 A1 | 8/2009 | Bhatt et al. | |
| 2009/0204913 A1 | 8/2009 | Kawano et al. | |
| 2009/0220155 A1 | 9/2009 | Yamamoto et al. | |
| 2009/0244646 A1 | 10/2009 | Kondo et al. | |
| 2009/0249208 A1 | 10/2009 | Song et al. | |
| 2009/0256947 A1 | 10/2009 | Ciurea et al. | |
| 2009/0276731 A1* | 11/2009 | Yamakawa | G06F 3/04847 715/833 |
| 2009/0285506 A1 | 11/2009 | Benson et al. | |
| 2009/0289913 A1 | 11/2009 | Chang et al. | |
| 2009/0292762 A1 | 11/2009 | Mettala et al. | |
| 2009/0303199 A1 | 12/2009 | Cho et al. | |
| 2009/0319897 A1 | 12/2009 | Kotler et al. | |
| 2009/0324077 A1 | 12/2009 | Wu et al. | |
| 2010/0014721 A1 | 1/2010 | Steinberg et al. | |
| 2010/0020221 A1 | 1/2010 | Tupman et al. | |
| 2010/0026831 A1 | 2/2010 | Ciuc et al. | |
| 2010/0054549 A1 | 3/2010 | Steinberg et al. | |
| 2010/0056221 A1 | 3/2010 | Park | |
| 2010/0063961 A1 | 3/2010 | Guiheneuf et al. | |
| 2010/0063992 A1 | 3/2010 | Ma et al. | |
| 2010/0077330 A1 | 3/2010 | Kaplan et al. | |
| 2010/0091330 A1 | 4/2010 | Marchesotti et al. | |
| 2010/0131294 A1 | 5/2010 | Venon et al. | |
| 2010/0134425 A1 | 6/2010 | Storrusten | |
| 2010/0176963 A1 | 7/2010 | Vymenets | |
| 2010/0185976 A1* | 7/2010 | Sadanandan | G06F 3/04847 715/786 |
| 2010/0185983 A1* | 7/2010 | Szoczei | G06F 3/04847 715/833 |
| 2010/0191831 A1 | 7/2010 | Moon et al. | |
| 2010/0192102 A1 | 7/2010 | Chmielewski et al. | |
| 2010/0230493 A1 | 9/2010 | Akiyama | |
| 2010/0251177 A1 | 9/2010 | Geppert et al. | |
| 2010/0255914 A1 | 10/2010 | Poh et al. | |
| 2010/0257477 A1 | 10/2010 | Nielsen et al. | |
| 2010/0281367 A1* | 11/2010 | Langmacher | G06F 3/04847 715/716 |
| 2010/0281374 A1 | 11/2010 | Schulz et al. | |
| 2010/0281382 A1 | 11/2010 | Meaney et al. | |
| 2010/0281383 A1 | 11/2010 | Meaney et al. | |
| 2010/0299598 A1 | 11/2010 | Shin et al. | |
| 2010/0306702 A1 | 12/2010 | Warner | |
| 2010/0310136 A1 | 12/2010 | Tsuda | |
| 2010/0331052 A1 | 12/2010 | Watanabe | |
| 2011/0012848 A1 | 1/2011 | Li et al. | |
| 2011/0025711 A1 | 2/2011 | Doi | |
| 2011/0025924 A1* | 2/2011 | Price | H04N 21/4438 348/734 |
| 2011/0026898 A1 | 2/2011 | Lussier et al. | |
| 2011/0052051 A1 | 3/2011 | Takeshita | |
| 2011/0087984 A1 | 4/2011 | Jitkoff et al. | |
| 2011/0093815 A1 | 4/2011 | Gobeil | |
| 2011/0102457 A1 | 5/2011 | Bhatt et al. | |
| 2011/0103684 A1 | 5/2011 | Bhatt et al. | |
| 2011/0103685 A1* | 5/2011 | Bhatt | H04N 1/4074 382/167 |
| 2011/0107369 A1 | 5/2011 | O'Brien et al. | |
| 2011/0113086 A1 | 5/2011 | Long et al. | |
| 2011/0125765 A1 | 5/2011 | Tuli | |
| 2011/0126096 A1 | 5/2011 | Ohashi et al. | |
| 2011/0131543 A1 | 6/2011 | Majumder et al. | |
| 2011/0154192 A1 | 6/2011 | Yang et al. | |
| 2011/0163971 A1 | 7/2011 | Wagner et al. | |
| 2011/0181618 A1 | 7/2011 | Diverdi et al. | |
| 2011/0182511 A1 | 7/2011 | Chien et al. | |
| 2011/0184980 A1 | 7/2011 | Jeong et al. | |
| 2011/0185297 A1 | 7/2011 | Reid et al. | |
| 2011/0196933 A1 | 8/2011 | Jackson et al. | |
| 2011/0197160 A1 | 8/2011 | Kim et al. | |
| 2011/0202875 A1 | 8/2011 | Kimura | |
| 2011/0202877 A1 | 8/2011 | Lassonde et al. | |
| 2011/0213670 A1 | 9/2011 | Strutton et al. | |
| 2011/0219329 A1 | 9/2011 | Breglio | |
| 2011/0231544 A1 | 9/2011 | Javenpaa et al. | |
| 2011/0235920 A1 | 9/2011 | Iwamoto et al. | |
| 2011/0249074 A1 | 10/2011 | Cranfill et al. | |
| 2011/0252344 A1 | 10/2011 | van Os | |
| 2011/0265033 A1 | 10/2011 | Lindsay et al. | |
| 2011/0286647 A1 | 11/2011 | Cao et al. | |
| 2011/0292237 A1 | 12/2011 | Imai | |
| 2012/0009896 A1 | 1/2012 | Bandyopadhyay | |
| 2012/0017154 A1 | 1/2012 | Martin | |
| 2012/0019550 A1* | 1/2012 | Pettigrew | G06T 11/60 345/594 |
| 2012/0019687 A1 | 1/2012 | Parulski | |
| 2012/0020553 A1 | 1/2012 | Middler | |
| 2012/0032982 A1 | 2/2012 | Williamson et al. | |
| 2012/0036480 A1 | 2/2012 | Warner et al. | |
| 2012/0047459 A1 | 2/2012 | Ejima et al. | |
| 2012/0050306 A1 | 3/2012 | Kurzweil et al. | |
| 2012/0050789 A1 | 3/2012 | Bachman et al. | |
| 2012/0051658 A1 | 3/2012 | Warner | |
| 2012/0069053 A1 | 3/2012 | Kojo | |
| 2012/0072871 A1 | 3/2012 | Seo et al. | |
| 2012/0131519 A1 | 5/2012 | Jitkoff | |
| 2012/0136853 A1 | 5/2012 | Kennedy et al. | |
| 2012/0159635 A1 | 6/2012 | Sharp | |
| 2012/0162093 A1 | 6/2012 | Buxton et al. | |
| 2012/0163710 A1 | 6/2012 | Skaff et al. | |
| 2012/0173317 A1 | 7/2012 | Kelley | |
| 2012/0190388 A1 | 7/2012 | Castleman et al. | |
| 2012/0206344 A1 | 8/2012 | Hill et al. | |
| 2012/0209902 A1 | 8/2012 | Outerbridge | |
| 2012/0210223 A1 | 8/2012 | Eppolito | |
| 2012/0226651 A1 | 9/2012 | Chidlovskii | |
| 2012/0306788 A1 | 12/2012 | Chen et al. | |
| 2012/0311448 A1 | 12/2012 | Anarino | |
| 2012/0315954 A1 | 12/2012 | Ahn et al. | |
| 2012/0324042 A1 | 12/2012 | Palihapitaya | |
| 2013/0019172 A1 | 1/2013 | Pearson | |
| 2013/0019206 A1 | 1/2013 | Gil | |
| 2013/0019208 A1 | 1/2013 | Hockman | |
| 2013/0044050 A1 | 2/2013 | Ylivainio | |
| 2013/0104079 A1 | 4/2013 | Liu | |
| 2013/0106899 A1 | 5/2013 | Bhatt | |
| 2013/0108175 A1 | 5/2013 | Ptucha | |
| 2013/0121569 A1 | 5/2013 | Yadav | |
| 2013/0125068 A1 | 5/2013 | Harris et al. | |
| 2013/0132859 A1 | 5/2013 | Chou et al. | |
| 2013/0176212 A1 | 7/2013 | Nan et al. | |
| 2013/0205208 A1* | 8/2013 | Kim | G11B 27/34 715/716 |
| 2013/0219010 A1 | 8/2013 | Mahendran et al. | |
| 2013/0227448 A1 | 8/2013 | Heynen et al. | |
| 2013/0235067 A1 | 9/2013 | Cherna et al. | |
| 2013/0235068 A1 | 9/2013 | Ubillos et al. | |
| 2013/0235069 A1 | 9/2013 | Ubillos et al. | |
| 2013/0235070 A1 | 9/2013 | Webb | |
| 2013/0235071 A1 | 9/2013 | Ubillos et al. | |
| 2013/0235074 A1 | 9/2013 | Cherna et al. | |
| 2013/0235076 A1 | 9/2013 | Cherna et al. | |
| 2013/0236091 A1 | 9/2013 | Ubillos et al. | |
| 2013/0236093 A1 | 9/2013 | Gatt et al. | |
| 2013/0238724 A1 | 9/2013 | Cunningham | |
| 2013/0238747 A1 | 9/2013 | Albouze et al. | |
| 2013/0238990 A1 | 9/2013 | Ubillos et al. | |
| 2013/0239031 A1 | 9/2013 | Ubillos et al. | |
| 2013/0239051 A1 | 9/2013 | Albouze et al. | |
| 2013/0239055 A1 | 9/2013 | Ubillos | |
| 2013/0239056 A1 | 9/2013 | Ubillos et al. | |
| 2013/0239057 A1 | 9/2013 | Ubillos et al. | |
| 2013/0239062 A1 | 9/2013 | Ubillos et al. | |
| 2013/0239063 A1 | 9/2013 | Ubillos et al. | |
| 2013/0254662 A1 | 9/2013 | Dunko et al. | |
| 2013/0335452 A1 | 12/2013 | Suchomel | |
| 2014/0063047 A1 | 3/2014 | Johnson et al. | |
| 2014/0137042 A1 | 5/2014 | Du et al. | |
| 2014/0267362 A1 | 9/2014 | Kocienda et al. | |
| 2015/0109324 A1 | 4/2015 | Ubillos et al. | |
| 2015/0161217 A1 | 6/2015 | Zhang et al. | |

(56) References Cited

U.S. PATENT DOCUMENTS

| | | | |
|---|---|---|---|
| 2015/0205502 A1 | 7/2015 | Ubillos et al. | |
| 2015/0331595 A1 | 11/2015 | Ubillos et al. | |
| 2016/0063952 A1 | 3/2016 | Webb | |
| 2016/0173726 A1 | 6/2016 | Ubillos et al. | |
| 2016/0188131 A1 | 6/2016 | Ubillos et al. | |
| 2016/0342325 A1 | 11/2016 | Blumenberg | |
| 2016/0378316 A1* | 12/2016 | Jakubiec | G06F 3/04847 715/771 |
| 2017/0177556 A1* | 6/2017 | Fay | G06F 40/169 |
| 2018/0096036 A1* | 4/2018 | Haldenby | G06Q 10/105 |

FOREIGN PATENT DOCUMENTS

| | | |
|---|---|---|
| CN | 101004746 A | 7/2007 |
| CN | 101216747 A | 7/2008 |
| CN | 101330556 A | 12/2008 |
| CN | 101551915 A | 10/2009 |
| CN | 101617308 A | 12/2009 |
| CN | 102054285 A | 5/2011 |
| CN | 102073404 A | 5/2011 |
| CN | 102082864 A | 6/2011 |
| EP | 0632363 | 1/1995 |
| EP | 0693738 A2 | 1/1996 |
| EP | 0989739 A2 | 3/2000 |
| EP | 1087614 A2 | 3/2001 |
| EP | 1324227 A2 | 7/2003 |
| EP | 1326425 A2 | 7/2003 |
| EP | 1398982 A1 | 3/2004 |
| EP | 1521449 A2 | 4/2005 |
| EP | 1573501 A2 | 9/2005 |
| EP | 2325741 A2 | 5/2011 |
| EP | 2685362 A1 | 1/2014 |
| EP | 2685363 A1 | 1/2014 |
| GB | 2409789 A | 7/2005 |
| JP | 09-081718 A | 3/1997 |
| JP | 2002-010196 A | 1/2002 |
| JP | 2003-242278 A | 8/2003 |
| JP | 2004-303197 A | 10/2004 |
| JP | 2004-334337 A | 11/2004 |
| JP | 2007-080074 A | 3/2007 |
| JP | 2007-310833 A | 11/2007 |
| JP | 2007-328537 A | 12/2007 |
| JP | 2007-334651 A | 12/2007 |
| JP | 2008-011480 A | 1/2008 |
| JP | 2008-159077 A | 7/2008 |
| JP | 2008-210304 A | 9/2008 |
| JP | 2009-060566 | 3/2009 |
| JP | 2009-187215 A | 8/2009 |
| JP | 2009-284084 A | 12/2009 |
| JP | 2010-015198 A | 1/2010 |
| JP | 2010-187093 A | 8/2010 |
| JP | 2011-507099 A | 3/2011 |
| JP | 2011-082965 A | 4/2011 |
| JP | 2013-519154 A | 5/2013 |
| KR | 10-2001-0089462 A | 10/2001 |
| KR | 10-2003-0005908 A | 1/2003 |
| KR | 10-2009-0039960 A | 4/2009 |
| KR | 10-2009-0116435 A | 11/2009 |
| KR | 10-2011-0042635 A | 4/2011 |
| KR | 10-2011-0076849 A | 7/2011 |
| KR | 10-2011-0093528 A | 8/2011 |
| KR | 10-2012-0010525 A | 2/2012 |
| NO | 2010/138360 A1 | 12/2010 |
| WO | 2004/046906 A2 | 6/2004 |
| WO | 2007/031981 A2 | 3/2007 |
| WO | WO 2007/145654 | 12/2007 |
| WO | 2008/102223 A1 | 8/2008 |
| WO | 2009/031135 A2 | 3/2009 |
| WO | 2009/102514 A1 | 8/2009 |
| WO | 2010/038653 A1 | 4/2010 |
| WO | 2010/047843 A1 | 4/2010 |
| WO | 2010/151255 A1 | 12/2010 |
| WO | PCT/US2012/072280 | 6/2013 |
| WO | 2013/133893 A1 | 9/2013 |
| WO | 2013/133895 A1 | 9/2013 |
| WO | 2013/133901 A2 | 9/2013 |
| WO | 2013/133905 A1 | 9/2013 |
| WO | WO 2013/133894 | 9/2013 |

OTHER PUBLICATIONS

Yeh, Tom et al. "Creating Contextual Help for GUIs Using SCreenshots," Oct. 19, 2011, ACM UIST '11, 145-154.

Using Adobe Bridge, 2011.

Shneiderman, Ben, et al., "Visualizing Digital Library Search Results with Categorical and Hierarchical Axes," Proceeding of the Fifth ACM Conference on Digital Libraries, Month Unknown, 2000, 10 pages, ACM.

Photoschop CS5 Bible, Wiley, 2010, passim.

Perez, Sarah, "Metadata and the Windows Live Photo Gallery", Jan. 22, 2008, 6 pages, Windows Live Photo & Video Blog, USA.

Luniewski, Maciej Adam, "Context-Aware Photo Gallery for Mobile Phone," Month Unknown, 2009, 131 pAGES, Department of Informatics and Mathematical Modeling (IMM) at the Technical University of Denmark (DTU), Denmark.

Gomi, Al, et al., "CAT: Hierarchical Image Browser Using a Rectangle Packing Technique," 12th International Conference Information Visualisation, Jul. 9, 2008, pp. 82-87, IEEE.

Galitz, Wilbert, "The Essential Guide to User Interface Design," Wiley, 3rd Edition, passim.

Colorillo Screenshot, URL:www.colorillo.com, last accessed Jul. 17, 2014.

Chi, Pei-Yu, et al., "Raconteur: Integrating Authored and Real-Time Social Media," CHI 2011, May 7-12, 2011, 4 pages, ACM, Vancouver, BC, Canada.

Brandl, Peter, et al., "Occlusion-Aware Menu Design for Digital Tabletops," CHI 2009, Apr. 4-9, 2009, pp. 3223-3228, ACM, Boston, Massachusetts, USA.

Bederson, Benjamin B., "PhotoMesa: A Zoomable Image Browser Using Quantum Treemaps and Bubblemaps," UIST 2001, Month Unknown, 2001, pp. 71-80, ACE, Orlando, Florida, USA.

Author Unknown, "iPhoto '11 has developed to be a communication tool via pictures," Dec. 1, 2010, pp. 22-24, Mac Fan, vol. 18, No. 12, Mainichi Communications Inc., Japan.

Author Unknown, "Flickr: Help: Tags XP-002716137", Jul. 11, 2013, 3 pages, available at http://www.flickr.com/help/tags/.

Author Unknown, "Flickr: Help: Stats XP-002716138," Jul. 11, 2013, 4 pages, available at http://www.flickr.com/help/stats/.

Author Unknown, "An Upgrade to Facebook Pages, Now, more ways to share your story,"Feb. 10, 2011, 8 pages, available at http://f.cl.ly/items/1 D0F1 F1 m1 R0S3E460n0R/Pages_Transition Guide Feb2011 .pdf.

Yawnick, Marty, "Review: LevelCam—Good Auto Crop and Straighten," Apr. 29, 2010, 6 pages, iPhoneography, LifeinLofi.com.

Vernier, Frederic, et al., "Visualization Techniques for Circular Tabletop Interfaces," Proceedings of the Working Conference on Advanced Visual Interfaces, Mar. 2002, 10 pages, Mitsubishi Electric Research Laboratories, Inc., Cambridge, Massachusetts.

Surdam, Sherry, "Using Picasa 3 Part 2," Sep. 20, 2009, 86 pages.

Portions of prosecution history of U.S. Appl. No. 13/629,523.

OutsourceAge, "Enhanced HTML5 Pack for Dreamweaver CS5 _ PSD to wordpress conversion", Jul. 10, 2011.

McGuffin, Michael J., et al., "Using Deformations for Browsing Volumetric Data," IEEE Visualization, Oct. 19-24, 2003, pp. 401-408, IEEE.

Marty Yawnick, Review_ LevelCam—Good Auto Crop and Straighten _ Life In LoFi_ iPhoneography—20100429, Iphoneography.

Ling, Haibin, "Techniques in Image Retrieval: Deformation Insensitivity and Automatic Thumbnail Cropping," Dissertation, Month Unknown 2006, 201 pages, University of Maryland—College Park, College Park, USA.

Leopard, "How to straighten photos in iPhoto MacTips—Top Tips and Tricks for Mac, IOS, Ipad, IOS, Iphone and Everything Apple", 2011.

Leithinger, Daniel, et al., "Improving Menu Interaction for Cluttered Tabletop Setups with User-Drawn Path Menus," Second

(56) References Cited

OTHER PUBLICATIONS

Annual IEEE International Workshop on Horizontal Interactive Human-Computer System, Oct. 10, 2007, pp. 121-128, IEEE.
Kurtenbach, Gordon, et al., "The Design of a GUI Paradigm based on Tablets, Two-hands, and Transparency," CHI 1997, Mar. 22-27, 1997, pp. 35-42, ACM, Atlanta, Georgia, USA.
Kim et al, "Camera Canvas: Image Editor for People with Severe Disabilities", Technical Report BUCS-TR-2008-010, Directed Study Project, CAS CS 492, Spring 2008, Department of Computer Science, Boston University, Boston, MA 02215, USA.
Ho, Kevin I-J., et al., "Automatic Image Processing System for Beautifying Human Faces," Color Science and Imaging Technologies—Proceedings of SPIE, Month Unknown, 2002, pp. 23-32, vol. 4922.
Haibin Ling, Techniques for Image Retrieval: Deformation Insensitivity and Automatic Thumbnail Cropping, 2006.
Corel, PaintShop Pro X4 User Guide, Corel, 2011.
Chastain, Sue, "How do I Save My Edited Photos in Lightroom?" About.com Guide, Jun. 3, 2012, 2 pages.
Benedetti, Luca, et al., "Color to Gray Conversions in the Context of Stereo Matching Algorithms," Machine Vision and Applications, Dec. 7, 2010, pp. 1-32.
Ben Long, "Snapseed raises the bar for iPad image editors", MacWorld, Jun. 10, 2011.
Author Unknown, "TouchRetouch", Android Application 1852, Jul. 21, 2011, available at URL: http://octoba.net/archives/20110721-android-1852.html, 5 pages.
Author Unknown, "myPANTONE," Apple iTunes App Store, updated Sep. 26, 2011, 2 pages.
Author Unknown, "How to Straighten Photos in iPhoto," Mac Tip #476, Mar. 2, 2011, 11 pages, MacTips.
Author Unknown, "Enhanced HTML5 Pack for Dreamweaver CS5," Jun. 11, 2010, 4 pages, OutsourceAge, Wayback Machine Internet Archive.
Author Unknown, "Adobe Photoshop Express", Android Application 1420, Feb. 13, 2011, available at http://octoba.net/archives/20110213-android-1420.html, 7 pages.
Author Unknown, "Adobe Photoshop 5.0 Limited Edition, Chapter 4: Making Color and Tonal Adjustments," Adobe Photoshop 5.0 User Guide, Jan. 1, 1998, 11 pages.
Author Unknown , "Screenshots #1-13 of Microsoft Windows NT 4.0," Microsoft Corporations, Copyright 1981-1998. Released Aug. 1996. Screenshots created Oct. 13, 2004, 17 pages.
Agarawala, Anand, et al., "Keepin' It Real: Pushing the Desktop Metaphor with Physics, Piles and the Pen," Proceedings of the SIGCHI Conference on Human Factors in Computing Systems, Apr. 22-27, 2006, pp. 1283-1292, ACM, Montreal, Quebec, Canada.
"Photoshop Blend Modes Explained" Thomas, Robert. Jun. 7, 2011. 22 pages. Accessed via the web on Mar. 7, 2017 at http://web.archive.Org/web/20110607041239/http://photoblogstop.com/photoshop/photoshop-blend-modes-explained.
Author Unknown, "Photographic Editing—Workflow," WaybackMachine, May 9, 2011, 68 pages.
Author Unknown, "GWT DND: Keep Draggable Within an AbsolutePanel," Stackoverflow.com, Aug. 2009, 2 pages, available at http://stackoverflow.com/questions/1304607/gwt-dnd-keep-draggable-within-an-absolutepanel.
Author Unknown, "How to Manage and Work with Digital Images, Using FastStone Image Viewer Version 4.5," FastStone Soft, Jun. 10, 2011, pp. 1-95.
Author Unknown, "Photoshop Touch for Android: Part 2 The Tools," Month Unknown, 2014, 15 pages, available at http://www.gamefromscratch.com/page//Photoshop-Touch-for-Android-Part-2-The-Tools.aspx.
Author Unknown, "Using Adobe Photoshop CS4," Jan. 10, 2010, 707 pages, Adobe Systems Incorporated, San Jose, California, USA.
Dodgson, Neil A., et al., "Contrast Brushes: Interactive Image Enhancement by Direct Manipulation," Computational Aesthetics in Graphics, Visualization, and Imaging, Month Unknown, 2009, 8 pages, The Eurographics Association.
Jong, Wilko De, "Multi Slider," Matlab Central, Apr. 23, 2005 (Updated Jun. 2009), 2 pages, The Mathworks, Inc, available at http://www.mathworks.com/matlabcentral/fileexchange/7514-multi-slider.
Messieh, Nancy, "Snapseed for iPad: Photo editing at the swipe of a finger," Jun. 8, 2011, 10 pages, available at http://thenextweb.com/apps/2011/06/08/snapseed-for-ipad-photo-editing-at-the-swipe-of-a-finger/.
O'Neil, Steve, "Using Adobe Photoshop," Chapter 7—Image Adjustments, Month Unknown, 2006, pp. 1-12.
Yanz, Jerry, et al., "Hearing Instrument Technology: Tech Topic, Toward New Software Goals: Delighting Patients with Interactivity," The Hearing Review, Jan. 2008, pp. 1-9, Allied Media.
Crayola ColorStudio HD for iPad review, Consumer Reports News, https://www.consumerreports.org/cro/news/2011/08/app- review-crayola-colorstudio-hd-for-ipad/index.htm, Aug. 8, 2011, pp. 1-3.
Children's Technology Review, Crayola ColorStudio App and Stylus Review, https://www.youtube.com/watch?v=iq4QLgzjyDw, Jul. 15, 2011, pp. 1-5.
Sencha, Carousel_ auto-resize images when iphone is rotated, Dec. 8, 2011 (Year: 2011).

\* cited by examiner

UNIFIED SLIDER CONTROL FOR MODIFYING MULTIPLE IMAGE PROPERTIES

CLAIM OF BENEFIT TO PRIOR APPLICATIONS

This application is a continuation application of U.S. patent application Ser. No. 13/629,514, filed Sep. 27, 2012, now published as U.S. Patent Publication 2013/0239057. U.S. patent application Ser. No. 13/629,514 claims benefit to U.S. Provisional Patent Application 61/607,554, entitled "Unified Slider Control for Modifying Multiple Image Properties," filed Mar. 6, 2012, and U.S. Provisional Patent Application 61/607,525, entitled "Content Aware User Interface for Image Editing," filed Mar. 6, 2012. U.S. patent application Ser. No. 13/629,514, now published as United States Patent Publication 2013/0239057 and U.S. Provisional Patent Applications 61/607,554 and 61/607,525 are incorporated herein by reference.

BACKGROUND

Digital graphic design and media editing applications (hereafter collectively referred to as image editing applications or media editing applications) provide graphical designers, media artists, and other users with the necessary tools to view and edit an image. Examples of such applications include iPhoto®, Aperture®, iMovie® and Final Cut Pro®, all sold by Apple, Inc. These applications give users the ability to edit images in a variety of manners. For example, some applications provide different range sliders for adjusting different color values of an image or a video.

Many media editing applications, however, do not provide intuitive exposure adjustment controls. For example, the user is required to have extensive knowledge about exposure editing in order to effectively use most of the existing exposure adjustment tools. Furthermore, the controls for adjusting different aspects of the exposure values of an image are dispersed in different locations of the user interface. These deficiencies cause unnecessary inconvenience in editing an image.

BRIEF SUMMARY

Some embodiments of the invention provide a novel user interface (UI) tool that is a unified slider control, which includes multiple sliders that slide along a region. The region is a straight line in some embodiments, while it is an angular arc (e.g., along the circumference of a full or partial circle or elliptical shape) in other embodiments. This region is referred to below as a sliding track.

In some embodiments, the unified slider control is used in a media editing application to allow a user to modify several different properties (e.g., color saturation, contrast, etc.) of the image by moving several different sliders along the tool's track. Each slider is associated with a property of the image (e.g., a color or tonal attribute of the image). A position of the slider on the track corresponds to a value of the property associated with the slider.

For each slider, the track specifies a range of values associated with the property of the image. The specified ranges of values for two or more sliders may coincide in some embodiments. Alternatively, or conjunctively, the specified ranges of values for two or more sliders may differ in some embodiments. For instance, a range of values for a color saturation property of an image may be defined so that each value in the range specifies a different amount of color saturation for the image. Also, in some embodiments, different types of ranges may be specified for different sliders along the track. For example, the range of values can be defined as a set of continuous integers (such as 0 to 255, −127 to 128, 500-600, etc.), as a set of continuous decimal values (−1.0 to 1.0), or as a set of logarithmic or other non-linear values. Moreover, the number of values may be different for different ranges that are defined along the track.

In some embodiments, one position on the slider track is associated with multiple values for multiple sliders that relate to multiple properties of the image. For example, a first position of the slider track may be associated with a contrast value of 50 and a saturation value of 75, while a different second position of the slider track may be associated with a contrast value of 60 and a saturation value of 100.

As mentioned above, the sliders in some embodiments are individually movable along the slider track in order to allow the user to change properties associated with the sliders. For instance, the user can change a first property of the image by moving the first slider while changing a second property of the image by moving a second slider along the track. Two or more sliders may occupy the same position in the slider control in some embodiments. As each slider may be associated with a different property, different operations may be performed to change the overall appearance of the image by moving different sliders. By using the unified slider control in this manner, the user may adjust the appearance of the image by changing several different properties of the image. Different sets of properties are associated with the sliders of the multi-slider control in different embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
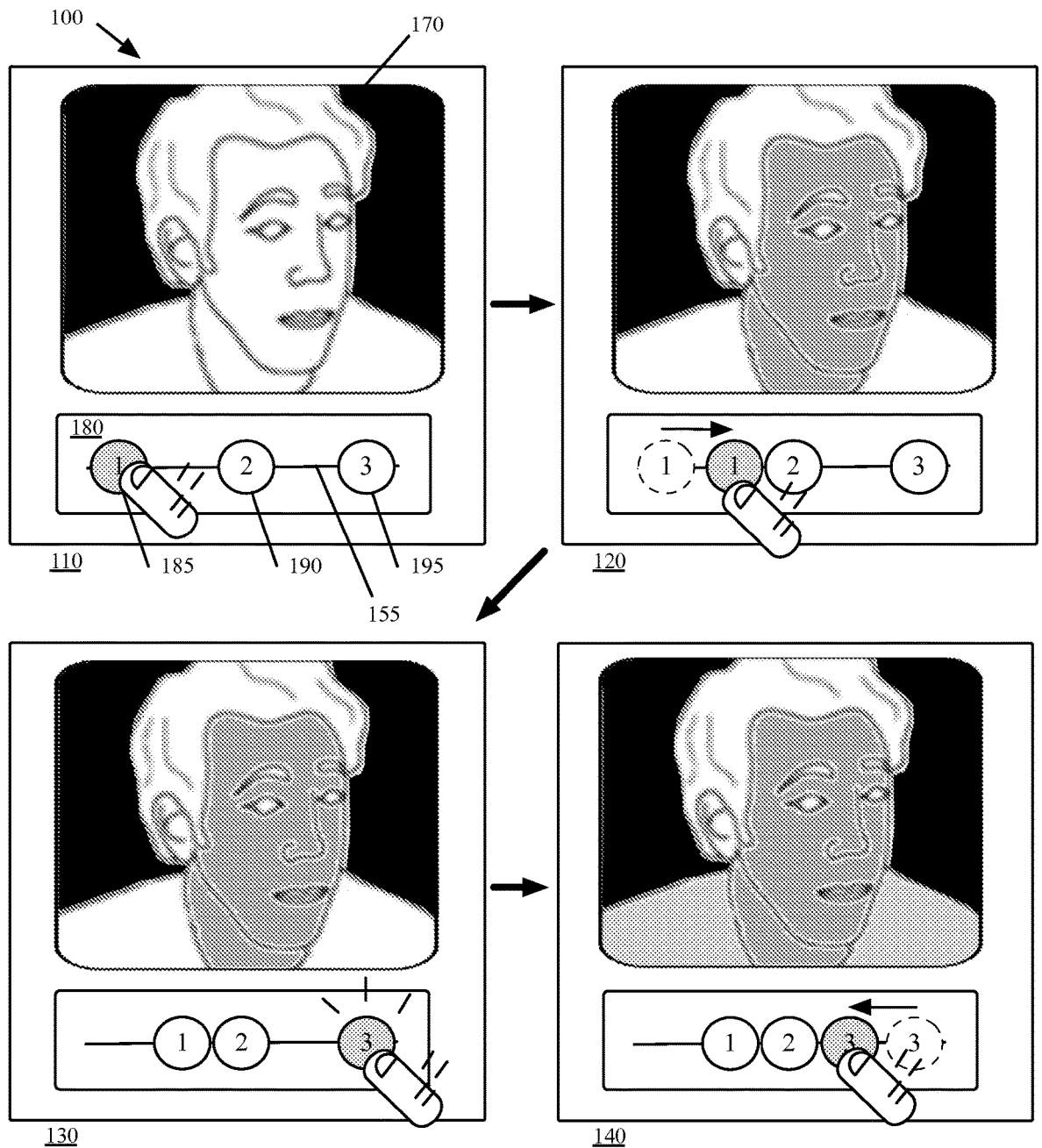
FIG. 1 conceptually illustrates a novel unified multi-slider control for editing images in a media editing application of some embodiments.

FIG. 1 conceptually illustrates a graphical user interface (GUI) 100 of a media editing application of some embodiments. This application includes a novel unified multi-slider control for editing images. FIG. 1 illustrates this novel control in terms of four stages (110-140) of operation of the GUI 100. Each stage of operation corresponds to a different set of positions of the sliders in the multi-slider control.

As shown in this figure, the GUI 100 has a preview display area 170 and a unified slider control 180, which in turn includes a track 155 and three slider icons 185-195. The preview display area 170 is an area that displays an image for a user to view and edit. In this example, the preview display area 170 displays an image of a man.

The unified slider control 180 is a tool that allows a user to modify different properties (e.g., color saturation, contrast, etc.) of the image. As mentioned above, this control 180 includes the track 155 along which multiple slider icons (also called sliders) are movable. Each slider is associated with a property of the image (e.g., a color or tonal attribute of the image). A position of the slider on the track 155 corresponds to a value of the property associated with the slider. These sliders may provide a visual indication to the user while the user moves the sliders along the track 155.

For each slider, the track 155 specifies a range of values associated with the property of the image. The specified ranges of values for two or more sliders may coincide in some embodiments. Alternatively, or conjunctively, the specified ranges of values for two or more sliders may differ in some embodiments. For instance, a range of values for a color saturation property of an image may be defined so that each value in the range specifies a different amount of color saturation for the image. Also, in some embodiments, different types of ranges may be specified for different sliders along the track 155. For example, the range of values can be defined as a set of continuous integers (such as 0 to 255, −127 to 128, 500-600, etc.), as a set of continuous decimal values (−1.0 to 1.0), or as a set of logarithmic or other non-linear values. Moreover, the number of values may be different for different ranges that are defined along the track.

One position on the slider track 155 is associated with multiple values for multiple sliders that relate to multiple properties of the image. For example, a first position of the slider track may be associated with a contrast value of 50 and a saturation value of 75, while a different second position of the slider track may be associated with a contrast value of 60 and a saturation value of 100.

In some embodiments, the sliders 185-195 are individually movable along the slider track in order to allow the user to change properties associated with the sliders 185-195. For instance, the user can change a property of the image by moving the slider 185 and change another image property by moving the slider 195 along the track 155. The sliders 185-195 may occupy the same position in the slider control 180 in some embodiments. As each slider 185-195 may be associated with a different property, different operations may be performed to change the overall appearance of the image by moving different sliders 185-195. By using the unified slider control 180 in this manner, the user may adjust the appearance of the image by changing several different properties of the image. Different sets of properties are associated with the sliders of the multi-slider control in different embodiments.

The operation of the GUI 100 will now be described in terms of the four stages (110-140). The first stage 110 shows the GUI 100 with an image displayed in the preview display area 170, and the three sliders 185-195 spread along the track 155. This stage also shows that a user has selected the slider 185. In the example illustrated in FIG. 1, and in other figures below, the media editing application is displayed on a touch sensitive screen, and the user interacts with this application through touch based inputs. Accordingly, in this example, the user selects the slider by touching the location of the slider on the display. The selected slider 185 appears darker than the unselected sliders 190 and 195 in this example to indicate the selection.

The second stage 120 shows the user's movement (i.e., by dragging) of the slider 185 along the track 155 from its old position (i.e., dashed circle 1 on the far left of the track) to a new position on the track. Also, this stage shows a change in the appearance of the displayed image in the preview display area 170. In this example, the slider 185 is assumed to be a skin tone saturation slider that increases or decreases the saturation of skin tones that the application automatically detects. Accordingly, in this example, the movement of the slider 185 in the second stage 120 has increased the skin tone saturation value that is expressed by the slider 185. This increased value has, in turn, directed the application to increase the saturation of the man's face and neck, as this application has automatically detected these locations as having skin tone colors. However, as the application does not detect skin tone colors in other areas of the displayed image, it does not change any other colors outside of the man's face and neck.

The third stage 130 shows the user's selection of the slider 195. Again, the user has selected this slider by touching the displayed location of this slider on the device, and this selection is reflected by the darkened appearance of the slider 195. Between the second and third stages 120 and 130, the appearance of the image is maintained because none of the sliders 185-195 have been repositioned between these two stages.

The fourth stage 140 shows the movement of the slider 195 along the track 155. Specifically, the user moves the slider 195 from its old position (i.e., dashed circle 3 on the far right of the track) to a new position of the track. As in the second stage 120, the appearance of the image changes at the fourth stage 140. In this example, the slider 195 is assumed to represent the white cutoff value that corresponds to the location of the brightest pixel of the image in a brightness histogram of the image. Movement of this slider to the left has the effect of darkening some of the brightest pixels in the image. Accordingly, in this example, the leftward movement of the slider 195 in the fourth stage 140 decreases the white cutoff value, which in turn directs the application to darken the brightest pixels in this image. In this example, it is assumed that the brightest pixels are the pixels that reside in the man's shirt. Hence, darkening these pixels results in the darkening of the man's shirt.

FIG. 1 illustrates the sliders 185-195 as circles. However, different embodiments present sliders differently. Sliders can be presented using any number of different visual presentations (e.g., dots, squares, thumbnails, different shapes, colors, text, etc.). In some embodiments, the sliders are all displayed using the same visual presentation. In other embodiments, the sliders are displayed differently based on the operations associated with the sliders. That is, sliders associated with the same operation may be displayed using the same visual presentation and sliders associated with different operations may be displayed using different visual presentations.

The slider movements illustrated in FIG. 1 are single, individual slider movements along the unified slider control's track 155. In some embodiments, when the user moves a slider along the unified slider control's track, one or more other sliders also move along the track. In some embodiments, two or more sliders of the unified slider control 180 are movably linked based on a relationship between the sliders. The association between two sliders can be a direct association in which movement by a first slider in a particular direction causes movement of a second slider in the same direction, or inversely linked in which movement by the first slider in a particular direction causes movement of the second slider in the opposite direction.

Figure 2:
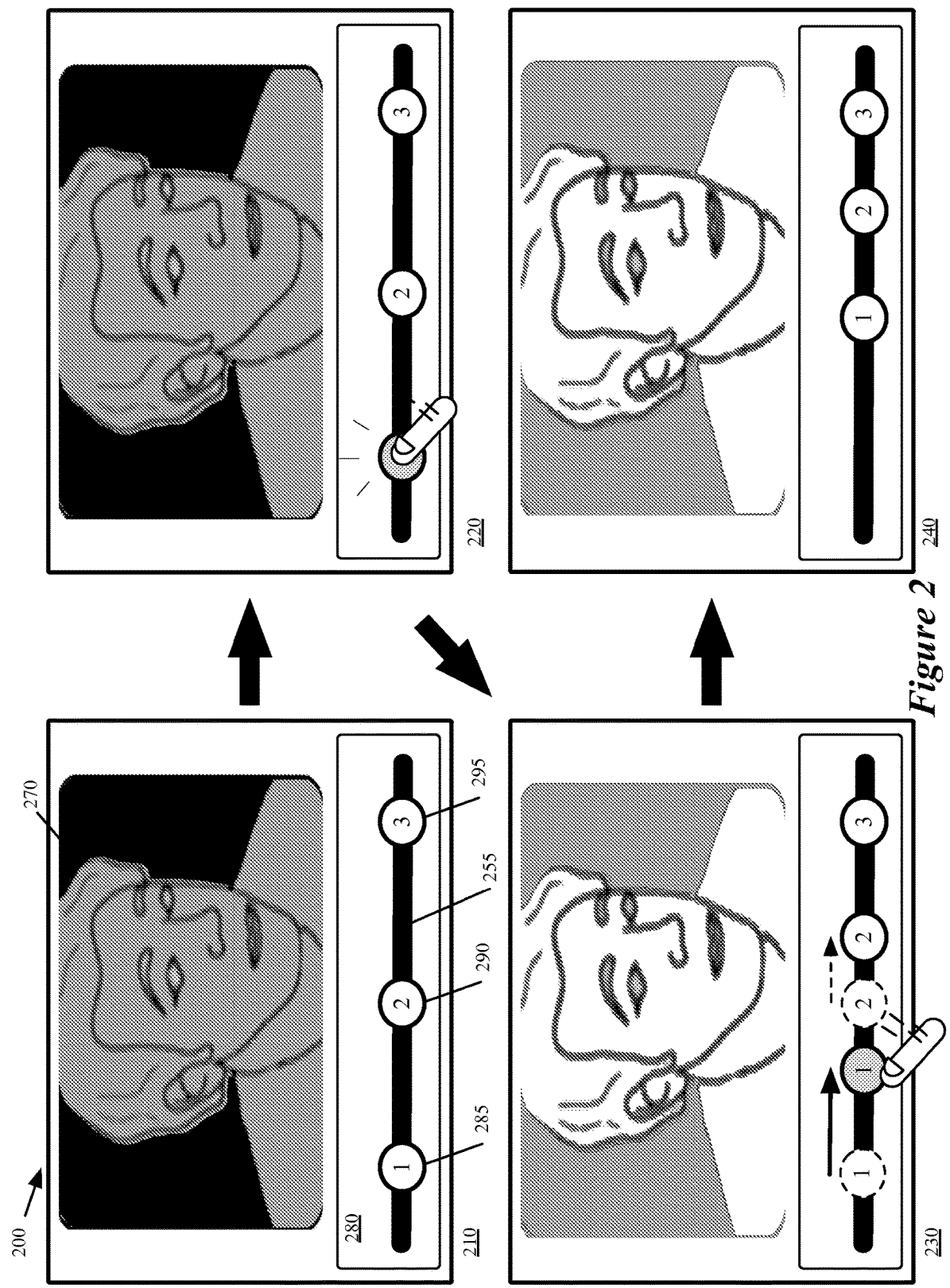
FIG. 2 illustrates a direct association between two sliders of the multi-slider control.
Figure 3:
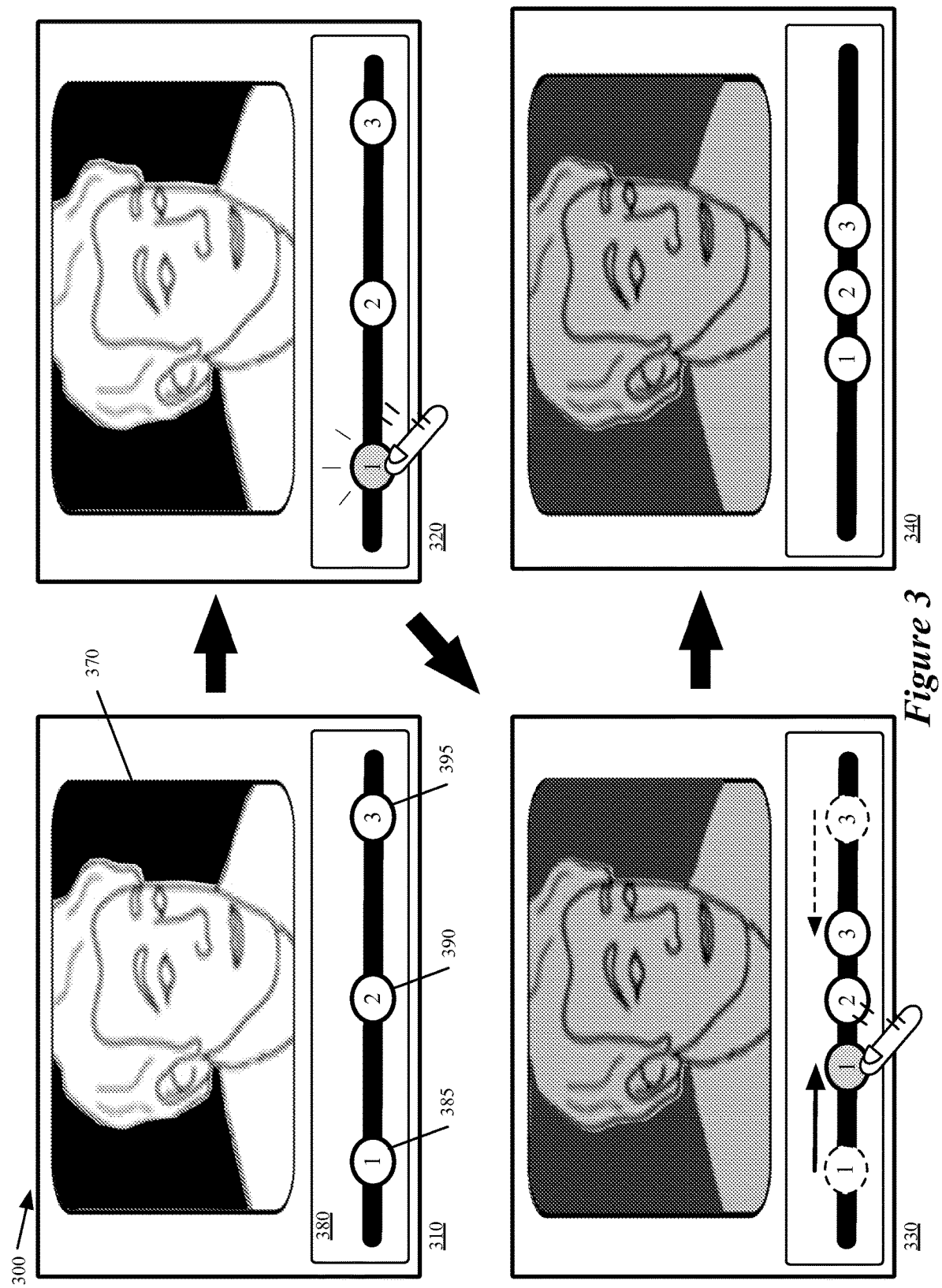
FIG. 3 illustrates an inverse association between two sliders of the multi-slider control.

FIGS. 2 and 3 provide examples of such direct and inverse association between two sliders. FIG. 2 illustrates the case where one slider's movement along the unified track 155 moves another slider in the same direction on that track. The GUI 200 illustrated in FIG. 2 is similar to the GUI 100 in that it has an image viewing area 270 and a unified slider control 280 with three sliders 285-295 that slide along a common track 255. The operation of the GUI 200 is described in four stages 210-240.

In the example illustrated in FIG. 2, the first stage 210 shows the GUI 200 with an image displayed in the image viewing area 270, and the three sliders 285-295 spread along the track of the unified slider control 280. The second stage 220 shows a user selecting (by touching) the slider 285. In this stage, the appearance of the image in the image viewing area 270 is the same as the appearance of the image in the first stage 210, as the position of the three sliders is the same in both stages.

The third stage 230 shows the user moving (e.g., dragging) the slider 285 along the unified slider track 255 from its old position (i.e., dashed circle 1 on the far left of the track) to a new position. This stage also shows that the movement of the slider 285 causes the media editing application to automatically move slider 290 along the track 255 in the same direction as the slider 285. As illustrated, the distance that the slider 290 has automatically moved is not the same as the distance that the user moved the slider 285. Instead, the slider 290 is moved a shorter distance to a position that is equidistant between the sliders 285 and 295. However, one of ordinary skill will realize that this distance can vary (e.g., the same distance) in other examples of two or more sliders that are associated to move together.

The third stage 230 further illustrates a change in the appearance of the image. In this example, it is assumed that the slider 285 relates to the black cutoff value that corresponds to the location of the darkest pixel of the image in a brightness histogram of the image. It is also assumed that slider 290 relates to the overall brightness of the image. Changing the black cutoff value by moving the slider 285 to the right, in this example, has the effect of brightening all the pixels in the image. However, the overall brightness value has not changed by automatically moving the slider 290. Instead, only the slider icon 290 is moved to maintain the equidistant spacing between the sliders 285 and 295. Once the slider 290 is repositioned, it is associated with the new overall brightness of the image. In other embodiments, however, there is a relationship between the sliders, such that movement of the slider 285 causes slider 290 to move, but also causes slider 290 to change the overall brightness of the image. In other words, instead of the movement of the slider 285 causing the overall brightness to change, the automatic movement of the slider 290 causes the overall brightness to change. In this case, the movement of the slider 285 only changes the black cutoff value, while the automatic movement of the slider 290 changes, on its own, the overall brightness of the image.

Accordingly, in this example, the rightward movement of the sliders 185 and 190 in the third stage 230 increases the black cutoff value but not the overall brightness value of the image. This in turn directs the application to lighten all the pixels in this image from the standpoint of the black cutoff. For example, the darkest pixels may be lightened more than the lightest pixels. While subsequent movements of the slider 290 by the user would have the effect of brightening the overall image from the standpoint of the overall brightness value, in this case, only the slider 290 is repositioned. In this example, it is assumed that the darkest pixels are the pixels that form the background region behind the man. Hence, brightening these pixels results in the brightening of this background region. The other pixels (i.e., the man in the image) are midtone pixels in the first stage, which are brightened to lighter tone pixels as a result of the modified black cutoff.

Finally, after the user has deselected the slider 285 at the fourth stage 240, the sliders 285-295 are shown at their final positions on the track. As the positions of sliders 285 and 290 in the fourth stage are close to their positions in the third stage, the displayed image looks pretty much the same in the third and fourth stages. Also, in both of these stages, the position of the slider 295 is unchanged because the user did not manually move slider 295 and the media editing application did not automatically move slider 295 as it does not associate this slider with either slider 285 or 290.

The slider movements illustrated in FIG. 2 show that movement of a slider along the unified slider control track 255 pushes one or more other sliders along the track. In some embodiments, when the user moves a slider in a particular direction along the unified slider control track, one or more other sliders are automatically pulled along the track toward the manually moved slider (e.g., in the opposite direction of the manually moved slider).

FIG. 3 conceptually illustrates an example of this automatic pulling in a GUI 300 that is similar with the GUI 200 of FIG. 2 in that the GUI 300 has a unified slider control 380 with three sliders 385-395 that slide along a common track 355. The operation of the GUI 300 is described in four stages 310-340 that are similar to the four stages 210-240 of FIG. 2. The only difference in the operation of the sliders between these two examples is that the manual movement of the slider 385 in FIG. 3 causes the media editing application to pull slider 395 toward the slider 385 instead of pushing slider 290 away from slider 285.

In the example illustrated in FIG. 3, the sliders 385 and 395 are assumed to be two conjoined contrast control sliders for adjusting the dark and bright region contrasts. These two contrast control sliders move in a complementary manner with respect to each other. Manual movement of either of these sliders toward the other will cause the other to automatically be moved toward the manually moved slider. Manual movement of either slider away from the other will cause the other slider to automatically move away from the other slider.

In the second and third stages 320 and 330 of FIG. 3, the slider 385 is moved toward the slider 395. Hence, in this example, the application automatically moves the slider 395 toward the slider 385. The movement of these sliders toward each other reduces the contrast in the image, which is illustrated by the difference between the versions of the image that are displayed in the second and third stages.

Multiple sliders move along a straight track in the embodiments described above and below. However, in other embodiments, these sliders move along an angular arc (e.g., along the circumference of a full or partial circle or elliptical shape). For some of the embodiments in which the sliders slide along an angular region, the slider has an appearance of multiple circular dialers that are superimposed on top of each other to form one dialer with multiple handles (i.e., multiple sliders). Any one of these handles can be selected to rotate the dialer. In response to movement of any of the handles, the application may maintain the positions of other handles or may automatically rotate in the same or opposite directions these one or more other handles.

Several more detailed embodiments are described below. Section I describes an implementation of the unified slider control in a multi-slider exposure tool of a media editing application. Section II describes different hardware design implementations of the multi-slider exposure tool. Next, Section III describes the software architecture of the media editing application that uses the multi-slider exposure tool of some embodiments. Lastly, Section IV describes electronic systems including a mobile device and a computer system that implement some embodiments of the invention.

I. Multi-Slider Exposure Tool

In some embodiments, the unified slider control is a multi-slider exposure tool that can be used to perform tonal adjustment operations on images in media editing applications, such as image editing applications, video editing applications, or any other kinds of media editing applications. Examples of image editing applications include Apple Final Cut Pro®, Apple Aperture®, Apple iPhoto®, Adobe Photoshop®, Adobe Lightroom®, etc., while examples of video editing applications include Apple iMovie®, Apple Final Cut Pro®, Apple Motion, etc.

In the examples above and below, the media editing application in some embodiments is a standalone application that executes above the operating system of a device, while in other embodiments it is part of the operating system. Also, in many of the examples above and below (such as those illustrated in FIGS. 4-16), a user interacts with the user interface (UI) of the media editing application through a touch sensitive screen of the device that displays this UI, which in some embodiments is also the device on which the application executes. One of ordinary skill in the art will realize that in some embodiments, a user can use cursor controllers or other input devices to interact with the UI and the sliders shown in these examples so long as the devices that execute or display the media editing application have such cursor controllers or other input mechanisms (e.g., voice control).

A. Media Editing Application

Figure 4:
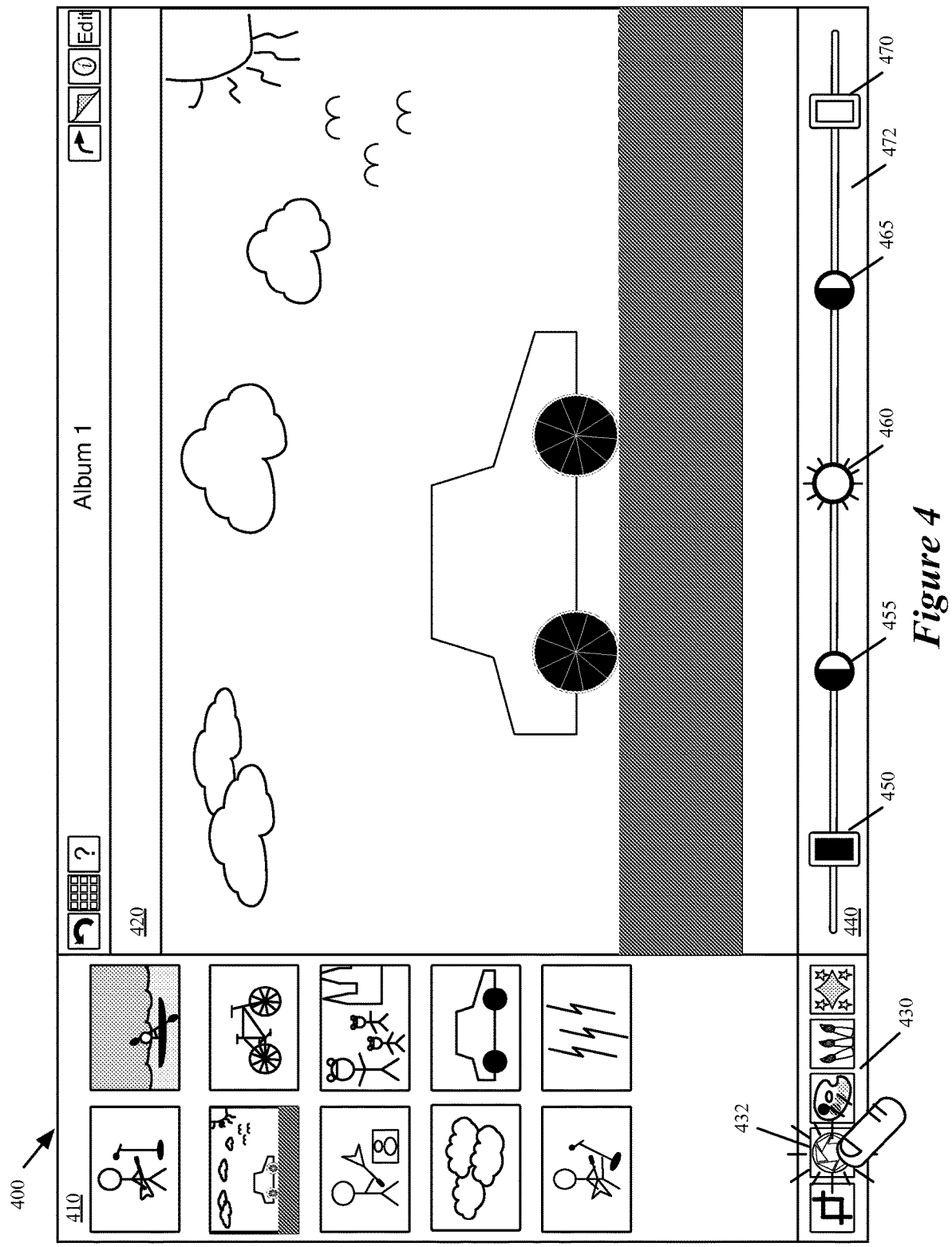
FIG. 4 conceptually illustrates a graphical user interface (GUI) of the media editing application with a multi-slider exposure tool of some embodiments.

FIG. 4 conceptually illustrates the GUI 400 of a media editing application with a multi-slider exposure tool 440 of some embodiments. This exposure tool has multiple sliders that can be slid along one track for performing tonal adjustment operations on the image. As shown in FIG. 4, the GUI 400 has a thumbnail display area 410, a preview display area 420, and a selectable tools area 430 that includes the multi-slider exposure tool 440.

The thumbnail display area 410 shows thumbnails of different images in a collection of digital images, such as an album, an event, etc. A user can scroll through these thumbnails (e.g., through directional touch contact with this area) and select any one of the thumbnails (e.g., by touching the location in this area that displays the thumbnail). In some embodiments, selected thumbnails can be moved within the thumbnail display area 410 to change the order of these thumbnails. Also, in some embodiments, selection of a thumbnail in the display area 410 causes the preview display area 420 to display a higher resolution image (e.g., the actual image, a high-resolution preview of the image, or a higher-resolution thumbnail image) of the selected thumbnail image. In some embodiments, the display area 420 displays the higher resolution image for a user to view and possibly edit.

The selectable tools area 430 displays several editing tools that a user can select (e.g., by touching the location in this area that displays the tool) to perform editing operations on an image displayed in the preview display area 420. Examples of such operations include cropping, exposure adjustment, color correction, and a variety of locally or globally applied drawings or effects. One of the icons in the tools area 430 is an exposure icon 432 that represents the multi-slider exposure tool. The selection of the exposure icon 432 (e.g., through touch contact of the icon 432 as illustrated) directs the application to present the multi-slider exposure tool 440 below the preview display area 420 in some embodiments, as shown in FIG. 4, or over a portion (e.g., a bottom portion) of the image displayed in the preview display area 420 in other embodiments.

The multi-slider exposure tool 440 has a track 472 and five slider icons (also called sliders or knobs) that can slide along the track 472 to perform different tonal adjustments (also called exposure adjustments) on the image. The five sliders relate to image attributes that correspond to a brightness histogram for the image. A brightness histogram (not shown) is a histogram of a brightness attribute, such as luminance or luma component color value, of the image.

The five sliders include a blackpoint knob 450, a whitepoint knob 470, a brightness knob 460, and a pair of contrast knobs 455 and 465. As mentioned above, the knobs 450-470 can be moved along the track to make different types of tonal adjustments on the image displayed in the area 420. In some embodiments, changes to the displayed image in the preview area 420 are immediately reflected on the image's thumbnail in the thumbnail display area 410, or alternatively, after a short transient period or at the end of the image editing operation.

The blackpoint knob 450 in some embodiments represents the previewed image's black cutoff value, which is the location of the darkest pixel(s) of this image in the image's brightness histogram. In some embodiments, movement of the blackpoint knob to the right or left has the effect of brightening or darkening some of the darkest pixels in the image. Conversely, the whitepoint knob 470 in some embodiments represents the previewed image's white cutoff value, which is the location of the brightest pixel(s) of this image in the image's brightness histogram. In some embodiments, movement of the whitepoint knob to the left or right has the effect of darkening or brightening some of the lightest pixels in the image.

The brightness knob 460 in some embodiments is for adjusting the overall brightness of the image (e.g., the average brightness value of the image). The contrast knobs 455 and 465 are a pair of conjoined contrast control sliders for adjusting the contrast in the dark and bright regions of the image's histogram. These two regions in some embodiments reside respectively between the black cutoff value and the brightness median marker, and the brightness median marker and the white cutoff value. In some embodiments, the dark region contrast slider 455 is positioned between the blackpoint slider 450 and the brightness slider 460, while the bright region contrast slider 465 is positioned between the brightness slider 460 and the whitepoint slider 470. Also, in some embodiments, the two contrast control sliders move in a complementary manner with respect to each other. Manual movement of either of these sliders toward the other will cause the other to be automatically moved toward the manually moved slider. Manual movement of either slider away from the other will cause the other slider to automatically move away from the other slider.

For each slider, the track 472 specifies a range of values associated with that slider's corresponding image attribute (e.g., with the black or white cutoff value, with the brightness median, or with the midpoint contrast locations). In some embodiments, the range of values is the same for all of these sliders as the locations of these sliders are defined with respect to the same x-axis of the image's brightness histogram. The histogram's x-axis may be defined along different numerical ranges, such as a range of continuous integers (such as 0 to 255, −127 to 128, 500-600, etc.), a range of continuous decimal values (−1.0 to 1.0), a range of logarithmic or other non-linear values, etc. One of ordinary skill will realize that when the sliders related to other image attributes, the range that is defined by the track 472 might be different for different sliders.

The multi-slider exposure tool knobs 450-470 are further elaborated below by reference to FIGS. 7 (blackpoint knob), 8 (whitepoint knob), 9 (brightness knob), and 10 (contrast knobs). Having generally described several aspects of the media editing application GUI, the next example describes selecting an image with the media editing application and selecting the multi-slider exposure tool to make tonal adjustments to the image.

Figure 5:
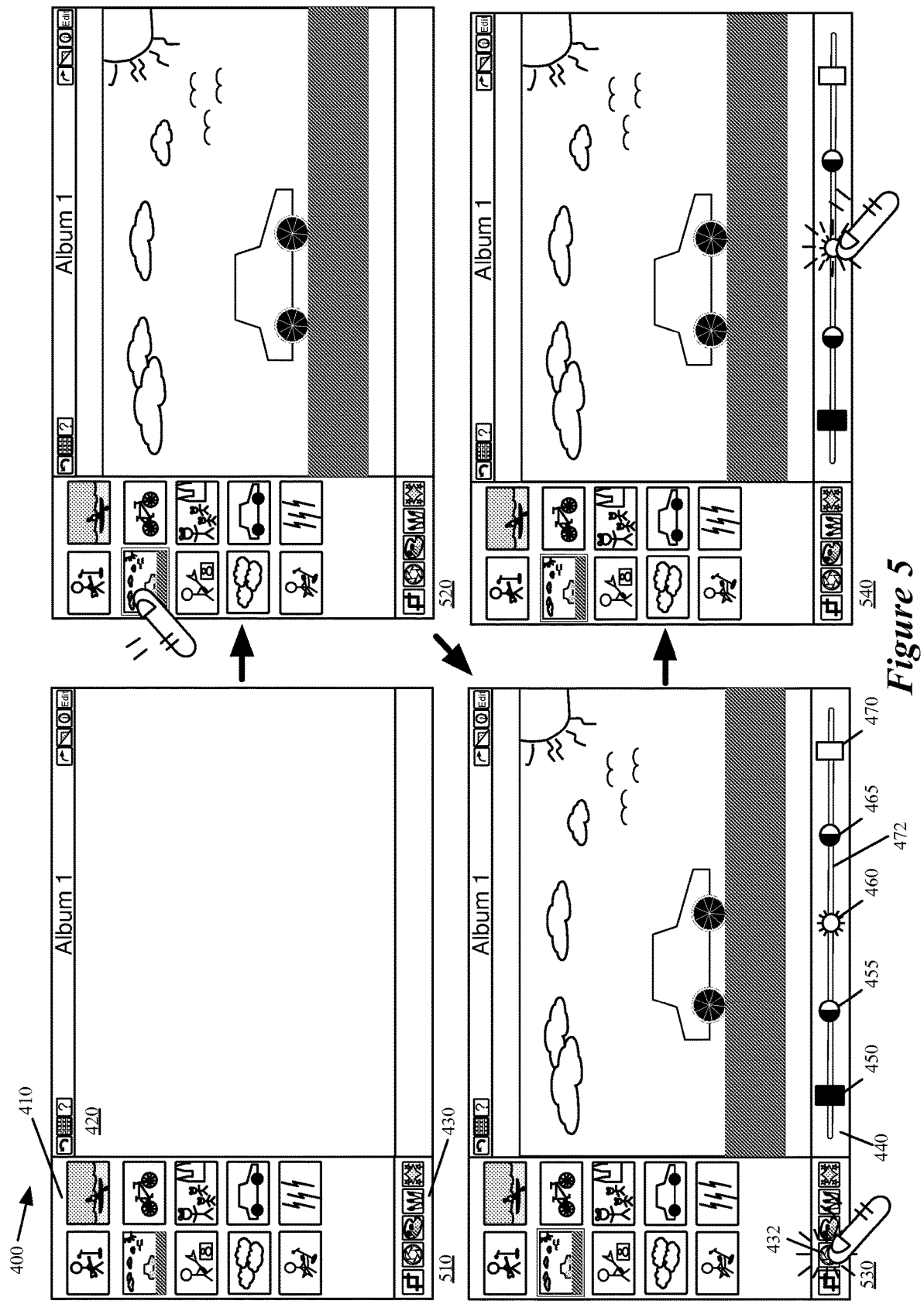
FIG. 5 conceptually illustrates the selection of the multi-slider exposure tool in the GUI for editing an image selected in the GUI.

FIG. 5 conceptually illustrates selecting the multi-slider exposure tool 440 in the GUI 400 of some embodiments. This figure illustrates the selection of the multi-slider exposure tool in the GUI 400 during four stages (510-540) associated with selecting an image for editing the image. At the first stage 510, the GUI 400 of the media editing application is displayed without any image or tool selected. In some embodiments, the media editing application displays a default image in the preview display area 420 when no image is selected by a user. In other embodiments, the media editing application prompts a user of the application to select an image to display in the preview display area 420.

Next, at the second stage 520, a user selects a thumbnail of an image from the thumbnail display area 410. As shown at this stage, the selected image is displayed in the preview display area 420. In some embodiments, any tool from the set of tools 430 can be selected for performing media editing operations after an image is selected and displayed in the preview display area 420. At the third stage 530, the user selects the multi-slider exposure tool from the set of tools 430. As illustrated at the third stage 530, the multi-slider exposure tool is displayed approximately underneath the preview display area 420. Finally, once the multi-slider exposure tool 440 is displayed, the user selects the brightness knob 460 for making brightness adjustments to the image displayed in the preview display area 420.

Having generally described the GUI of the media editing application and how a user selects an image and the multi-slider exposure tool for adjusting the image, the following example describes different configurations of the multi-slider exposure tool for different image attributes.

B. Dynamically Specifying Different Initial Positions for the Sliders

In some embodiments, the multi-slider exposure tool dynamically defines the initial positions of its sliders based on the characteristics of the brightness histogram of the image being displayed in the preview display area 420. This is because these positions correspond to specific positions or regions within this histogram. Accordingly, in some embodiments, the first set of operations that the multi-slider exposure tool performs when it is invoked for a particular image that is being viewed in the display area 420 include (1)

identifying the histogram characteristics, (2) based on these characteristics, identifying the positions of the sliders, and (3) displaying the exposure tool with the sliders at these identified positions.

Figure 6:
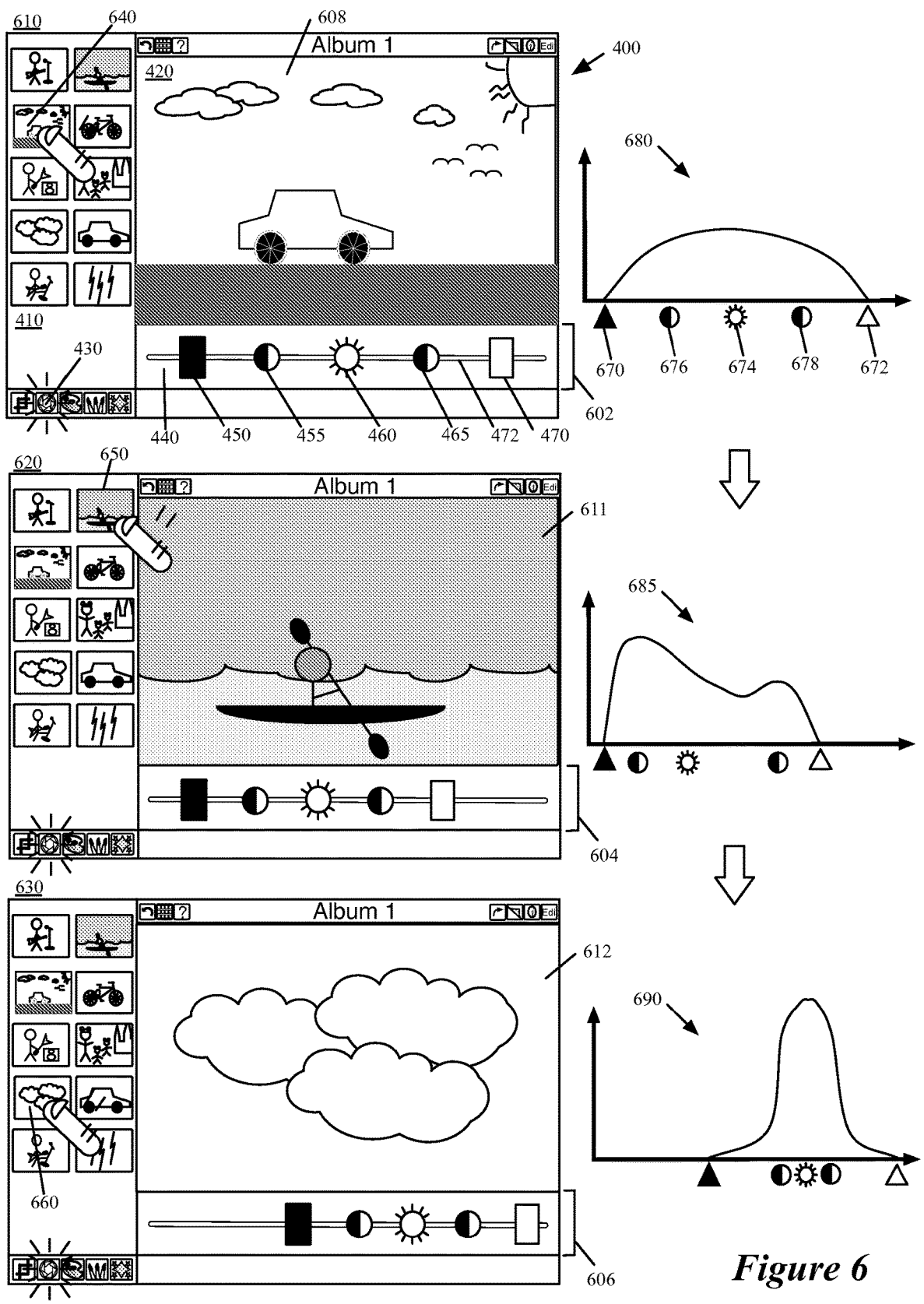
FIG. 6 conceptually illustrates three example initial slider configurations of the sliders of the multi-slider exposure tool for three different images.

FIG. 6 conceptually illustrates three different examples of three different initial slider configurations 602, 604, and 606 of the sliders of the exposure tool 440 for three different images 608, 611, and 612, respectively, that have different tonal ranges. This figure shows the three different initial configurations in three different stages 610, 620, and 630. In these stages, this figure not only shows the GUI 400 but also shows histograms 680, 685, and 690 alongside the GUI 400 to illustrate the different histogram attributes of the different images.

A brightness histogram represents a set of image values of an image. In some embodiments, the histogram represents the image by charting an image value for each pixel of the image. For instance, an image having a set of pixels may have a first subset of pixels with a first value, a second subset of pixels with a second value, and a third subset of pixels with a third value. The histogram may chart first, second, and third positions along the X-axis for the first, second, and third values, respectively. Then, along the Y-axis, the histogram may illustrate the frequency of the pixels at each position. Based on charting the image pixel values, a curve is formulated and displayed (or conceptualized) for the histogram. For example, at each of the three x-axis positions, the histogram includes a value along the y-axis to represent the number (or frequency) of pixels having the corresponding x-axis value.

In some embodiments, the range of different image pixel values that are charted along the histogram's x-axis represent the tonal range of the image. In other words, the span of image pixel values between the starting point and ending point of the histogram represents the tonal range of the image. In some embodiments, the tonal range is defined over a set of image pixel values that are possible for displaying the image on the device.

For the histogram, the image pixel values are determined in some embodiments by performing calculations based on one or more pixel component color values. In some embodiments, an RGB sum is performed to determine the histogram value for a particular pixel. In other words, the brightness histogram is expressed in terms of the sum of the RGB values. In other embodiments, the pixel values are received in the RGB space, converted to a color space that has luminance or luma as one of the component color channels (e.g., the YCbCr, YUV, YIQ, etc.), and the brightness histogram is constructed from the luminance or luma values. Yet other embodiments construct other types of histograms to express the tonal range of the image.

The black and white indicators 670 and 672 of some embodiments provide convenient markers for identifying the darkest and lightest image pixel values of the histogram. Also, the brightness indicator 674 of some embodiments represents the pixel value of the median pixel in the distribution of pixels of the histogram. In some embodiments, the median pixel in the distribution of pixels of the histogram is the median pixel of all the pixels of the image sequentially ordered. Furthermore, image contrast indicators 676 and 678 suggest tonal differences of the image (e.g., the difference between dark and light areas), which may be evident based on the distribution of values over the histogram 680. For example, a histogram having a large portion of image pixel values bunched close to the median brightness indicator is likely to be based on an image having low contrast. On the other hand, a histogram having large numbers of pixel values close to the black and white indicators may indicate an image with high contrast. As another example, image pixel values that are spread out over the tonal range without disproportionate bunching of values may indicate an image having balanced contrast.

In the example illustrated in FIG. 6, the position of the blackpoint knob 450 on the multi-slider exposure tool 440 corresponds to the black indicator 670 of the histogram 680 and the position of the whitepoint knob 470 corresponds to the white indicator 672 of the histogram. As the span between the black and white indicators of the histogram represents the range of image values of the image, the brightness indicator 674 of the histogram 680 represents the pixel value of the median pixel in the distribution of pixels of the histogram. Unlike the positions of the blackpoint and whitepoint knobs, the position of the brightness knob 460 does not necessarily correlate to the brightness indicator 674 of the histogram. Thus, in some embodiments, the default position of the brightness knob 460 is the midpoint between the blackpoint knob 450 and the whitepoint knob 470. On the other hand, in some embodiments, the brightness knob 460 of the multi-slider exposure tool 440 is not necessarily positioned equidistant from the blackpoint and whitepoint knobs 450 and 470 in the initial configuration of the multi-slider exposure tool 440 for an image, but rather, is positioned according to the brightness indicator 674. In these embodiments, the position of the brightness knob 460 directly correlates to the brightness indicator 674.

Likewise, the positions of the contrast knobs 455 and 465 do not correspond to any particular values of the histogram from which image contrast can be derived. Instead, the contrast knobs are initially positioned, by default, half-way between the brightness knob and an endpoint knob (blackpoint knob or whitepoint knob). Thus, in some embodiments, the default positions of the contrast knobs 455 and 465 are midpoints between the position of the brightness knob 460 and the positions of the blackpoint and whitepoint knobs 450 and 470, respectively.

While the positions of the blackpoint and whitepoint knobs 450 and 470, in the example illustrated in FIG. 6, correspond to specific values of the histogram, in other embodiments the positions of other knobs or all of the knobs correspond to histogram values.

The first stage 610 of FIG. 6 illustrates the histogram 680 and the initial slider configuration 602 for a first image 608. This image 608 is displayed in the preview display area 420 as its thumbnail image 640 has been selected by the user. With this displayed image, the GUI 400 also displays the multi-slider exposure tool 440 as this tool was activated prior to the selection of the thumbnail 640.

In the first stage 610, the set of knobs 450-470 are approximately evenly spaced along the track of the multi-slider exposure tool 440, with the blackpoint knob on the left side of the track, the whitepoint knob on the right side of the track, and each contrast knob between the brightness knob and one of the blackpoint and whitepoint knobs. This initial configuration 602 of the knobs for the multi-slider exposure tool indicates the tonal range of image pixel values of the first image 608.

The histogram 680 illustrates the distribution of pixel values of the first image 640, and therefore indicates the tonal range (e.g., deepest black pixel value to brightest white pixel value) and brightness (e.g. median brightness) of the first image 608. To show the relative relationship between the multi-slider exposure tool 440 and the histogram 680, several indicators are shown under the histogram, some of which correspond to knobs of the multi-slider exposure tool.

For the first image 608, all of the indicators under the histogram appear to be correlated to the knobs. However, in this example, the positional correspondence only relates to some of the indicators and knobs. In particular, the black and white indicators 670 and 672 correspond to the blackpoint and whitepoint knobs 450 and 470 of the multi-slider exposure tool and represent the tonal range of the first image 608.

On the other hand, the brightness indicator 674 represents the pixel value of the median pixel in the distribution of pixels of the histogram for the first image 608, but does not correlate to the position of the brightness knob 460 of the multi-slider exposure tool 440. The contrast indicators 676 and 678 mark positions of the histogram that suggest the amount of contrast for the first image. However, like the brightness indicator 674, the contrast indicators 676 and 678 do not correspond to the positions of the contrast knobs 455 and 465 of the multi-slider exposure tool. In some embodiments, the positions of all the knobs of the multi-slider exposure tool 440 correspond to the positions of the indicators.

In the second stage 620, a second thumbnail image 650 is selected by the user and this thumbnail's image 611 is displayed in the preview display area 420 of the GUI 400. Again, the multi-slider exposure tool 440 is displayed below the image displayed in the display area. The positions of the knobs 450-470 in this stage 620 are different from the positions of the knobs in the first stage, as the two images in these two stages have different tonal properties. The first image 608 had these knobs spread farther apart to represent the tonal range. The second image 611, on the other hand, is a darker image and consequently has its tonal distribution shifted to the darker range on the histogram 685. This shift is indicated by the multi-slider exposure tool's initial slider configuration 604 in the second stage.

More specifically, the blackpoint knob is positioned at approximately the same position as the blackpoint knob shown in the first stage 610 for the first image 608. However, in the second stage 620, the whitepoint knob 470 is closer to the center of the track 472 than in the first stage. In absolute terms, the brightness knob 460 is positioned more to the left in the second stage than in the first stage. However, in relative terms, the brightness knob is equidistant between the blackpoint knob 450 and the whitepoint knob 470, as in the first stage. Likewise, the contrast knobs are positioned farther to the left in absolute terms compared to the first stage, but are positioned half-way between the brightness knob and the blackpoint and whitepoint knobs, as is shown in the first stage.

The histogram 685 illustrates this unequal spacing between the blackpoint and whitepoint knobs for the first and second images 608 and 611. Specifically, it shows that the tonal range in the second stage is slightly less than the tonal range in the first stage, as the white cutoff value has moved to the left. This histogram also shows that the tonal curve in the second stage has shifted to the left (i.e., toward darker pixels) due to the overall darker appearance of the second image 611. This is because the second image 611 has a higher frequency of pixels near the black cutoff value. Although the distance between the blackpoint knob 450 and the whitepoint knob 470 indicates the tonal range of the second image 611, the contrast and brightness knobs do not indicate anything about the histogram. For example, the two bumps in this histogram 685 are indicative of larger contrast in this image, yet the contrast knobs 455 and 465 are evenly spaced in relation to the brightness knob 460 and do not bear any positional relationship to these areas of the histogram. In other embodiments, however, the contrast knobs 455 and 465 are positioned approximately in relation to the contrast of the dark and light regions of the displayed image.

The third stage 630 illustrates the selection of a third thumbnail image 660 by the user and the display of this thumbnail's corresponding image 612 in the preview display area 420. Again, the multi-slider exposure tool 440 is displayed below the image displayed in the display area. The positions of the knobs 450-470 in this stage 630 are different from the positions of the knobs in the first and second stages, as the three images in these three stages have different tonal properties. The third image 612 is a brighter image and consequently has its tonal distribution shifted to the brighter range on the histogram 690. This shift is indicated by the multi-slider exposure tool's initial slider configuration 606 in the third stage.

More specifically, the blackpoint knob 450 has moved quite a bit to the right to indicate the lack of really dark pixels in this image, and the whitepoint knob 470 has moved all the way to the right to indicate the high value of the white cutoff for this image. As in the first and second stages, the brightness knob 460 and the contrast knobs 455 and 465 are evenly spaced within the tonal range specified by the blackpoint and whitepoint knobs. The histogram 690 illustrates this big shift to the right and the large number of bright pixels in the image 612. It shows that the tonal range in the third stage is much less than the tonal ranges in the first and second stages, as most of pixels are positioned in a much smaller tonal range. It also shows that the distance between the contrast indicators and the brightness indicator is substantially less than in either of the first two stages. Thus, the histogram illustrates that the third image 612 has relatively little contrast compared to the first and second images.

While the initial configurations described above in relation to FIG. 6 show only the blackpoint and whitepoint knob positions corresponding to the black and white indicators of the histogram, in other embodiments, all of the knobs correspond to the indicators of the histogram.

C. Single Slider Operations

Having discussed the initial configuration for the set of knobs of the multi-slider exposure tool when different images are selected by the user, the next several examples describe the individual knob movements. In some embodiments, different operations are performed on an image selected by a user based on the knob moved along the multi-slider exposure tool track.

1. Move Blackpoint Knob

Figure 7:
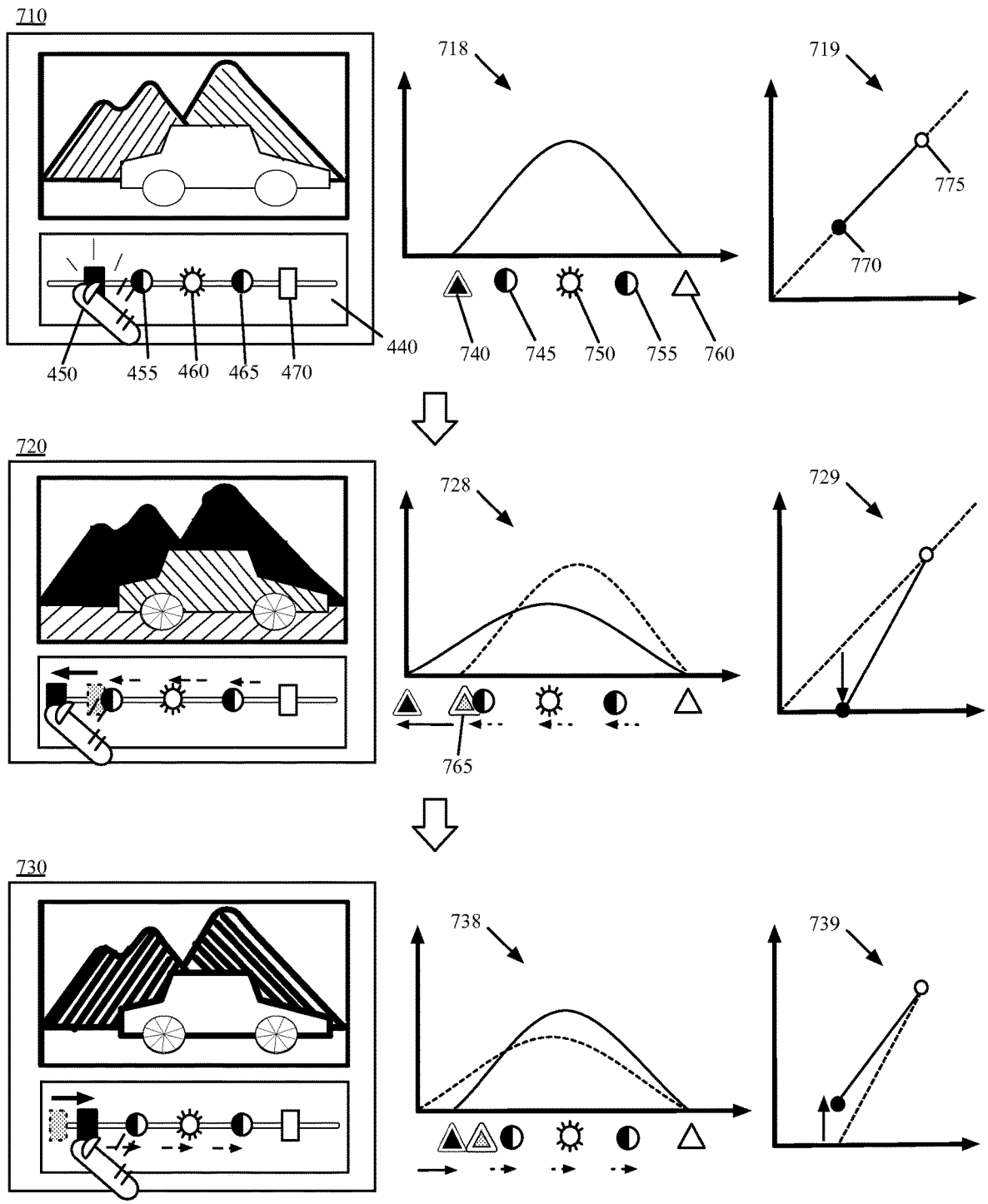
FIG. 7 conceptually illustrates a single slider operation of the multi-slider exposure tool for changing the black level of an image in some embodiments.

FIG. 7 conceptually illustrates a single slider operation of the multi-slider exposure tool 440 for changing the appearance of an image in some embodiments. This figure illustrates the multi-slider exposure tool 440 during three stages (710-730) associated with moving the blackpoint knob 450 along the track to perform an operation that adjusts the appearance of an image. In this figure, histograms 718, 728, and 738 and tonal response curves 719, 729, and 739 are shown alongside the multi-slider exposure tool 440 during the three stages.

The histograms illustrate the effect of moving different knobs of the multi-slider exposure tool. Several indicators 740-765 are shown along with the histograms. These include a blackpoint indicator 740, a whitepoint indicator 760, a brightness indicator, 750, a pair of contrast indicators 745 and 755, and an original tonal range point indicator 765.

The tonal response curves also illustrate the effect of moving different knobs of the multi-slider exposure tool. Illustrated with each response curve 719, 729, and 739 is a black cutoff point 770 and a white cutoff point 775. The black and white cutoff points indicate the tonal range of image values for the image. The X-axis of the response curve represents input image pixel values and the Y-axis represents output image pixel values. As the response curve illustrates the effect of tonal adjustments (e.g., by moving different knobs) on the image, one skilled in the art would understand that input image pixel values represent the values before the user makes the tonal adjustment and the output image pixel values represent the values after the tonal adjustment is completed. Thus, the slope of the response curve illustrates the effect of a tonal adjustment on the image.

Moreover, the slope of the response curve between the black and white cutoff points indicates how tonal adjustments are applied over the set of pixels of the image. In some embodiments, where there is no change to the tonal attributes of the image, the response curve is a straight line that maps all input values to the same output values. Such a response curve is shown at a forty-five degree angle with respect to the X-axis and Y-axis. When a user makes tonal adjustments to the image, this curve is reformulated. For example, a blackpoint knob 450 movement that expands the tonal range of image pixel values results in a reformulation of the response curve, which repositions the black cutoff point and, thus, modifies the slope of the response curve.

The blackpoint knob 450 in some embodiments is for adjusting the darkness of the image. When a user moves the blackpoint knob 450 to the left along the track, the image is darkened (e.g., deeper black). In particular, the image has an initial tonal range of pixels from dark to light. The initial tonal range can be extended by moving the blackpoint away from the center of the multi-slider track in some embodiments. Extending this initial tonal range of image values affects the appearance of the image. For example, by moving the blackpoint knob to the left along the track, the image may display the darkest pixels of the initial tonal range as even darker pixels in the extended tonal range.

On the other hand, the user can reduce the extended tonal range and brighten the image by moving the blackpoint knob to any position between the current blackpoint position and the initial blackpoint position on the multi-slider track, in some embodiments. For example, when the user moves the blackpoint position between the extended tonal range position and the initial tonal range position, the image is lightened.

The first stage 710 shows the multi-slider exposure tool 440 with an initial configuration of knobs associated with a displayed image. At this stage, a user selects the blackpoint knob for performing an operation that adjusts the range of values for the image. The tonal range of image values is shown between the black and white indicators 740 and 760 illustrated in the histogram 718. In addition, the response curve 719 is shown with the black and white cutoff points 770 and 775, which correspond to the blackpoint and whitepoint knobs of the multi-slider exposure tool 440.

The second stage 720 shows that the user moves the blackpoint knob to the left along the multi-slider exposure tool 440 track. This operation has two effects: (1) the tonal range of the image is expanded and (2) all of the other knobs except the whitepoint knob are pulled along the track in response to the blackpoint knob being moved.

This blackpoint knob operation has the effect of expanding the tonal range of image values for the image. In particular, moving the blackpoint knob to the left linearly deepens the black level of the image pixels. This linear expansion of black levels for the image is conceptually illustrated in the image displayed at the second stage, which has pixels spread out over different black level tonal ranges. For example, different areas of the image roughly fall within a darker tonal sub-range of the image's tonal range (dark region), a middle tonal sub-range (midtone region), and a light tonal sub-range (light region). The operation associated with expanding the tonal range of image values causes the dark region to become considerably darker (e.g., the mountain), the midtone region to become slightly darker (e.g., the body of the car and the ground), and the light region to remain approximately as light as before the operation (e.g., the sky behind the mountain).

In this case, the blackpoint indicator 740 of the histogram 728 at this stage reflects the linear expansion of the tonal range of the image. In particular, the movement of the blackpoint indicator 740 along the tonal range of the histogram 728 corresponds to the movement of the blackpoint knob 450 along the track. Another graph view is shown with the response curve 729, where movement of the blackpoint knob 450 to the left causes the black cutoff point 770 shown on the response curve 729 to be moved to a lower Y-axis coordinate position, in accordance with the expanded tonal range of the image.

In addition to expanding the tonal range of the image, the blackpoint knob operation has the effect of moving all the other knobs of the multi-slider exposure tool except for the whitepoint knob 470. Thus, in addition to the blackpoint indicator, the brightness indicator and the two contrast indicators are pulled along the tonal range of the histogram 728 when the blackpoint indicator moves to the left. However, as shown in the histogram 728 and the response curve 729, the whitepoint indicator remains unaffected in the same position at the end of the tonal range of the histogram.

At the third stage 730, the user moves the blackpoint knob to the right along the track. In this case, the user moves the blackpoint knob approximately half-way back to the original position of the blackpoint knob. The other knobs (except for the whitepoint knob) are pushed along the track in response to this movement of the blackpoint knob (similar to being pulled with the blackpoint knob at the second stage). However, unlike the operation at the second stage which expands the tonal range, the operation associated with moving the blackpoint knob to the right along the track reduces the tonal range of image values.

As shown in the displayed image at this stage, some areas of the image are lightened in response to the repositioning of the blackpoint knob. For example, the ground and the body of the car are now white (returning to white as shown at the first stage), the mountain is considerably less dark than at the second stage, and slightly less dark than at the first stage, and the hubcaps on the car wheels are now white. Thus, the deepest black level shown at this stage is represented by the mountain, which is considerably lighter than either of the first two stages.

The histogram 738 illustrates the reduced tonal range after the blackpoint indicator is moved right. The dotted curve represents the tonal range and attributes of the image prior to moving the blackpoint knob inward, while the solid line represents the tonal range and attributes of the image after the blackpoint knob is moved. Furthermore, the other knobs (except for the whitepoint knob) are moved in response to the blackpoint repositioning. In the other graph view, the response curve 739 shows the black cutoff being moved upward in response to the user moving the blackpoint knob to the right. This illustrates that the tonal range over which other operations may affect the image is reduced.

Thus, as shown in FIG. 7, moving the blackpoint knob along the multi-slider exposure tool 440 track causes expansion or refraction of the tonal range of image pixel values by deepening or raising (e.g., brightening) the black levels in the image. While the tonal range of the image is modified by moving the blackpoint knob, as shown in FIG. 7, in some embodiments, moving the whitepoint knob modifies the tonal range of the image. In some embodiments, the tonal range of the image pixel values are changed based on movements of the whitepoint knob that raise (e.g., increase) or dampen (e.g., decrease) the white levels in the image.

2. Move Whitepoint Knob

Figure 8:
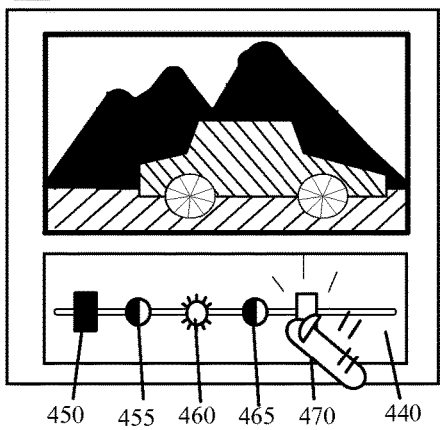
FIG. 8 conceptually illustrates another single slider operation of the multi-slider exposure tool for changing the white level of an image in some embodiments.
Figure 8:
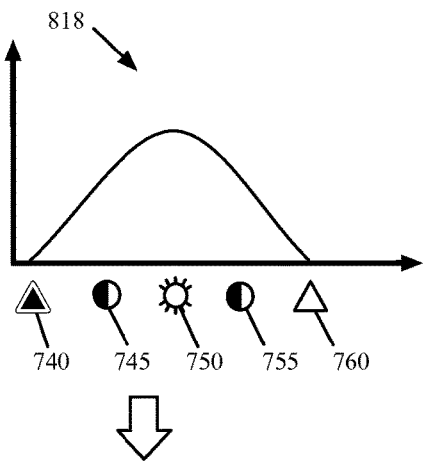
Figure 8:
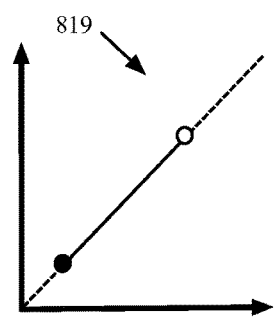
Figure 8:
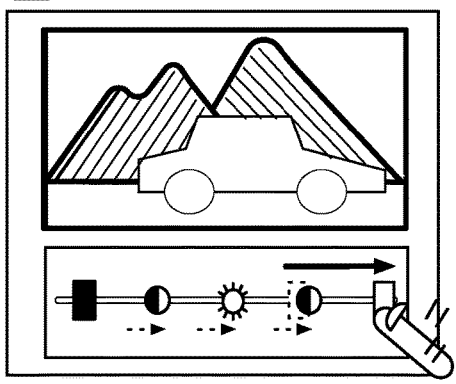
Figure 8:
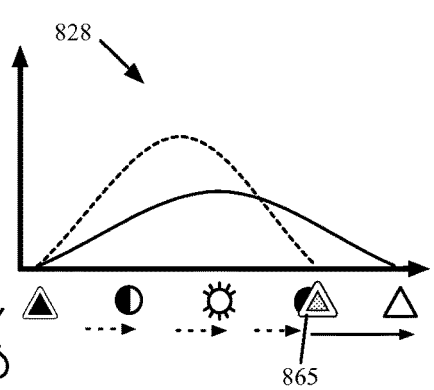
Figure 8:
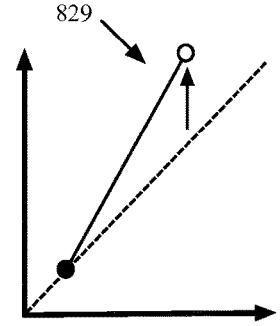
Figure 8:
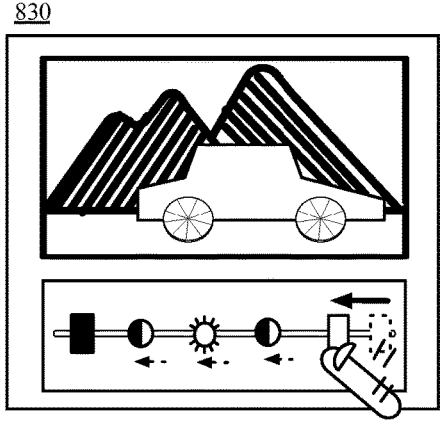
Figure 8:
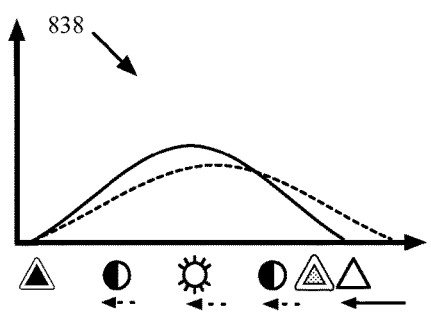
Figure 8:
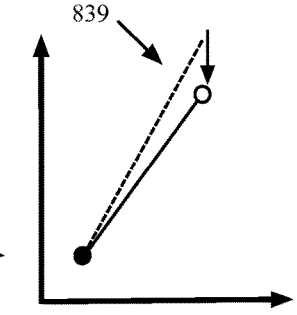

FIG. 8 conceptually illustrates another single slider operation of the multi-slider exposure tool 440 for changing the appearance of an image in some embodiments. This figures illustrates in three stages (810-830) moving the whitepoint knob 470 along the track of the multi-slider exposure tool 440 for adjusting the appearance of an image.

The whitepoint knob 470 in some embodiments is for adjusting the lightness of the image. When a user moves the whitepoint knob 470 to the right along the track, the image is brightened (e.g., increased white or lighter). Moreover, moving the whitepoint knob 470 to the right expands the tonal range of the image in some embodiments.

The first stage 810 shows the multi-slider exposure tool 440 with an initial configuration of knobs associated with the displayed image (shadowed car, hubcaps, and ground, white sky, black mountain, etc.). At this stage, a user selects the whitepoint knob for performing an operation that adjusts the tonal range of values for the image. As mentioned above, this tonal range is represented in the histogram 818 by the span of image values from the blackpoint indicator 740 to the whitepoint indicator 760. In addition, the response curve 819 is shown with black and white cutoff points.

The second stage 820 shows that the user moves the whitepoint knob 470 to the right along the multi-slider exposure tool 440 track. As shown, the gray indicator 865 marks the position of the whitepoint knob 470 in the initial configuration at the first stage. This operation expands the tonal range of the image and pulls all of the other knobs (except for the blackpoint knob) along the track. As shown, the image now appears brighter (the car, hubcaps, and ground are now all white, and the mountain is less dark). However, not all regions of the image have changed by the same amount. For example, the mountain still has some residual black tones (e.g., the lines representing the deepest blacks of the image illustrated at the first stage). This linear effect on different regions is similar to the effect of moving the blackpoint knob. Thus, expansion of the tonal range is possible by moving the whitepoint knob along the multi-slider track to the right.

Furthermore, at this stage, the dotted line of the histogram 828 indicates the former distribution of image values over the former tonal range, while the solid line indicates the tonal range and distribution of values after moving the whitepoint knob to the right. As mentioned above, the tonal range is increased because the other endpoint knob (i.e., the blackpoint knob) is not moved right at this stage. Therefore, the pixel values are redistributed over a larger tonal range of values.

Moreover, the response curve 829 illustrates the linear expansion of the tonal range, as shown by the white cutoff moving directly up from its position at the first stage. In addition, this causes the slope of the response curve to increase.

At the third stage 830, the user moves the whitepoint knob 470 to the left along the track. This movement is about half way back to the original whitepoint position, shown by the gray indicator 865. This effect reduces the expanded tonal range of image values, which is illustrated in the graphs (histogram 838 and response curve 839) at the third stage. The movement to the left is about half-way back to the original whitepoint position at this stage. In this case, the image appears slightly darker in some areas (e.g., the hubcaps and the mountain). Also, as described above, the other knobs (except for the blackpoint knob) are pushed in along the track in response to this movement of the whitepoint knob.

Thus, as shown in FIGS. 7 and 8, moving the blackpoint or whitepoint knob left or right, respectively, along the multi-slider exposure tool 440 track causes expansion of the tonal range of the image.

3. Move Brightness Knob

Figure 9:
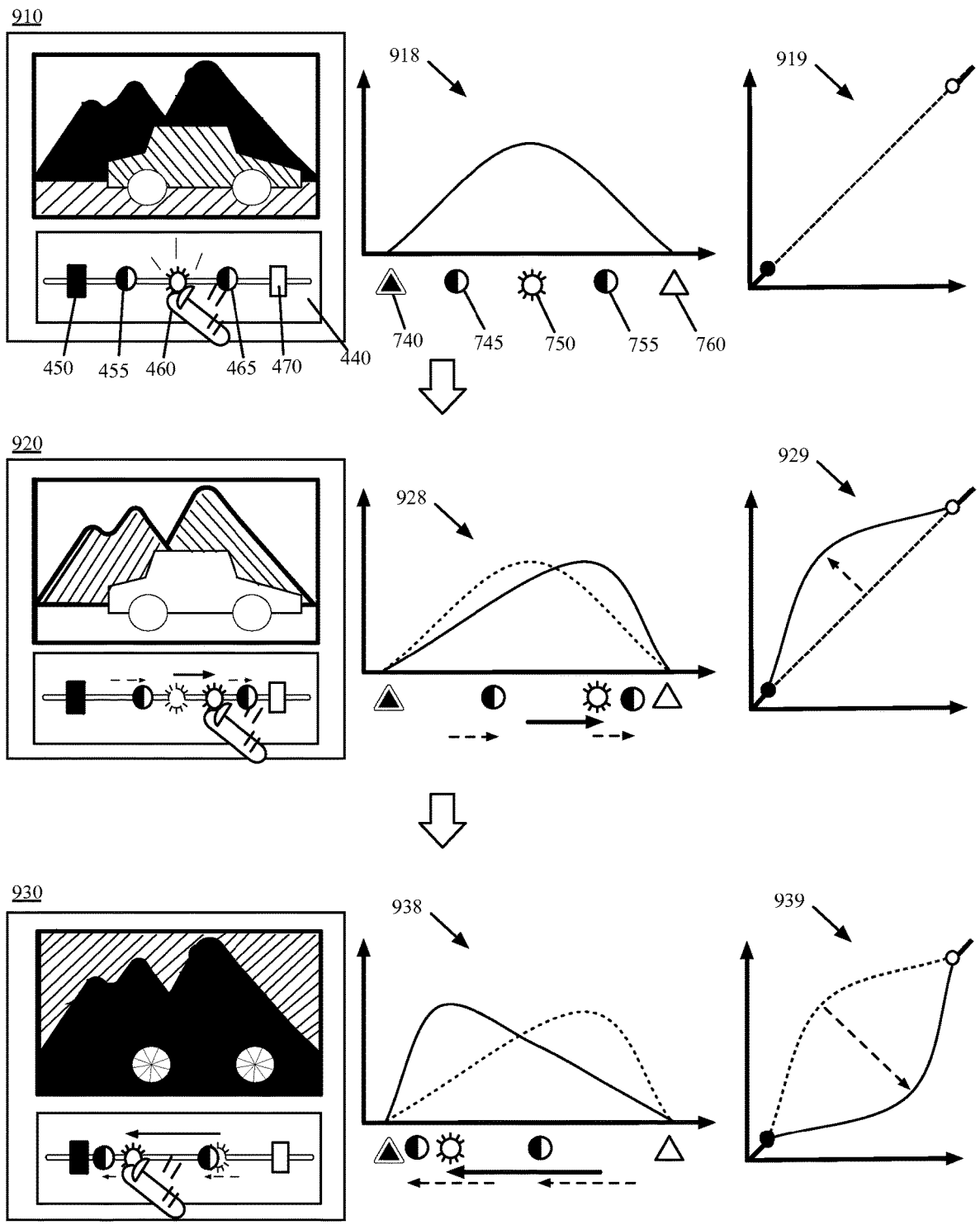
FIG. 9 conceptually illustrates another single slider operation of the multi-slider exposure tool for changing the overall brightness of an image in some embodiments.

In some embodiments, the overall brightness of the image pixel values are changed by increasing or decreasing the brightness in the image by modifying the position of the brightness knob. FIG. 9 conceptually illustrates another single slider operation of the multi-slider exposure tool 440 for changing the appearance of an image in some embodiments. This figures illustrates, during three stages (910-930), the multi-slider exposure tool 440 similar to that shown in FIG. 7, except that this figure illustrates moving the brightness knob 460 along the track for adjusting the overall brightness of the image.

The brightness knob 460 in some embodiments is for adjusting the overall brightness of the image. The brightness knob 460 moves left and right along the track between the blackpoint and white point knobs to adjust brightness of the image between a tonal range of image brightness from the darkest to lightest image areas.

At the first stage 910, a user selects the brightness knob 460 of the multi-slider exposure tool 440 in order to perform an operation that changes the overall brightness of the displayed image. As mentioned above, adjusting brightness of the image by moving the brightness knob of the multi-slider exposure tool does not affect the tonal range of image values for the image, but instead, simply modifies pixel values over the tonal range. The histogram 918 at this stage shows the tonal range of the image, and the response curve 919 shows no change (because merely selecting the brightness knob does not change any pixel values).

At the second stage 920, the user moves the brightness knob to the right along the track of the multi-slider exposure tool. As shown, the image is lighter at this stage with the car, ground, and mountain appearing lighter.

However, this operation has not changed the tonal range in any way. The dotted line of the histogram 928 indicates the former distribution of image values. However, unlike those illustrated in the previous figures, the tonal range for this operation remains the same (e.g., the blackpoint and whitepoint indicates have not moved). Accordingly, the histogram 928 illustrates the shift in the brightness of the image pixels over the curve that is formed between the blackpoint indicator and the whitepoint indicator. Also, the response curve 929 appears convex to show the increased image values resulting from the change in brightness of the image (without modifying the tonal range).

At the third stage 930, the user moves the brightness knob far along the track to the left. This has the effect of reducing the overall brightness of the image. For example, the body of the car and the ground are now as black as the mountain, and the hubcaps and sky are darker than before the user moved the brightness knob left at this stage.

As in the second stage, this operation has not changed the tonal range of the image. Although it appears substantially darker, the range of pixel values remains defined by the blackpoint and whitepoint indicators of the histogram 938. Furthermore, the shift in brightness is shown by change in the curve formed by the distribution of pixel values. For example, the former curve (before the user reduces brightness) is shown by the dotted line and the current curve (after the user reduces brightness) is shown by the solid line. Also, the response curve 939 now appears concave to show the reduction in brightness values.

4. Move Contrast Knobs

Figure 10:
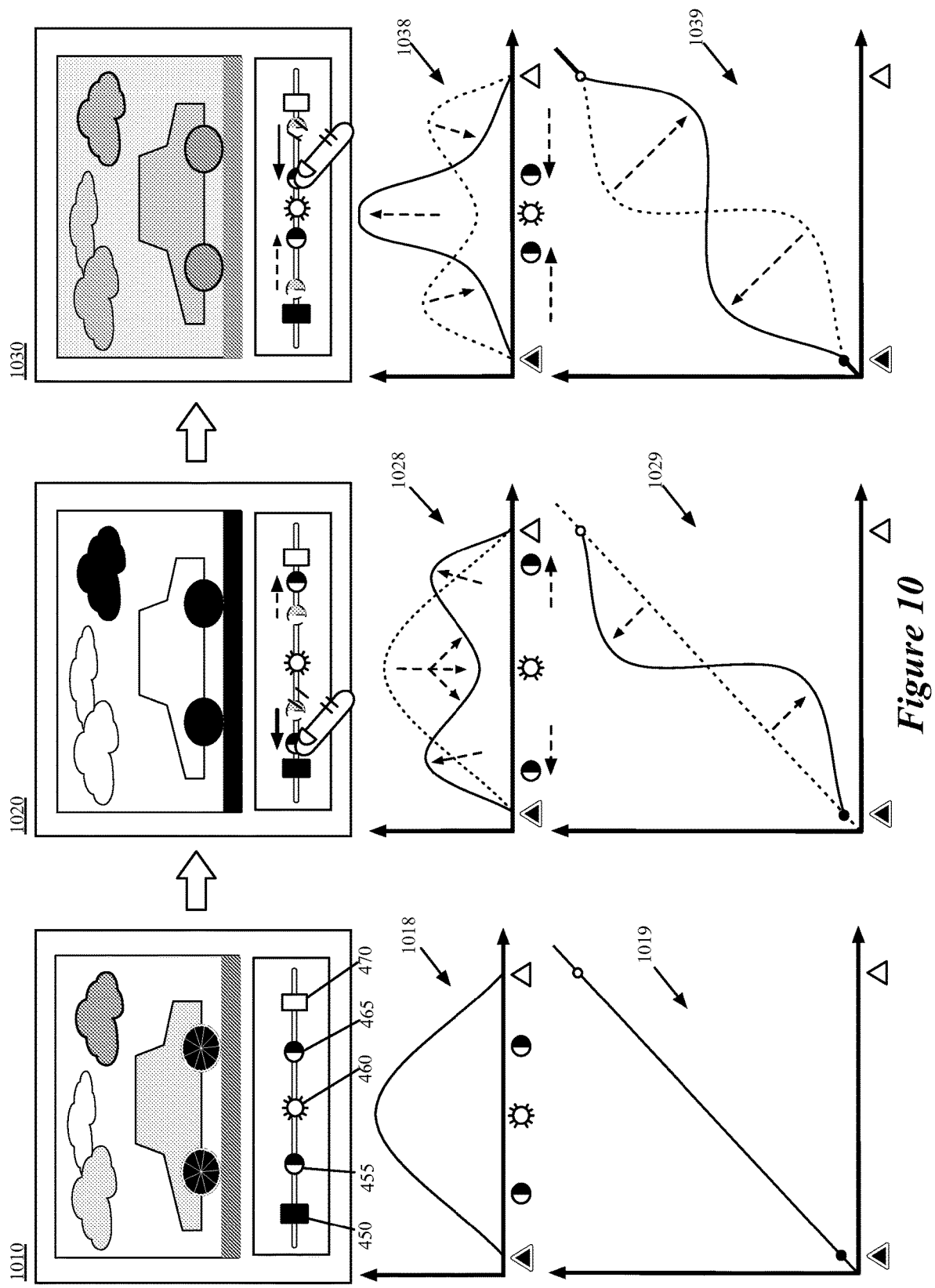
FIG. 10 conceptually illustrates another single slider operation of the multi-slider exposure tool for changing the contrast of an image in some embodiments.

In some embodiments, a user modifies the appearance of the image by adjusting the contrast of the image. FIG. 10 conceptually illustrates another single slider operation of the multi-slider exposure tool 440 for changing the contrast of an image in some embodiments. This figure illustrates, during three stages (1010-1030), the multi-slider exposure tool 440 similar to that shown in FIG. 7. However, this figure illustrates moving the contrast knobs 455 and 465 along the track for adjusting the contrast of the image.

The contrast knobs 455 and 465 in some embodiments are for adjusting image contrast. In particular, the contrast knob 455 is for increasing or reducing the darkness of areas in the image that are relatively dark, while the contrast knob 465 is for increasing or reducing the lightness of areas of the image that are relatively light. The contrast knobs 455 and 465 move in unison in some embodiments. In other words, when the user repositions one of the contrast knobs, the other contrast knob is automatically repositioned by the media editing application. In some embodiments, the automatic movement is in the opposite direction of the contrast the user moves. In this way, contrast adjustments can be balanced between dark and light regions.

The first stage 1010 shows the multi-slider exposure tool 440 with an initial configuration of knobs associated with the displayed image (e.g., having different objects in light, dark, and midtone regions). The histogram 1018 and response curve 1019 shown below the displayed image and the multi-slider exposure tool 440 are similar to those shown in the previous figures, with a set of indicators that represent the tonal range and attributes of the image. In this case, the contrast in the image is balanced between the endpoints.

At the second stage 1020 the user selects the dark side contrast knob 455. The user at this stage moves the contrast knob 455 along the track to the left. This operation in some embodiments increases the amount of contrast in the dark regions of the image. Furthermore, as shown at this stage, the other contrast knob (in the light region) is automatically moved by the media editing application. In this case, the light contrast knob is moved in the opposite direction (e.g., left) of the dark contrast knob. In some embodiments, the automatically moved contrast knob moves in the opposite direction in order to balance the contrast adjustment over all regions (light, dark, and midtone). As shown in the image at this stage, the contrast adjustment results in a starker appearance (one black cloud and two white clouds, a white car and black tires, and a white background and black ground).

As shown by the arrows in the histogram 1028 at this stage, the contrast operation increases the blackness of the pixels in the dark region, decreases the amount of pixels within the midtone range, and increases the brightness of the pixels in the light region. In addition, the response curve 1029 shown below the histogram further illustrates the contrast operation on the pixel values of the image. In this example, the image values for pixels in the dark region are reduced (i.e., darkened), while the image values for pixels in the light region are increased (i.e., brightened). This effect forms an S-curve.

At the third stage 1030, the user selects the other contrast knob 465 (in the light region). The user moves the selected contrast knob 465 to the left in order to decrease image contrast. This movement, like the movement of the contrast knob 455 at stage two, causes the media editing application to automatically move the other contrast knob 465 in the opposite direction. The effect of this movement is shown in the appearance of the image at this stage, with shading of the image in the midtone region (i.e., the car and tires, sky and ground, and the clouds all being different shades of gray).

This reduction in contrast is represented by the histogram and response curve 1038 and 1039. where the pixel values bunch together near the middle after the user moves the contrast knob, and the S-curve inverting as the result of adjusting a high-contrast image into a low-contrast image.

Having discussed several different kinds of single knob operations, the next several examples discuss specific scenarios for the blackpoint and whitepoint knobs.

D. Special Treatment of Black Cutoff and White Cutoff

In some embodiments, the black cutoff and white cutoff are treated differently in relation to the other knobs of the multi-slider exposure tool.

1. Clip Indicators

Figure 11:
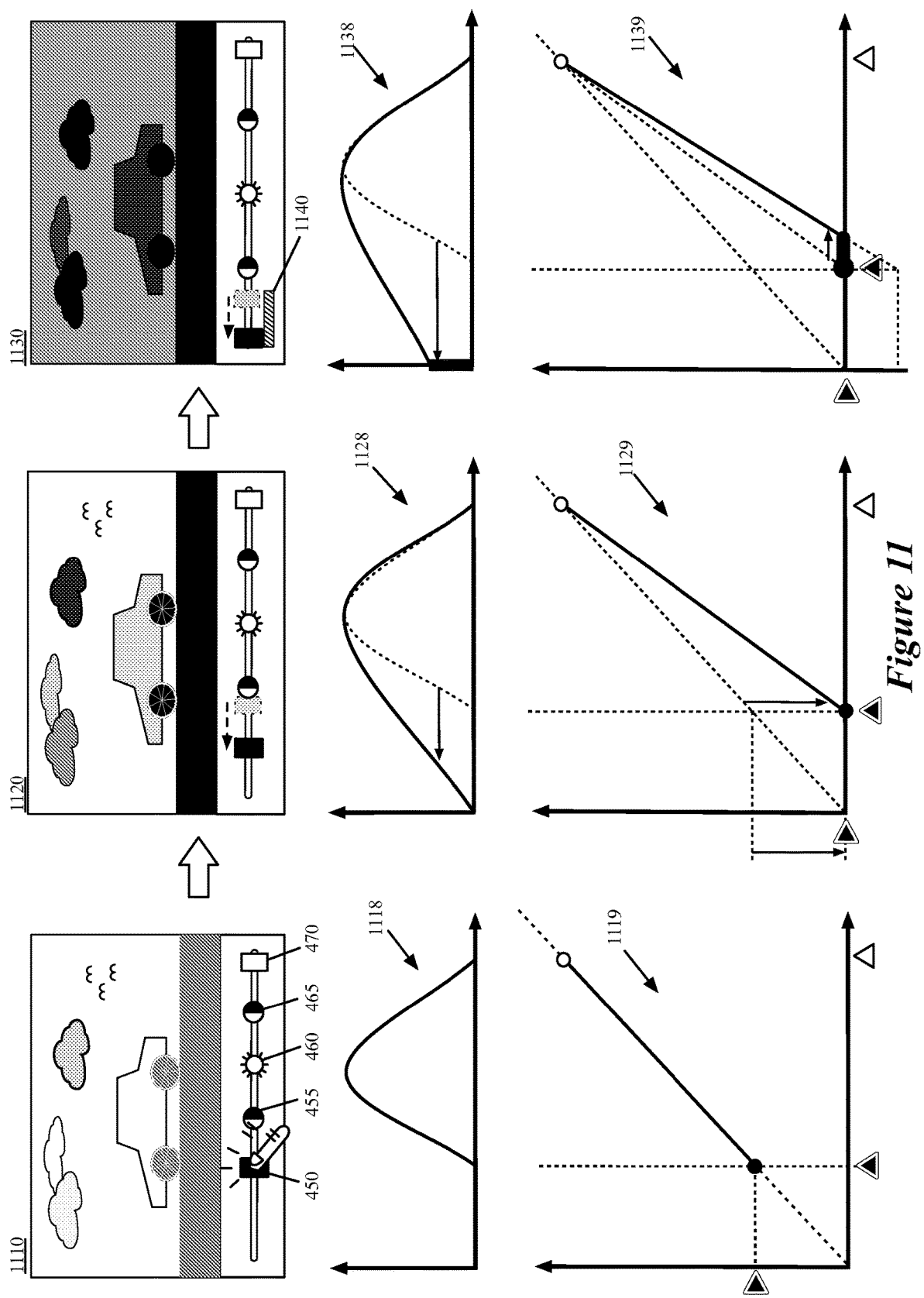
FIG. 11 conceptually illustrates slider movements of the multi-slider exposure tool that result in clipping in some embodiments.

FIG. 11 conceptually illustrates slider movements of the multi-slider exposure tool 440 that result in clipping in some embodiments. This figure shows a multi-slider exposure tool similar to that shown in FIG. 9. In this figure, however, the multi-slider exposure tool 440 is illustrated during three stages (1110-1130) associated with moving the blackpoint knob beyond a threshold for the image. As shown in this figure, the multi-slider exposure tool includes a clipping indicator 1140.

As described above in relation to FIG. 6, an image has a tonal range of image pixel values, which is indicated by the span between the blackpoint and whitepoint knobs 450 and 470 (or between the black and white indicators of the corresponding histogram) for an image displayed in the preview display area 420. In some cases, the tonal range is the initial visible tonal range of the image. In other words, the image may have an initial visible tonal range that is reflected in the positioning of the blackpoint and whitepoint knobs of the multi-slider exposure tool 440. For example, the initial configuration of the multi-slider exposure tool for the image displayed in the preview display area 420 at each stage (610-630) is the initial visible tonal range of the image. In some cases, the initial visible tonal range of the image may be expanded by moving the blackpoint knob left or the whitepoint knob right along the multi-slider track.

In some embodiments, the image may also have a permissible tonal range of values that is the same as or greater than the initially visible tonal range. Thus, the visible tonal range of the image may be a sub-range of the permissible tonal range, which spans a greater range of image pixel values for displaying the image.

The permissible tonal range of the image, in some embodiments, acts as a constraint on the operation of the multi-slider exposure tool 440. In particular, moving the blackpoint knob 450 (or whitepoint knob 470) beyond the permissible tonal range distorts the image in different (possibly unintended) ways. Distorting the tonal attributes of an image by making adjustments beyond the permissible tonal range is referred to here as clipping.

The clipping indicator 1140 is a graphical representation of a limiting value (e.g., a threshold) based on the range of permissible image values for an image. In some embodiments, the graphical representation is displayed approximately below the multi-slider knob (e.g., the blackpoint knob 450 or the whitepoint knob 470) that is moving beyond the permissible tonal range of the image. In some embodiments, moving the blackpoint or whitepoint knob past the permissible range threshold causes the clipping indicator 1140 to appear below the knob.

In some embodiments, black and white limits are determined for the image when the image is selected for displaying in the preview display area 420. In some embodiments, a data structure that stores the image also stores a set of metadata related to tonal attributes, including the permissible tonal range of the image. In some embodiments, the black limit represents a limiting value at which no deeper black level is attainable for the image. Expanding the tonal range beyond the black limit causes tonal distortion of the image. For example, visible details of some areas of the image may get crushed into black (e.g., the details are not visible). Likewise, the white limit represents a limiting value at which no brighter white level is attainable for the image. Expanding the tonal range beyond the white limit also causes image distortion. For instance, visible details of some areas of the image may get washed out to white (e.g., the details are not visible).

The tonal range of permissible image values is determined differently for different images in different scenarios. In some embodiments, the black and white limits are based on a data format (e.g., RAW, JPEG, etc.) in which an image is captured. Specifically, the black and white limits in some embodiments are based on the bit-depth (e.g., 8 bits per color channel, 12 bits per channel, 14 bits per channel, etc.) of the captured image format. For example, an image captured of a particular scene in RAW format (e.g., 12-bit or 14-bit RAW format) may have a greater permissible tonal range of image values than an image captured of the same particular scene in JPEG format (e.g., 8-bit). The black and white limits may also be based on natural visual qualities of the scene (e.g., bright or dim lighting, existence or lack of shadows or highlights, etc.) being captured. For example, an image of a scene with abundant lighting captured in a particular format may have a greater permissible tonal range of image values than an image of a different scene with limited lighting captured in the same particular format.

The first stage 1110 shows the multi-slider exposure tool 440 with an initial configuration of knobs associated with a displayed image. As illustrated, the displayed image has items in different tonal ranges. For example, the ground, the car wheels, and a cloud are within a darker tonal sub-range, while the sky, the body of the car, and some other clouds are within a lighter region. Furthermore, different details are visible (e.g., the car wheels and the birds in the sky). For this image, the blackpoint and whitepoint knobs 450 and 470 correspond to the blackpoint and whitepoint of a histogram 1118 representing the tonal range of image values of the image. As shown at this stage 1110, a black and white indicators are illustrated subjacent to the histogram 1118 to indicate the relative positions of the blackpoint and whitepoint.

A response curve 1119 is also shown at this stage with black and white cutoff points, which correspond to the blackpoint and whitepoint knobs 450 and 470 of the multi-slider exposure tool 440. The response curve maps input image values to output image values. Black and white input markers are illustrated subjacent to the response curve 1119 to provide a visual indication of a set of input image values for the image. Also, to illustrate the output black value, a black indicator is displayed adjacent to the side of the response curve 1119. For the image displayed at this stage 1110, the input black value (i.e., indicated by the black input marker along the X-axis) and output black value (i.e., indicated by the black output marker along the Y-axis) are determined by the response curve 1119. In this case, the user has not adjusted the image (e.g., the user has only selected the blackpoint knob 450 at this stage). Therefore, the response curve 1119 is equidistant between the X-axis and Y-axis (e.g., 45° angle) to indicate that each input image value is output at the same value. In other words, no change.

The second stage 1120 shows that the user moves the blackpoint knob to the left along the track of the multi-slider exposure tool 440. As described above in relation to FIG. 7, this operation expands the tonal range of image values displayed for the image. In particular, the displayed image now appears with several black items (e.g., the ground, the wheels, a cloud, etc.). Other items are slightly darker, and still other items are white. Furthermore, details are still visible in the image (e.g., the hubcaps of the wheels and the birds in the sky).

In the histogram 1128 at the second stage 1120, the black indicator is repositioned to the left. Thus, the tonal range is shown between the black indicator (now positioned at the origin of the X-axis and Y-axis) and the white indicator (unchanged). To indicate the prior position of the black indicator, a gray indicator is shown subjacent to the histogram 1128. Also, a partially-dashed curve is shown in the histogram 1128 to indicate the original curve of the histogram 1118 shown at the first stage 1110.

In the response curve 1129, the black input marker is unchanged while the black output marker moves down the Y-axis to reflect the leftward repositioning of the blackpoint knob along the track. Accordingly, the black cutoff point moves down in order to reformulate the response curve 1129. The original response curve 1119 (e.g., before the user moves the blackpoint knob) is shown as a dashed line at this stage, and the resulting response curve (e.g., after the user moves the blackpoint knob) is shown as a solid line. This resulting response curve 1129 has a steeper slope than the slope of the original response curve 1119. The slope is steeper because the expansion of the image tonal range is linear from the black cutoff point to the white cutoff point.

At the third stage 1130, the user moves the blackpoint knob 450 further to the left along the track. However, unlike the operation at the second stage 1120, which expands the tonal range as the user moves the blackpoint knob to the left, the operation associated with moving the blackpoint knob 450 further to the left along the track does not expand the tonal range of image values at this stage. Instead, this operation results in image distortion by crushing details from the pixels made black. In this case, the clipping indicator 1140 is displayed below the multi-slider exposure tool 440 to indicate that the movement of the blackpoint knob 450 is beyond the permissible tonal range of image values for the image.

The effect of clipping at this stage is shown by the appearance of the image, which is considerably darker than in either of the first two stages. This darkening of the image overall did not darken any image items that were already black at the second stage. Thus, the ground, the car wheels, and the black cloud shown at the second stage 1120 are still the same level of black in the third stage. The difference now is that several image items are black, including the ground, the wheels, the body of the car, and the clouds. These items had varying levels of darkness in the initial configuration for the image at the first stage, but now all appear with the same level of black. Furthermore, the sky is dark gray at this stage, whereas it was white in both of the first and second stages. Also, the details previously visible on the car wheels and in the sky (e.g., the flying birds) are no longer visible (e.g., due to distortion of fine image details) at this stage.

As shown in the histogram 1138 at this stage, the black indicator is not repositioned to the left because the black indicator was already at the origin before the user moved the blackpoint knob past the tonal range threshold. However, the histogram 1138 graph is repositioned as if further expansion was possible. Instead, as shown in the third stage, several pixels are repositioned at the lowest X-axis value (e.g., corresponding to the blackest black in the tonal range of image values). This operation darkens many pixels of varying degrees of darkness to the darkest black level in the tonal range. For example, the body of the car had midtone image values at the second stage 1120, but was set to black at the third stage 1130. Also, the details that were visible on the wheels and in the sky at the first and second stages are not visible in the third stage.

In the response curve 1139, the black input and output markers are unchanged. However, in response to the user moving the blackpoint knob 450 further to the left (i.e., clipping beyond the permissible tonal range), the response curve 1139, is shown with a first short section along the X-axis, and a reformulated slope to the whitepoint cutoff. In this case, the first short section illustrates that several input image values are mapped to the same output image value (i.e., the darkest black value).

2. Dual Operation Knobs

In some embodiments, multiple different tonal adjustment operations are associated with a particular knob. Such a knob is referred to here as a dual operation knob. In some embodiments, the multi-slider exposure tool 440 of FIG. 4 includes multiple dual operation knobs that cause different tonal adjustments depending on the direction of movement along the track of the multi-slider exposure tool 440.

i. Blackpoint Out and Shadow Recovery in

Figure 12:
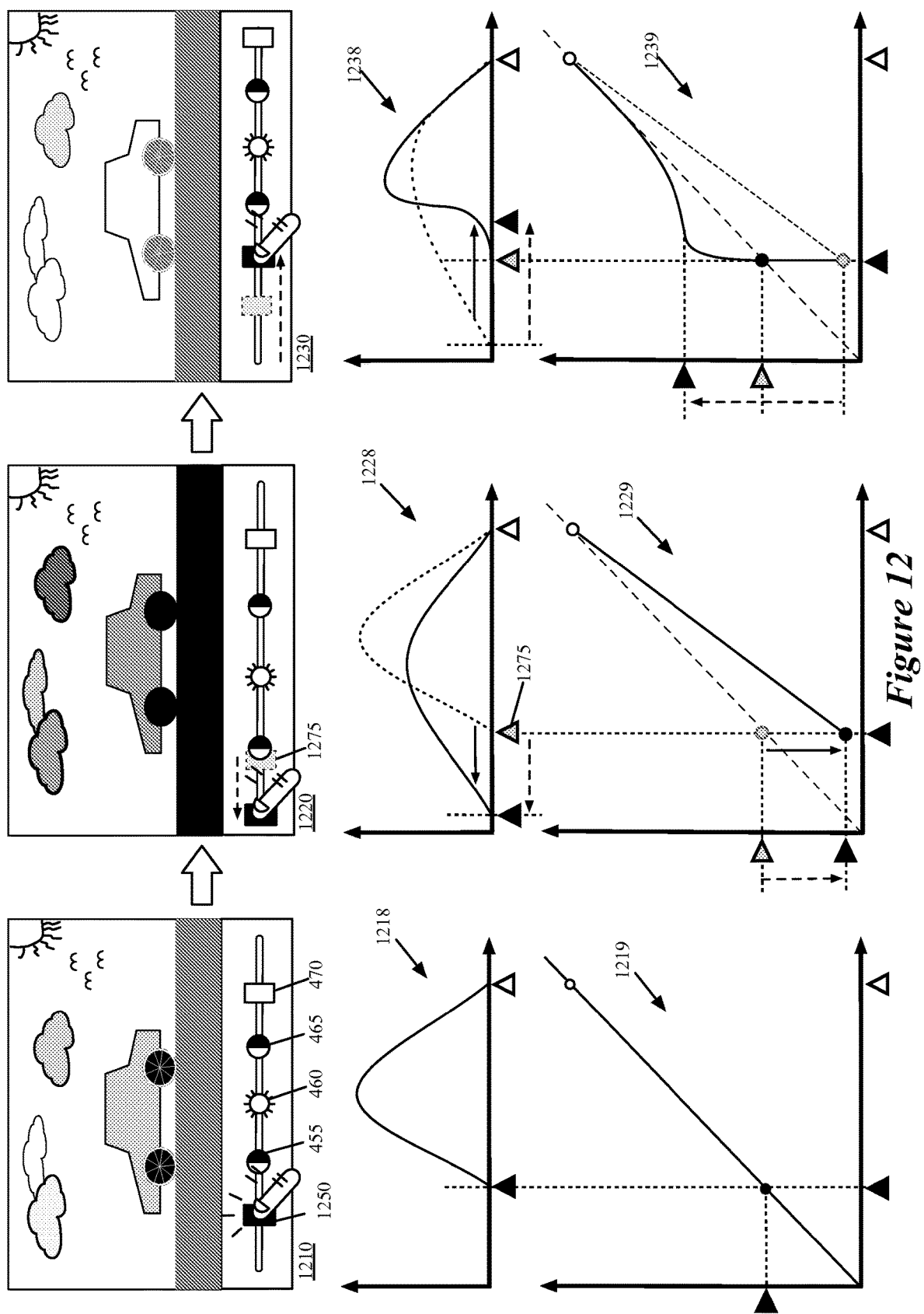
FIG. 12 conceptually illustrates slider movements of a dual operation slider knob for expanding the tonal range of the image and lifting shadows of dark regions of the image in some embodiments.

FIG. 12 conceptually illustrates the effect of different slider movements of a dual operation knob associated with different operations in some embodiments. The blackpoint/shadow knob 1250 shown in this figure is similar to the blackpoint knob 450 shown in FIG. 11, except that in this figure the blackpoint/shadow knob 1250 is illustrated during three stages (1210-1230) associated with expanding the tonal range of the image and lifting shadows of dark tone regions of the image. In this figure, an initial blackpoint position 1275 is shown for indicating the position of the blackpoint/shadow knob 1250 in the initial configuration of the multi-slider exposure tool for the image.

As described above in relation to FIGS. 6 and 11, an image has an initial tonal range that is reflected in the positioning of the knobs of the multi-slider exposure tool 440. This initial tonal range may include different tonal sub-ranges (dark, light, and midtone sub-ranges). This range also includes the initial blackpoint position 1275. In some embodiments, the initial tonal range can be expanded by moving the blackpoint knob 450 to the left along the multi-slider track. However, in some embodiments, the initial tonal range cannot be reduced. In other words, the initial tonal range of the image is a fixed minimum tonal range of the image. Thus, the initial positions of the blackpoint and whitepoint knobs reflect the fixed tonal endpoint values of the minimum tonal range of the image. Therefore, in some embodiments, a dual operation knob is used in place of the blackpoint knob 450.

The blackpoint/shadow knob 1250 is for performing two different tonal adjustments depending on the position of the knob 1250 in relation to the initial blackpoint position 1275 and the direction the knob 1250 moves along the multi-slider track. In the first case, when the blackpoint/shadow knob 1250 moves outward away from the initial blackpoint position 1275 of the multi-slider track (e.g., moved to the left from its initial position), the knob 1250 adjusts the darkness of the image. In the second case, however, when the blackpoint/shadow knob 1250 moves inward past the initial blackpoint position 1275 (e.g., moved to the right from its initial position), the knob 1250 lifts shadows of the image. These two cases are further elaborated below, with the first case described first and the second case following after.

For the first case, as discussed above by reference to FIG. 7, the initial tonal range of the image can be extended by moving the blackpoint knob away from the initial blackpoint position 1275 of the multi-slider track in some embodiments. In doing so, the tonal range of the image is expanded to include lower image pixel values (e.g., deeper black appearance) than the lowest pixel values indicated by the initial tonal range.

On the other hand, after the tonal range is expanded the blackpoint/shadow knob 1250 can be moved back along the multi-slider track toward the initial blackpoint position 1275. Moving the blackpoint/shadow knob 1250 back in to any position up to the initial blackpoint position 1275 reduces the expanded range. When the blackpoint/shadow knob 1250 reaches the initial blackpoint position 1275, assuming no other tonal adjustments have been made when the tonal range was expanded, the range expansion is eliminated and image pixel values are reduced to the initial values in relation to the initial tonal range of the image.

Conversely, for the second case, when the blackpoint/shadow knob 1250 is moved past the initial blackpoint position 1275 in a direction toward the center of the multi-slider track (e.g., moved to the right along the track), the blackpoint/shadow knob 1250 is for recovering shadows (e.g., increasing dark pixel values) of the image. In this case, the range is fixed to the initial blackpoint position 1275, despite the apparent reduction in the tonal range. As described below, shadow recovery does not reduce the tonal range, but instead raises the image pixel values for a select set of pixels of the image.

In some embodiments, shadow recovery is an operation the media editing application performs for selectively lifting dark areas in a shadow region of the image when the blackpoint/shadow knob 1250 is moved inward along the track. The media editing application performs this operation, in some embodiments, by identifying the shadow region of the image and increasing image pixel values within the shadow region.

The shadow region is defined in different ways in different embodiments. In some embodiments, the shadow region may be predefined for the image in some embodiments. For instance, the pixels distributed in the darkest half or darkest one-third of the tonal range may be defined as the shadow region of the image. Alternatively, the shadow region, in some embodiments, is determined based on weighting factors related to the overall darkness or lightness of the image. For example, a shadow region for a relatively dark image may be defined over a greater number of pixels than a shadow region for a relatively light image.

In some embodiments, the media editing application increases image pixel values uniformly within the shadow region. Alternatively, the media editing application of some embodiments increases image pixel values proportionally across the shadow region. For example, the values of all the pixels in the shadow region may be uniformly increased in the shadow region. In other embodiments, the media editing application increases image pixel values non-proportionally within the shadow region. For example, the values of darker pixels in the shadow region may be increased more than the values of lighter pixels in the shadow region.

In some embodiments, the media editing application selects particular areas within the shadow region in which to perform shadow recovery. For example, the media editing application may select areas that are determined to have sufficient detail when exposed in lighter tonal ranges. The media editing application may then enhance the details within these areas by increasing the image pixel values uniformly, proportionally, or non-proportionally. In some embodiments, the media editing application uses an image mask to select the areas in the shadow region. In some cases, the image mask is generated based on user preference. For example, a user may indicate that shadow recovery should not be performed on a designated area of the image.

The operation of the blackpoint/shadow knob 1250 will now be described in terms of the three stages (1210-1230). At the first stage 1210, a user selects the blackpoint/shadow knob 1250 of the multi-slider exposure tool 440. As shown, the image has a tonal range of image values from white (e.g., the sky, a cloud) to black (e.g., the wheels), with varying midtone range (e.g., the ground, the car, the other clouds). The tonal range of image values is represented at this stage by the histogram 1218 (i.e., between the blackpoint and whitepoint indicators) and the response curve 1219 (i.e., between the black and white cutoff points).

At the second stage 1220, the user moves the blackpoint/shadow knob 1250 to the left, which deepens the appearance of dark areas of the image. According to the blackpoint/shadow knob 1250 movement by the user, the black indicator of the histogram 1228 moves left. As shown, this increases the tonal range of image values for the image. In addition, the initial blackpoint position 1275 is indicated on the histogram 1228 by the gray triangle 1272. This movements of the blackpoint/shadow knob 1250 redistributes the pixels of the image within the expanded range. As shown, the curve over the tonal range appears to be reduced or flattened out. This reflects a variation in the frequency of pixels (shown along the Y-axis) for many of the individual image pixel values. This pixel frequency variation is the result of the image pixel values being redistributed along the expanded curve (e.g., more positions to fill with the same number of pixels).

In the response curve 1229, the repositioned blackpoint/shadow knob 1250 is reflected in the movement of the black cutoff point to a lower image value, as shown by the black triangle along the Y-axis of the response curve 1229. In some embodiments, moving the black cutoff point down causes the response curve 1229 to be reformulated. In this case, the reformulated curve (solid line) has a greater slope than the original response curve 1219 (dashed line). Also, the expansion of the tonal range by changing the black cutoff point is a linear operation that affects all of the tonal image values of the image.

At the third stage 1230, the user moves the blackpoint/shadow knob 1250 to the right along the multi-slider track 440 past the initial blackpoint position at the gray indicator 1272 in order to lift shadows in the dark region of the image. As described above, this operation is different from an operation that deepens the black levels of the image and expands the tonal range of the image. In some embodiments, as noted above, a shadow region is determined for performing the shadow lifting operation. In some cases, the operation selectively recovers details in shadow regions, as described in detail above. This is performed, for example, by using a mask for dark areas of the image that are determined to have sufficient detail to display.

As shown in the histogram 1238, the expanded tonal range is reduced when the user moves the blackpoint/shadow knob 1250 to the right along the multi-slider track at the third stage 1230. Comparatively, the tonal range between the initial blackpoint position (gray triangle indicator 1272) and the whitepoint indicator is not reduced during this movement. Instead, the media editing application performs shadow recovery within the shadow region of the image. As shown in the histogram 1238, the curve has a flat slope between the initial blackpoint position at the gray indicator 1272 and the position of the black indicator. This span of the curve constitutes the shadow region. As shown, very few pixels of the image are represented in the curve in the shadow region. However, the slope of the curve abruptly increases after the position of the black indicator (i.e., after the shadow recovery region). Thus, as shown here, the shadow recovery operation adjusts the histogram 1238 without reducing the tonal range of the image.

In addition, the response curve 1239 at the third stage 1230 shows that shadow recovery is a non-linear operation. In particular, the curve redistributes the pixels of the image differently based on the input value of the pixel. For instance, each of a relatively small sub-range of input pixel values starting at the X-axis position of the black indicator to quickly-increasing (e.g., the steep increase in the curve) output pixel values. The curve then maps several more input pixel values to output pixel values over the shadow region. Finally, the curve maps the input values of the remaining pixels to the same values as the output pixel values (i.e., the response curve 1239 converged with the initial curve). In other words, beyond the shadow region there is no difference between a pixel's input value and its output value.

ii. White Out and Highlight in

Figure 13:
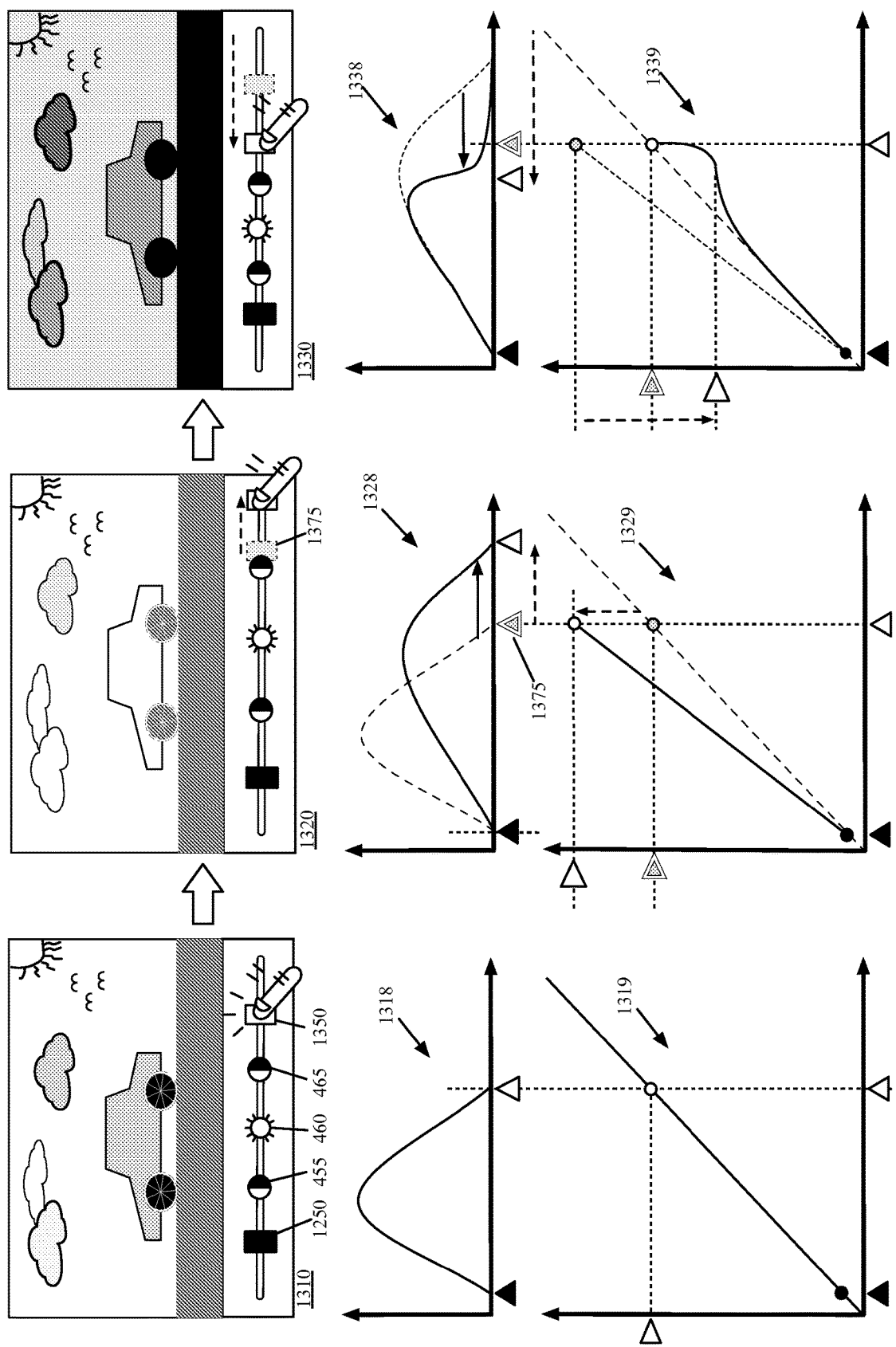
FIG. 13 conceptually illustrates slider movements of another dual operation slider knob for expanding the tonal range of the image and reducing highlights of light regions of the image in some embodiments.

FIG. 13 conceptually illustrates the effect of different slider movements of a dual operation knob associated with different operations in some embodiments. The whitepoint/highlight knob 1350 shown in this figure is similar to the blackpoint/shadow knob 1250 shown in FIG. 12, except that in this figure the whitepoint/highlight knob 1350 is illustrated during three stages (1310-1330) associated with expanding the tonal range of the image from the lighter region of the tonal range and attenuating highlights in light regions of the image. In this figure, an initial whitepoint position 1375 is shown for indicating the position of the whitepoint/highlight knob 1350 in the initial configuration of the multi-slider exposure tool 440 for the image.

As described above, an image has an initial tonal range that includes the initial whitepoint position 1375. In some embodiments, the initial tonal range can be expanded by moving the whitepoint/highlight knob 1350 to the right along the multi-slider track. In a manner similar to shadow recovery, highlight attenuation of some embodiments is also possible by using another dual operation knob in place of the whitepoint knob 470. Like the blackpoint/shadow knob 1250, the whitepoint/highlight knob 1350 is for performing two different tonal adjustments depending on its position and the direction of movement. That is, moving the whitepoint/highlight knob 1350 to the right increases the tonal range of the image, but moving the whitepoint/highlight knob 1350 to the left attenuates highlights of the image (but the tonal range is not reduced).

In some embodiments, highlight attenuation is an operation the media editing application performs for tempering or reducing particularly distinctive bright areas of an image relative to surrounding areas of the image (e.g., the glare reflected off a car window or the sheen of a person's forehead). The media editing application performs this operation, in some embodiments, when the whitepoint/highlight knob 1350 moves left past the initial whitepoint position 1375 along the multi-slider track.

Like the shadow region, the highlight region provides the sub-range region over which the highlight reduction operation is performed by the media editing application. The operation of the whitepoint/highlight knob 1350 will now be described in terms of the three stages (1310-1330).

At the first stage 1310, a user selects the whitepoint/highlight knob 1350 of the multi-slider exposure tool 440. Like the image shown at the first stage of FIG. 12, the tonal range of image values of the image is shown by the histogram 1318 and the response curve 1319.

At the second stage 1320, the user moves the whitepoint/highlight knob 1350 to the right, which expands the tonal range of the image. The whitepoint indicator of the histogram 1328 also moves right based on the whitepoint/highlight knob 1350 movement. While the leftward movement of the blackpoint/shadow knob 1250 increased the tonal range of the image from the dark region of the image, the rightward movement of the whitepoint/highlight knob 1350 in this figure increases the tonal range from the light region of the image.

The histogram 1328 and response curve 1329 at this stage are similar to the histogram 1228 and response curve 1229 shown in the second stage of FIG. 12. However, instead of extending the tonal range in the histogram by moving the blackpoint indicator, in this case the whitepoint indicator is moved right. Furthermore, the response curve reformulates the curve such that the adjustment is performed in the whitest region down to the black cutoff point.

At the third stage 1330, the user moves the whitepoint/highlight knob 1350 to the left along the track. This movement has the effect of reducing the tonal range back to the initial tonal range of the image. However, like in FIG. 12, this reduction in tonal range is limited. Beyond the initial whitepoint position 1375, the media editing application performs highlight attenuation or reduction. For example, an image of a car may have glare from the sun reflecting off a window. When the tonal range is expanded, all of the pixel values over the image increase linearly. When the user moves the whitepoint/highlight knob 1350 back (i.e., left), all of the pixel values over the image decrease linearly with the movement. However, as the whitepoint/highlight knob 1350 moves past the initial whitepoint position 1375, the media editing application selectively reduces highlights of the image. In this case, the glare reflecting off the car window may be reduced, while the overall brightness of other areas of the car does not decrease. As noted above, the media editing application may use a mask to selectively reduce highlights in the highlight region of the image.

As in the second stage 1320, the histogram 1338 and response curve 1339 at this stage 1330 are similar to the histogram 1238 and response curve 1239 shown in the third stage 1230 of FIG. 12. However, instead of reducing the tonal range down to the initial tonal range of the image, and then lifting shadows in the image, in this case the whitepoint/highlight knob 1350 is moved left to initially reduce the expanded tonal range back to the initial tonal range of the image, and then to selectively reduce highlights in the highlight region of the image.

Having discussed special treatment cases of the black and white cutoffs, the next example describes the effect of multiple slider knob movements when the shadows are lifted in the image by moving the knob 450 to the right along the track.

3. Fixed Black and White Cutoffs

Figure 14:
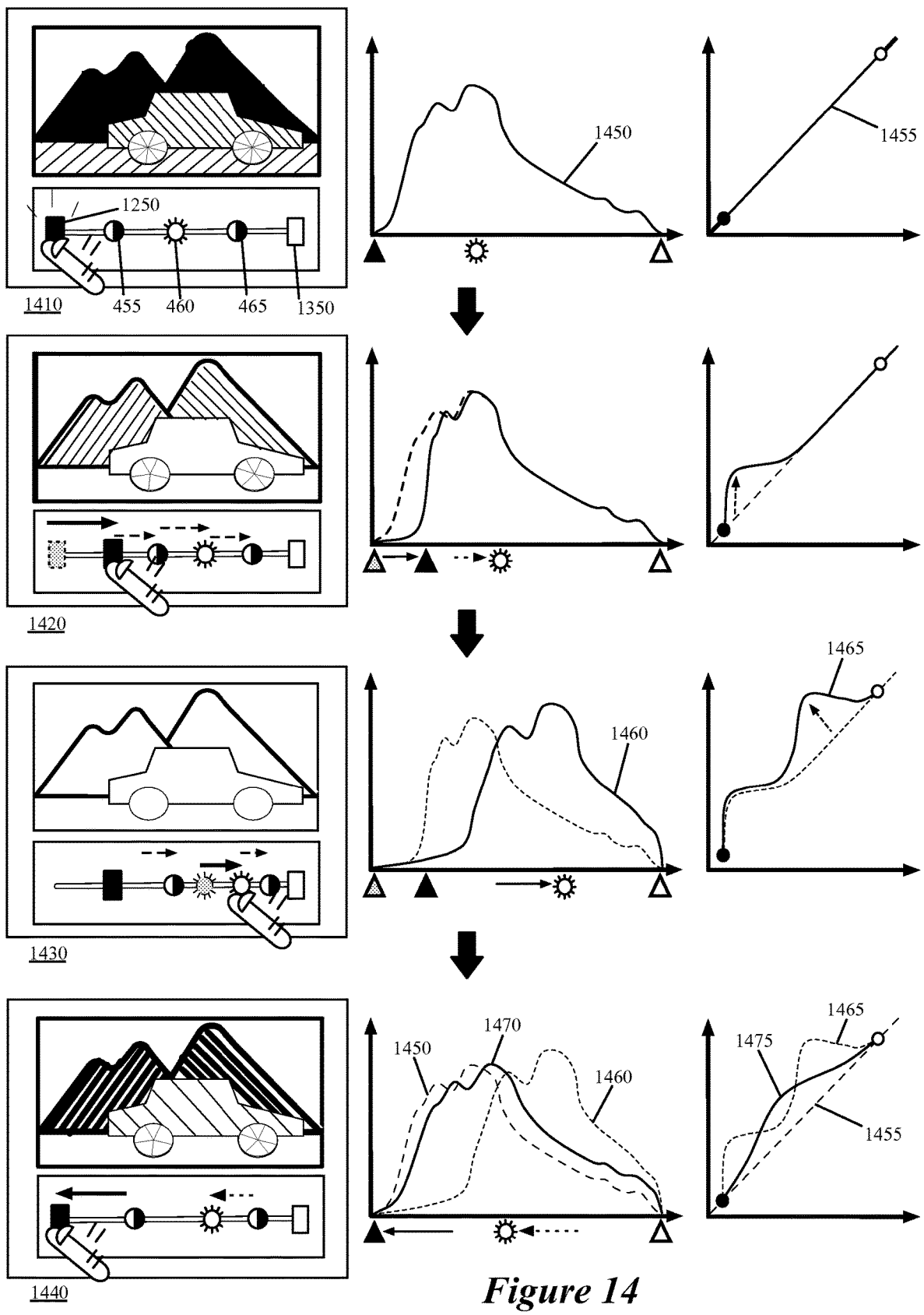
FIG. 14 conceptually illustrates slider movements of the multi-slider exposure tool that fix the black and white cutoffs for adjusting an image in some embodiments.

FIG. 14 conceptually illustrates slider movements of the multi-slider exposure tool 440 that fix the black and white cutoffs for adjusting an image in some embodiments. This figure illustrates, during four stages (1410-1440), that when the user moves the blackpoint/shadow knob 1250 to the right to lift shadows, the black cutoff point is fixed, such that subsequent tonal adjustments to the image are persisted when the blackpoint/shadow knob 1250 is moved back to its initial position in the initial tonal range of the image.

As described above, the blackpoint/shadow knob 1250 is a dual operation knob for performing tonal range expansion and shadow recovery operations. While the description of this figure relates to the blackpoint/shadow knob 1250, the points illustrated in the description of this figure similarly relate to other dual operation knobs, such as the whitepoint/highlight knob 1350 described above.

The first stage 1410 shows the multi-slider exposure tool 440 with an initial configuration of knobs associated with a displayed image. As shown, the tonal range of image values covers dark tones (e.g., the mountain), midtones (e.g., the car and the ground), and light tones (e.g., the wheels and the sky). The initial configuration corresponds to the tonal range of image values for this image, which is illustrated in the histogram 1450. Also, the black and white cutoff points reflect this initial configuration and are illustrated in the response curve 1455. At this stage, a user selects the blackpoint knob 1250 for adjusting the black cutoff point of the image.

At the second stage 1420, the user moves the blackpoint/shadow knob 1250 to the right, which performs a shadow recovery operation in a shadow region of the image (similar to the shadow recovery performed in FIG. 12). In addition, as the user moves the blackpoint/shadow knob 1250 along the multi-slider track, the contrast and brightness knobs are automatically moved (e.g., pushed) along the track by the media editing application.

In the histogram 1452, the blackpoint indicator 1442 and brightness indicator 1444 reflect the relative positioning of the knobs on the multi-slider exposure tool. However, the initial black indicator 1446 (i.e., gray triangle subjacent to the histogram 1452) is not moved despite the blackpoint/shadow knob 1250 repositioning because in a shadow recovery operation, the initial tonal range of the image does not contract. Therefore, the tonal range shown in the histogram 1452 is not reduced, but instead represents very few pixels of the histogram 1452 between the initial black indicator 1446 and the repositioned black indicator 1442 (e.g., the curve is nearly floored between the initial and repositioned black indicators 1446 and 1442).

Also, the black cutoff point remains positioned at the initial cutoff position despite the blackpoint/shadow knob 1250 movement along the multi-slider track to the right. The response curve 1457 reflects the shadow recovery operation in terms of the bulging out of the curve.

At the third stage 1430, the user selects and moves the brightness knob 460 to the right along the multi-slider track in order to increase the overall level of brightness in the image. As a massive proportion of the image pixel values currently fall between the black indicator 1442 and the white indicator 1448 (despite not having reduced the initial tonal range of the image), the brightness operation largely affects pixels in this tonal sub-range. Thus, as shown at this stage 1430, the image appears very light, with the mountain, car, wheels, ground, and sky all appearing white. The relatively few pixel represented in the shadow region of the histogram 1460 are also affected by the brightness operation. However, the effect of the brightness adjustment on these pixels has minimal impact on the present appearance of the image and on subsequent tonal adjustments of the image.

The user's movement of the brightness knob is reflected in the histogram 1460, where the brightness indicator 1444 moves to the right in accordance with the movement of the brightness knob 460. This causes the histogram 1452 to shift rightward, so that more pixels are associated with brighter image pixel values, as shown in the resulting histogram 1460.

The response curve 1465 also shows the increased level of brightness by the convex portion bulging out of the curve. Although all of the image pixel values are brightened by this operation, the effect of moving the brightness knob 460 is shown to largely affect the massive proportion of pixels that are not in the shadow region, while the relatively few pixels within the shadow region are barely affected by the brightness operation. Therefore, tonal adjustments a user makes to the image after performing a shadow recovery operation encompasses all of the pixels of the image, but has particularly strong effect on non-shadow regions. As tonal adjustments performed after shadow recovery are persistent, this application of the brightness operation disproportionately affects one tonal sub-region at the expense of another tonal sub-region.

At the fourth stage 1440, the user selects and moves the blackpoint/shadow knob 1250 back to the initial blackpoint position it occupied at the first stage 1410. For this operation, the media editing application performs shadow casting (e.g., the shadows lifted at the second stage 1420 are cast out or lowered again). The media editing application also moves the contrast and brightness knobs to the left along the multi-slider track.

At this stage 1440, however, the image appears lighter than the image at the first stage 1410. For example, the image at the first stage 1410 shows that the mountain is black and the ground, the car, and the wheels are all approximately in the same midtone region, whereas the image at the fourth stage 1440 shows that the mountain is shaded, the ground is white, and the wheels and car appear lighter than in the first stage 1410. In this case, the change in brightness made at the third stage 1430 remains in effect as the user moves the blackpoint/shadow knob 1250 back to the initial position shown at the first stage 1410 (i.e., as indicated by the gray position indicator 1446). In other words, the brightness adjustment made at the third stage 1430 gets stretched out as if the tonal range was being expanded, despite the tonal range remaining the same (i.e., the tonal range is maintained and only the shadows are recast at this stage 1440).

This stretching effect of the brightness adjustment is illustrated in the histogram 1470. As shown, the histogram 1470 is a solid line and represents the distribution of image values after the user moves the blackpoint/shadow knob 1250 to the left during the fourth stage 1440. The two dashed lines 1450 and 1460 represent the histograms for the image at previous different stages. Specifically, the dashed line 1460 represents the histogram curve at the third stage 1430 and the dashed line 1450 represents the original histogram curve shown at the first stage 1410. As shown, the dashed line 1450 representing the original histogram has a greater distribution of pixel values for darker image values compared to the histogram 1470 (solid line) at this stage 1440. This is also shown in the response curve 1475 at the fourth stage 1440, with the original response curve 1455, the response curve 1465 at the third stage 1430, and the present response curve 1475 at the fourth stage 1440.

Thus, the fixed black and white cutoff points effectively limit the scope of tonal adjustments to be within high pixel distribution regions of the histogram. At the same time, such tonal adjustments are persisted when a user moves the blackpoint/shadow knob 1250 back toward the initial position.

Having discussed special treatment cases of the black and white cutoffs, the next example describes a different feature of the multi-slider exposure tool used in conjunction with a context-sensitive on-screen control of some embodiments.

E. Tonal Adjustments by Indirect Manipulation of the Knobs

FIGS. 7, 8, 9, 10, 11, 14, 12, and 13 described above, illustrate several examples of moving the knobs of the multi-slider exposure tool to adjust tonal attributes of images. In those examples, the multi-slider exposure tool is directly manipulated by the user's selection and movement of the knobs. However, in some embodiments, a user can adjust tonal attributes of the image by indirectly manipulating the multi-slider exposure tool. This example describes using a user interface (UI) control that is overlaid upon the image (also referred to as an on-image control) for indirect manipulation of the multi-slider exposure tool.

Figure 15:
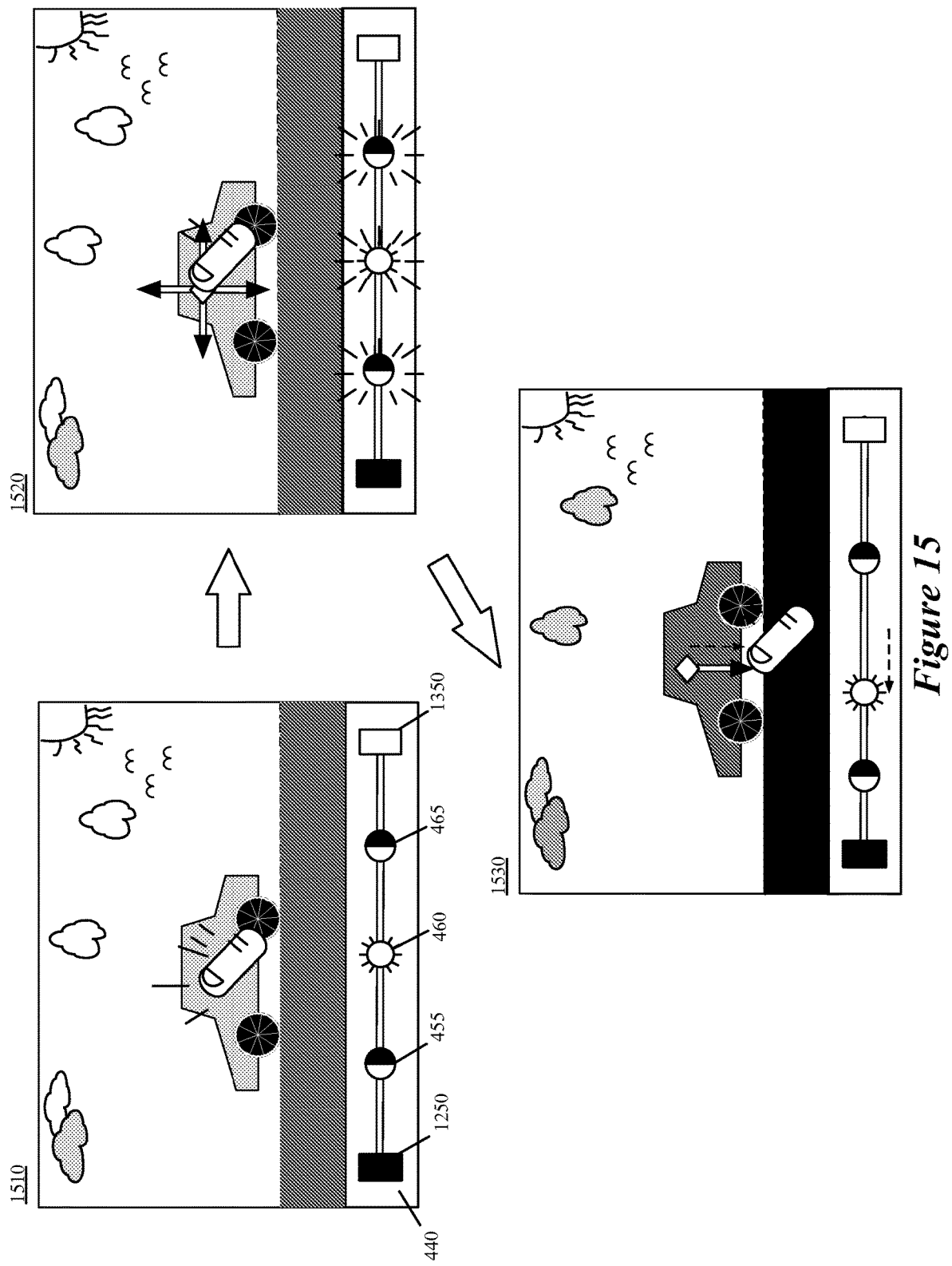
FIG. 15 conceptually illustrates an on-image exposure control for indirectly manipulating the multi-slider exposure tool of some embodiments.

FIG. 15 conceptually illustrates an on-image exposure control 1550 for indirectly manipulating the multi-slider exposure tool of some embodiments. Specifically, in three stages (1510-1530), this figure presents a GUI of a media editing application that is similar to the GUI shown in FIG. 12. However, this figure illustrates that the knobs of the multi-slider exposure tool are highlighted and moved in response to a user's manipulation of the on-image exposure control. Such an on-image control 1550 is shown in FIG. 15.

The first stage 1510 shows the multi-slider exposure tool 440 with the set of knobs 1250, 455, 460, 465, and 1350 positioned according to the tonal attributes of the displayed image. As shown at this stage, a user selects a location within the image. In some embodiments, the user selects the location by performing a gesture, such as tapping or touching a touch-responsive display device. In other embodiments, other gestures are performed for selecting the location. In this example, the user selects the car shown in the image. The car appears gray in this image, and thus, the pixel values for the car are in the midtone region.

At the second stage 1520, the media editing application overlays the on-image exposure control 1550 at the user's selected location. The on-image control 1550 is illustrated with four directional arrows, each of which indicates a tonal adjustment operation to apply to the image. In some embodiments, different visual characteristics of the on-image control indicate the types of tonal adjustment operations to apply to an image. While the on-image control 1550 shown in this example appears opaque (e.g., portions of the image are not visible where the on-image control overlays the image), in some embodiments, the on-image control 1550 appears translucent or nearly transparent, so as not to obscure the display of the image.

In some embodiments, the tonal adjustment operations associated with the on-image control 1550 depend on the image pixel values at the selected location. For example, different operations may be provided when the selected location has pixels in dark, bright, or midtone regions of the image. In this example, the selected location is in the midtone region (i.e., gray pixels of the car), and may be associated with operations that account for midtone image characteristics. As described below, the media editing application of some embodiments provides different tonal adjustment operations for different tonal ranges of pixel values.

At this stage 1520, the media editing application determines that the selected location has pixels in the midtone region and designates brightness and contrast operations for the on-image control. Specifically, the upward pointing arrow is associated with an operation that increases brightness and the downward pointing arrow is associated with an operation that decreases brightness. Also, the horizontal arrows are associated with an operation that adjusts contrast of the image.

In some embodiments, the media editing application highlights the knobs (i.e., brightness knob 460 and contrast knobs 455 and 465) of the multi-slider exposure tool 440 that correspond to the designated operations of the on-image control 1550. In some of these embodiments, the media editing application highlights the corresponding knobs approximately simultaneously with designating the operations (i.e., brightness and contrast) for the on-image exposure control 1550. As shown at this stage 1520, the brightness knob 460 and the two contrast knobs 455 and 465 are highlighted.

Highlighting the knobs that correspond to the designated operations of the on-image control 1550 provides a visual indication of the tonal adjustment operations available to the user of the on-image control. In some embodiments, the media editing application does not highlight the corresponding knobs, but instead provides a different visual indication of the operations designated for the on-image control. For example, the corresponding knobs may appear with a different size relative to the other knobs of the multi-slider exposure tool (e.g., by increasing the size of the corresponding knobs or decreasing the size of the other knobs). In some embodiments, no visual indications are provided for the corresponding knobs, but instead, the entire multi-slider exposure tool is highlighted or made visually apparent to the user.

The third stage 1530 shows that the user selects (e.g., by dragging a finger or touch apparatus on the touch display device) the operation for decreasing brightness. The media editing application in some embodiments hides the arrows of the on-image control 1550 that are not selected. In this case, only the downward pointing arrow remains visible as the user moves (e.g., drags touch apparatus or finger) down the arrow to adjust the image brightness. In response to this selection, the media editing application reduces the overall brightness of the image. As shown in the image, for example, the car is darker gray, the ground is black, and the clouds are varying degrees of gray. In addition to reducing the brightness of the image, the media editing application moves the brightness knob 460 to the left along the multi-slider track. As described above, when the brightness knob is moved, in some embodiments, the media editing application automatically moves the contrast knobs as well. As shown at this stage 1530, the media editing application automatically moves the contrast knobs 455 and 465 based on the repositioning of the brightness knob 460 (e.g., halfway between the repositioned brightness knob and the proximate endpoint knob).

On-image controls are described in a concurrently filed United States Non-Provisional Patent Application 13/629,428, now published as U.S. Patent Publication 2013/0235069, entitled "Context Aware User Interface for Image Editing". The United States Non-Provisional Patent Application 13/629,428, now published as U.S. Patent Publication 2013/0235069 is incorporated herein by reference.

Having discussed an example of a user interface (UI) control that is overlaid upon the image for indirectly manipulating the multi-slider exposure tool, the next example describes an alternative UI implementation of the multi-slider exposure tool of some embodiments.

F. Alternative UI Implementation

As many of the features described above illuminate, a multi-slider exposure tool provides the advantage of saving space by using a single UI tool for performing several different operations in lieu of using several separate UI tools, each of which is used for a different operation. However, some devices do not have enough display space to realize this advantage. Such devices includes, for example, a smartphone such as an Apple iPhone®, or a tablet computing device operating in portrait mode, such as an Apple iPad® or Samsung Galaxy®. On these devices, overcrowding of the different knobs on the single slider track may occur, or the image viewing area may be squeezed or obscured by the multi-slider tool. Such devices may benefit from an alternative UI implementation of the multi-slider exposure tool.

Figure 16:
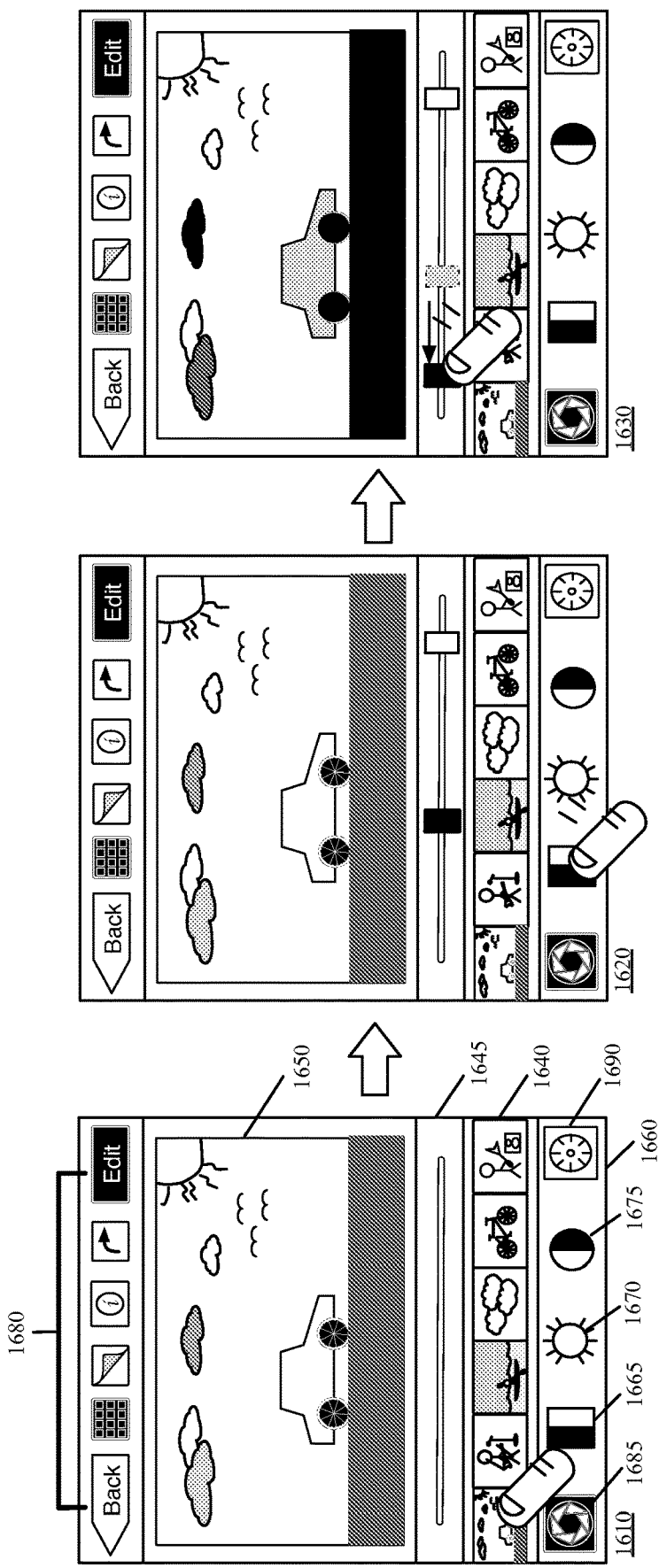
FIG. 16 conceptually illustrates a GUI of a smart phone having a selective slider exposure tool in some embodiments.

FIG. 16 conceptually illustrates a GUI of a smart phone having a selective slider exposure tool in some embodiments. In particular, this figure illustrates, over three stages (1610-1630) that different image adjustment icons are individually selectable from an image adjustment tool display area for adjusting tonal attributes of an image.

The GUI has a thumbnail display area 1640 and a preview display area 1650 similar to the thumbnail display area 410 and the preview display area 420 shown in FIG. 4, except that the thumbnail display area 1640 of this figure is illustrated below the preview display area 1650. A slider track 1645 similar to the multi-slider track shown in FIG. 4 is sandwiched between the preview display area 1650 and the thumbnail display area 1640. In some embodiments, the slider track 1645 overlays the thumbnail display area 1640. In some of these embodiments, the slider track 1645 appears sufficiently translucent so that a user can view thumbnail images in the thumbnail display area 1640. The GUI of this figure also has an exposure adjustment tool bar 1660 with three selectable adjustment icons, including a light/dark icon 1665, a brightness icon 1670, and a contrast icon 1675. The GUI also has a set of navigation and mode tools 1680, an image adjustment tool 1685, and an image reset icon 1690. The slider track 1645 and the three selectable adjustment icons (1665-1675) together constitute the selective slider exposure tool of some embodiments.

The operation of the selective slider exposure tool is described in terms of the three stages (1610-1630). At the first stage 1610, the GUI is displayed in media editing mode. As shown, the icon for editing is selected (e.g., highlighted) in the set of mode tools 1680. Also, the editing mode is set for making tonal adjustments to the image. As illustrated, the image adjustment tool 1685 is selected from the exposure adjustment toolbar 1660. At this stage, the user selects an image from the thumbnail display area 1640, and the selected image is displayed in the preview display area 1650.

In some embodiments, the thumbnail display area 1640 is not displayed (e.g., hidden from the display) when the user selects an image in order to allow the image to be displayed in a larger display space of the GUI. In some of these embodiments, the thumbnail display area 1640 is hidden from the display until the user selects (e.g., by tapping) the image to be closed or minimized. In other embodiments, the image is displayed over the thumbnail display area 1640, but appears sufficiently translucent so that the user may view thumbnails shown in the thumbnail display area 1640 while the image is displayed.

At the second stage 1620, the user selects the light/dark icon for making tonal adjustments to the light and dark regions of the selected image. In some embodiments, the selection of any of the icons for making tonal adjustments is made with an on-image control such as the on-image control described above in relation to FIG. 15. In some of these embodiments, the exposure adjustment toolbar 1660 is not displayed.

In response to the user's selection of the light/dark icon 1665 from the exposure adjustment toolbar 1660, the GUI displays individually movable dark and light knobs on the slider track 1645. The dark and light knobs shown at different positions along the track to allow a user to individually adjust dark regions or light regions with either knob independently of the other knob. As described above, the positions of the knobs reflect the image attributes (e.g., blackpoint, whitepoint, etc.) of the image when the user selects the image for editing. In some embodiments when the on-image control is displayed for selecting the icon, the slider track 1645 is not displayed at all. In these embodiments, the icon selected by using the on-image control is highlighted (e.g., illuminated, flashing, etc.) on the exposure adjustment toolbar 1660.

At the third stage 1630, the user selects and moves the dark knob along the slider track 1645. The user's movement is to the left along the track, which corresponds to an expansion of the tonal range (e.g., the user is deepening the black level at which image pixels are displayed). Similar to the operation of the multi-slider exposure tool described above in relation to FIG. 7, moving the dark icon left causes other image attributes to change. In this case, brightness is reduced and contrast is also adjusted. In some embodiments, the movement (e.g., by the user dragging a touch apparatus or finger) across the on-image control determines the operation to apply.

The image in the preview display area 1650 now appears with some areas having a substantial amount of black and other areas relatively darker than the same areas of the image as shown at the second stage 1620. In addition, some areas remain light (e.g., the sky and some of the clouds). As described above, the tonal range expansion of the darkest region may not affect the lightest region. In other words, the whitepoint remains fixed despite the user's movement of the dark icon and the relative movements of the other icons.

Although the example shown in FIG. 16 illustrates selection and subsequent display and movement of the light/dark icon 1665, the operation of the selective slider exposure tool is similar when the user selects other icons. For instance, the user can select the brightness icon 1670 to adjust the brightness of the displayed image by moving a brightness knob along the slider track 1645.

Additionally, the user's selection of the contrast icon 1675 allows the user to move a contrast knob along the slider track 1645 to adjust image contrast. Unlike the previous examples that illustrated the tandem movements and operations of two contrast knobs when a user moves either one of the two contrast knobs, in some embodiments, the selective slider exposure tool only provides a single contrast knob for manipulating the contrast of an image. The operation of the single contrast knob, in some of these embodiments, is similar to the operation of the single brightness knob when the user selects the brightness icon 1670 in the selective slider exposure tool.

In this way, the selective slider exposure tool allows a user of a device with a limited display (e.g., a smartphone, a tablet, etc.) to make tonal adjustments to images in a manner similar to the operation of the multi-slider exposure tool described above.

II. Architecture and Processes

A. Multi-Slider Exposure Tool Architecture

Figure 17:
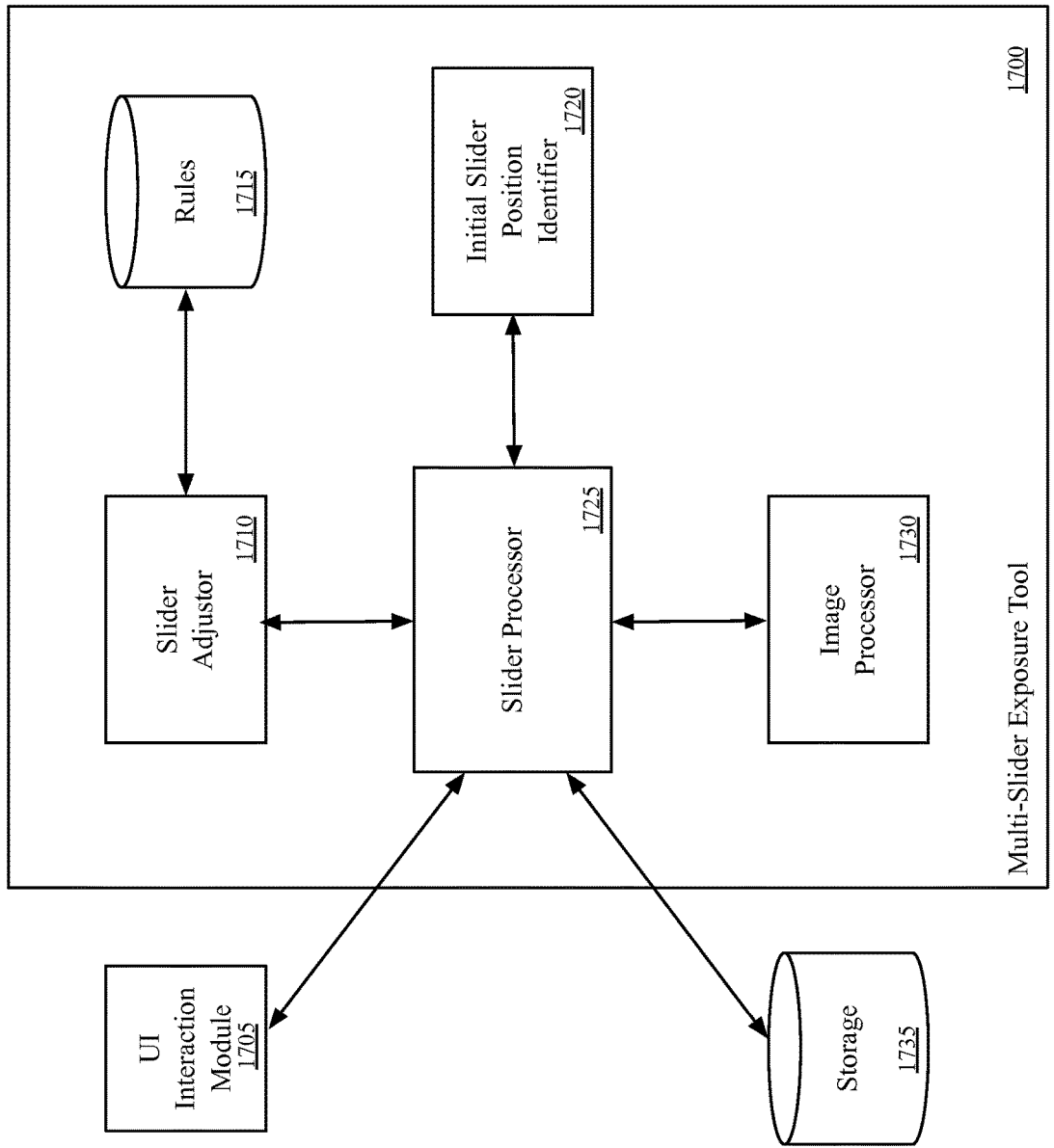
FIG. 17 illustrates a software architecture block diagram of the multi-slider exposure tool of some embodiments.

FIG. 17 illustrates a software architecture block diagram of the multi-slider exposure tool of some embodiments. This exposure tool 1700 generates and controls the slider track and sliders, and modifies the images based on the locations of the sliders. As shown in this figure, the tool 1700 includes a slider processor 1725, an initial slider position identifier 1720, a slider adjustor 1710, a rules data storage 1715, and an image processor 1730.

The slider processor 1725 is the central control module of the tool. It interacts with the UI interaction module 1705 to receive input with respect to the tool (e.g., the opening and closing of the tool) and the sliders (e.g., the movement of the sliders). In response to the UI input, the slider tool 1700 can interact with (1) an initial slider position identifier 1720 to dynamically identify the range of the slider, (2) the slider adjustor 1710 to identify the new location of a manually moved slider and any other sliders that have to be automatically moved with the manually moved slider, and (3) the image processor 1730 to modify the image based on the positions of the sliders.

The slider tool 1700 can be invoked for an image in different ways in some embodiments. For instance, in some cases, the slider tool 1700 is invoked after a first image has been selected for display in the preview display area 420. In other cases, before the selection of the first image for display, the slider tool 1700 is invoked for a second image. In this case, the slider tool is invoked for the first image automatically as it was already selected for the second image.

Irrespective of how it is invoked, the slider tool first calls the initial slider position identifier 1720 when it is invoked for an image. The slider position identifier 1720 identifies the initial positions of the sliders based on an analysis that it performs of the image tonal attributes. This identifier in some embodiments identifies these initial positions based on a brightness histogram that it generates for the image. It defines the position of the blackpoint, whitepoint, and brightness sliders based on the black and white cutoff values of the histogram and the average brightness value of the histogram. As mentioned above, the black point cutoff in some embodiments is the histogram x-axis location corresponding to the darkest pixel in the image, the white point cutoff in some embodiments is the histogram x-axis location corresponding to the brightest pixel in the image, and the average brightness value is the median brightness value in the image. The position identifier 1720 specifies the initial contrast control locations as the locations between the black point cutoff value and the brightness value, and between the brightness value and the white point cutoff value.

Also, as mentioned above, the identifier 1720 receives the image data in terms of RGB Values. In Some of these Embodiments, the Identifier Generates the Brightness Histogram by (1) expressing each pixel's brightness as the sum of its RGB values, and (2) placing these RGB values in a certain number of discrete histogram x-axis buckets that reduces the number of bits needed to express each x-axis histogram position. In other embodiments, the identifier converts the RGB value for each pixel into a color format that has luma or luminance as one of its color channels, and then generates the histogram based on the computed luma or luminance values. Again, to simplify the histogram representation, the identifier 1720 in some of these embodiments places the luma or luminance values in a smaller set of x-axis buckets.

After the initial position identifier 1720 identifies the initial slider positions, the slider processor 1725 directs the UI interaction module 1705 to present the multiple sliders at their identified initial positions. When one of these sliders is then moved by a user, the UI interaction module notifies the slider processor 1725 of this movement. The processor 1725 then directs the slider adjustor 1710 to identify the new position of the moved slider and the new positions of any other sliders that the tool 1700 has to automatically move based on the movement of the manually adjusted slider.

In some embodiments, the UI input regarding the manually adjusted slider is a directional input (e.g., a drag movement) that has to be converted into a positional movement of the slider. In these embodiments, the slider adjustor 1710 computes this positional movement from the directional movement and uses this computed value to adjust the manually moved slider.

The slider adjuster 1710 also uses the rules that are contained in the rules data storage 1715 (e.g., database, data file, data table, etc.) to identify any other slider that has to be automatically moved in conjunction with the manually adjusted slider. In the embodiments described above, three examples of such automatically moved sliders include (1) the contrast and brightness sliders when the blackpoint or whitepoint sliders are manually moved, (2) the contrast sliders when the brightness slider moves, and (3) the opposing contrast slider when a primary contrast slider moves. In some embodiments, manual movement of one slider may require automatic movement of one or more other sliders. Also, in some embodiments, automatic movement of one slider may further require automatic movement of one or more other sliders. For each slider that the slider adjuster 1710 identifies as one that it has to automatically move, the slider adjuster 1710 identifies a new position based on the new position of the manually moved slider that it previously identified.

Once the slider adjuster 1710 identifies the positions of the sliders in response to a user input, the slider processor 1725 directs the image processor 1730 to modify the current version of the image based on the slider positions identified by the slider adjuster 1710. The slider processor 1725 provides the image processor 1730 with (1) the current version of the image from the storage 1735 in some embodiments, or (2) the original version of the image along with instructions that capture all previous edit operations that have been performed on the image in other embodiments. This latter approach is used in embodiments that store the image data in a non-destructive manner by storing each image in its original format and storing all editing operations separately. In yet other embodiments, a lower resolution version of each edited image is stored in the storage 1735, and this lower resolution version is provided to the image processor 1725 in order to generate a new edited version of the image.

Based on these new positions, the image processor 1730 computes a new tonal response curve for the image, and a transform that specifies how to map the previous tonal response curve for the image to the new tonal response curve. The image processor 1730 then applies this transform to the current version of the image to produce a new modified version of the image. The slider processor 1725 then directs the UI interaction module to display this new modified version of the image on the display screen.

The slider processor 1725 also stores in the storage 1735 the new modified version of the image in some embodiments, or the original version of the image along with instructions that capture all previous and current edit operations that have been performed on the image in other embodiments. In some embodiments, a lower resolution version of the modified image is stored in the storage at this point. This lower resolution version is also provided in some cases to the UI interaction module 1705 for display on the device's display screen, as the resolution of this screen is often less than the full resolution of the original or edited images.

B. Multi-Slider Exposure Tool Processes

Figure 18:
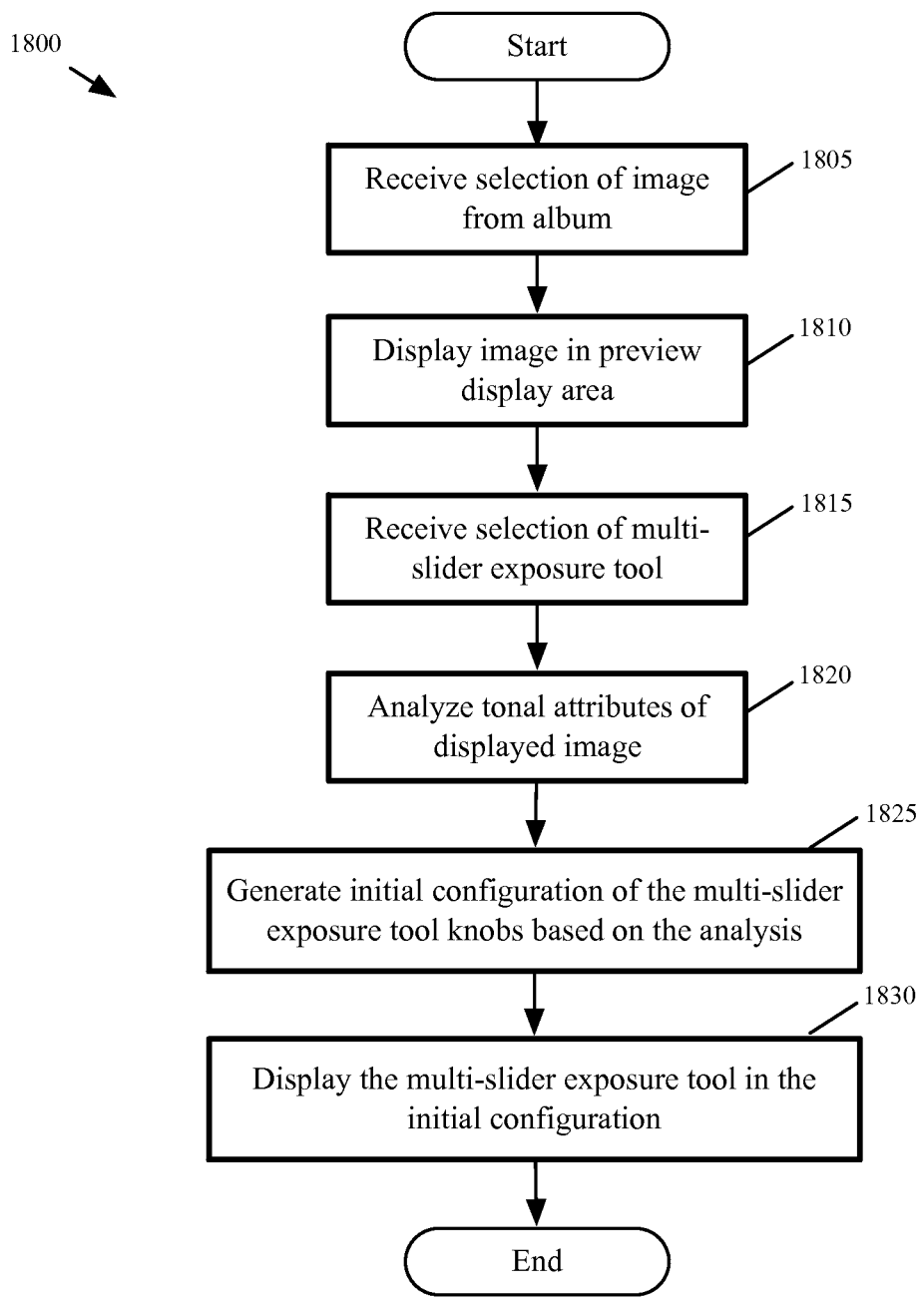
FIG. 18 conceptually illustrates a process that the media editing application of some embodiments performs to display the multi-slider exposure tool for an image.

FIG. 18 conceptually illustrates a process 1800 that the media editing application of some embodiments performs to display a multi-slider exposure tool for an image. In some embodiments, part of this process is performed by the multi-slider exposure tool 1700. This process initially receives (at 1805) a selection of a thumbnail image from an album in the thumbnail display area. The process then displays (1810) the image in the preview display area.

Next, at 1815, the process receives selection of the multi-slider exposure tool in the editing tool set. The process then analyzes (at 1820) the tonal attributes of the displayed image. Several manners of analyzing these attributes (e.g., to generate brightness histograms) were described above in Section II.A. Based on this analysis, the process then generates (at 1825) the initial position configuration of the sliders, as described above in Section II.A. The process then directs the UI interaction module to display (at 1830) the multi-slider tool with the identified initial slider configuration.

Figure 19:
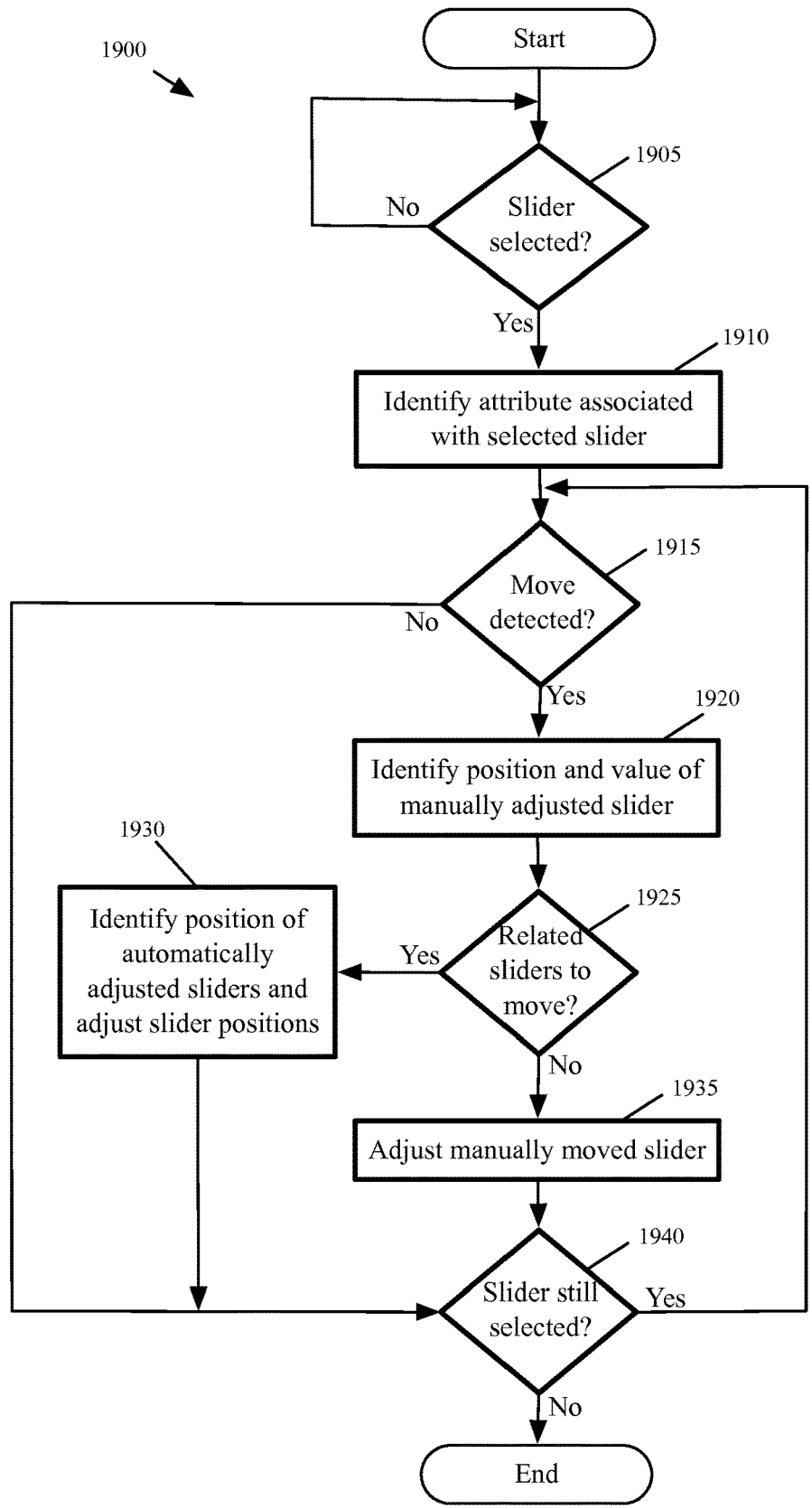
FIG. 19 conceptually illustrates a process of some embodiments for changing the appearance of an image by modifying one or more sliders of the multi-slider exposure tool.

FIG. 19 conceptually illustrates a process 1900 of some embodiments for changing the appearance of an image by modifying one or more sliders of a multi-slider exposure tool. The multi-slider exposure tool 1700 performs the process 1900 in some embodiments. Moreover, the process 1900 of some embodiments is performed by the multi-slider exposure tool when the application has the exposure tool invoked.

The process 1900 begins by determining (at 1905) whether a slider on the track of the multi-slider exposure tool is selected. When a slider is selected, the process 1900 proceeds to 1910. However, when no slider is selected, the process 1900 of some embodiments returns to 1905. In some embodiments, the process 1900 continuously evaluates whether any slider on the exposure tool track is selected. For example, the process continuously checks (e.g., by detecting selection events associated with the multi-control slider) the UI interaction module to determine whether any slider is selected in some embodiments, while in other embodiments it is notified by this module anytime one of the sliders is adjusted.

Next, the process 1900 identifies (at 1910) the attribute associated with the selected slider. For instance, the selected slider may be associated with the black cutoff value. After identifying the attribute associated with the slider, the process 1900 determines (at 1915) whether a movement of the slider is detected. If a movement of the slider is not detected, the process 1900 proceeds to 1935, to determine whether the slider is still selected. Otherwise, if a movement of the slider is detected, the process 1900 proceeds to 1920.

At 1920, the process identifies, based on the detected movement of the slider, a new position for the manually adjusted slider on the slider track and a new value for the attribute associated with this manually adjusted slider. In some embodiments, the process 1900 continuously changes the slider's position contemporaneously with a user's repositioning (e.g., by a touch gesture for dragging the slider) of the slider across the slider track.

Next, the process 1900 determines (at 1925) whether any other sliders of the exposure tool should be moved automatically in relation to the changed position of the manually moved slider. In some embodiments, the related sliders to automatically move are specified in a rules storage (e.g., the rules storage 1715). In some of these embodiments, the process determines the related sliders to automatically move by reviewing the rules in the rules storage 1715. In some embodiments, the rules are stored in a lookup table. In some embodiments, multiple rules are determined for automatically moving related sliders. For instance, manual movement of a particular slider may require automatic movement of one or more other sliders. Also, in some embodiments, automatic movement of any slider may require automatic movement of one or more other sliders. Furthermore, the automatic movement of a slider may be in the same direction or in the opposing direction to the movement of the manually adjusted slider, as described above.

When the process determines (at 1925) that there are not any related sliders to move, the process 1900 transitions to 1935 to adjust the position of the manually moved slider on the track, and then to 1940 to determine whether the slider is still selected. Otherwise, when the process determines (at 1925) that there are related slider(s) that need to be moved, the process 1900 identifies (at 1930) the position of the automatically adjusted sliders and then adjusts the position of the manually and automatically moved sliders on the slider track. After moving (at 1930) the manually and automatically adjusted sliders, the process 1900 proceeds to 1940 to determine whether the manually adjusted slider is still selected.

When the process 1900 determines (at 1940) that this slider is no longer selected (e.g., the user terminates his contact with this slider), the process 1900 ends. Otherwise, the process 1900 determines that the slider is still selected for continued processing and transitions back to 1915 for detecting movement. In some embodiments, the process 1900 continuously cycles through different combinations of operations 1915 through 1940 until the user stops his contact with the slider selected at 1905.

Although the processes described above are described in a particular order, different embodiments may perform these processes in a different order.

III. Image Viewing, Editing, and Organization Application

Figure 20:
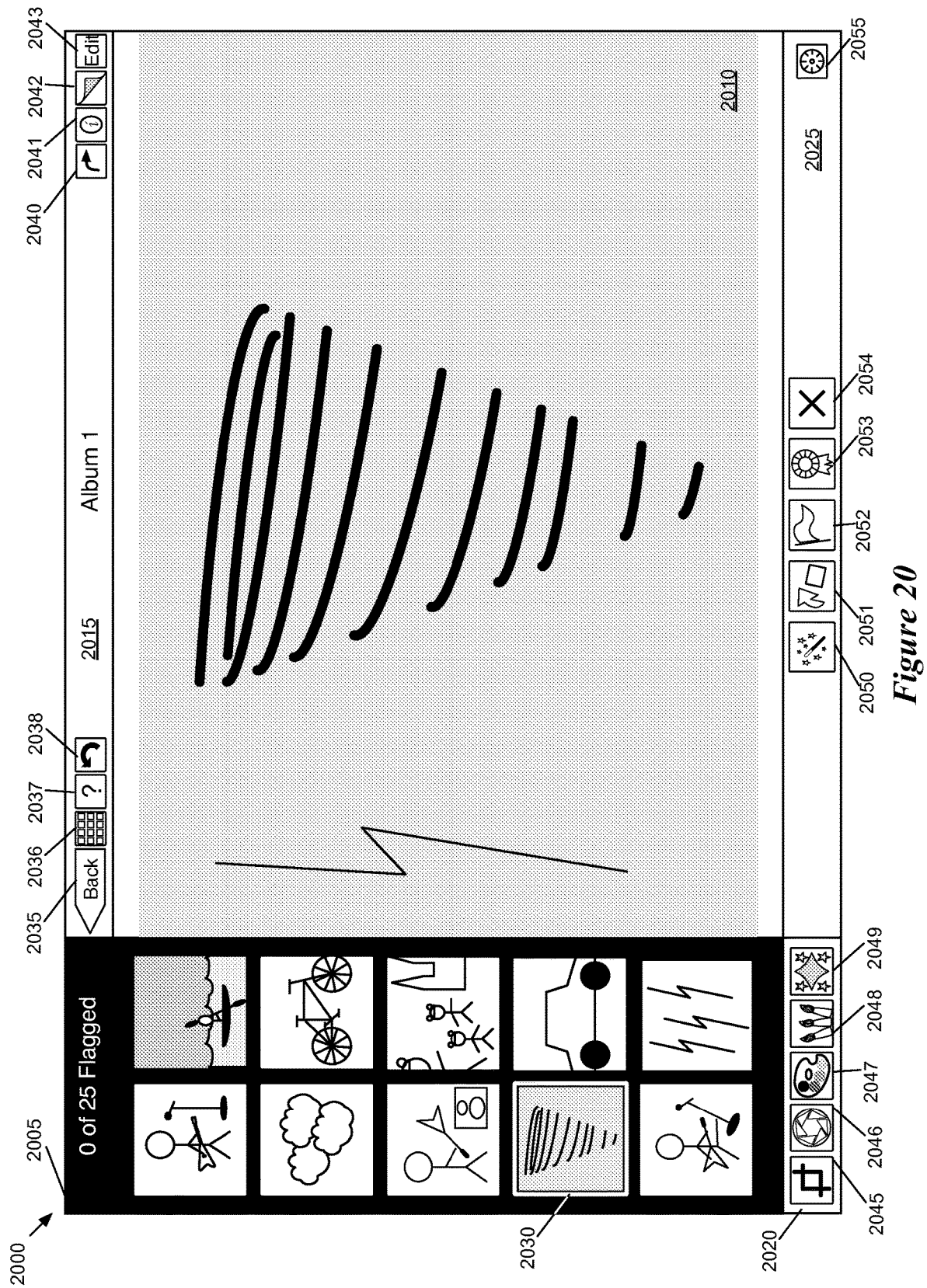
FIG. 20 illustrates a detailed view of a GUI of some embodiments for viewing, editing, and organizing images.
Figure 21:
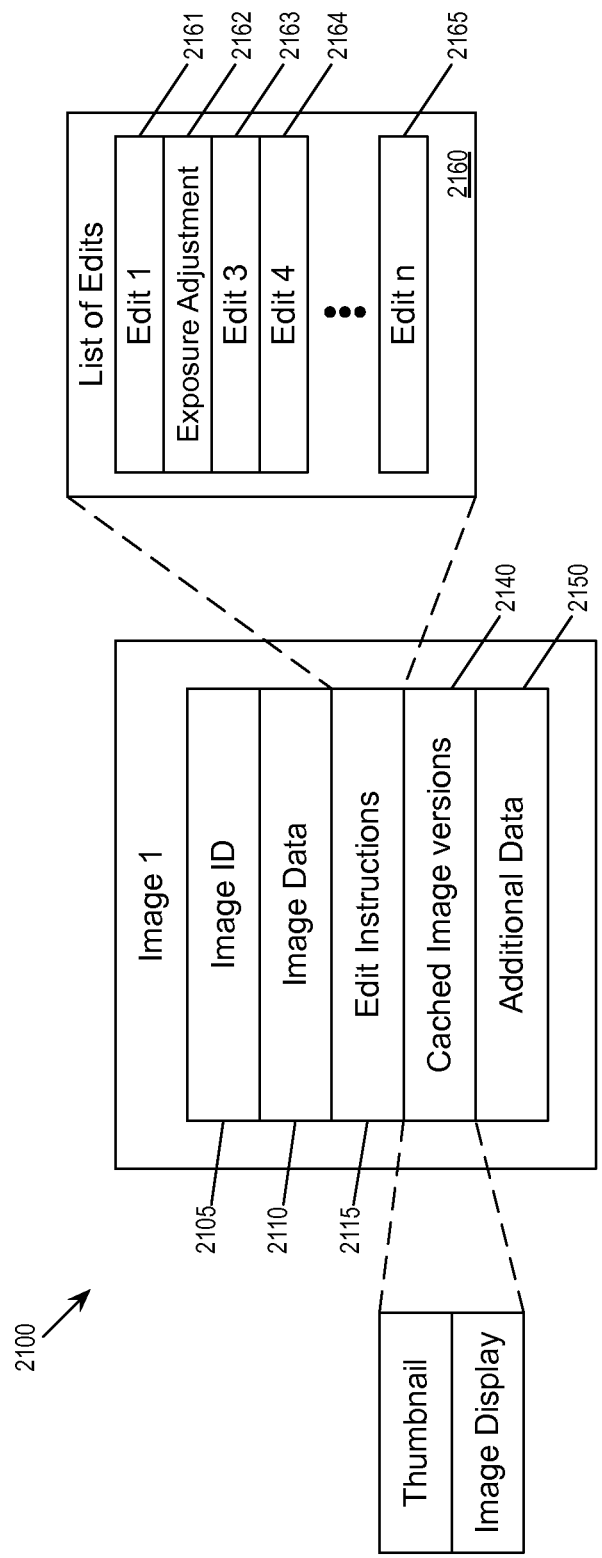
FIG. 21 conceptually illustrates a data structure for an image as stored by the application of some embodiments.

The above-described figures illustrated various examples of the GUI of an image viewing, editing, and organization application of some embodiments. FIG. 20 illustrates a detailed view of a GUI 2000 of some embodiments for viewing, editing, and organizing images. The GUI 2000 will be described in part by reference to FIG. 21, which conceptually illustrates a data structure 2100 for an image as stored by the application of some embodiments.

The data structure 2100 includes an image ID 2105, image data 2110, edit instructions 2115, cached versions 2140 of the image, and any additional data 2150 for the image. The image ID 2105 is a unique identifier for the image, which in some embodiments is used by collection data structures to refer to the images stored in the collection.

The image data 2110 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization application operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 2115 include information regarding any edits the user has applied to the image. In this manner, the application stores the image in a non-destructive format, such that the application can easily revert from an edited version of the image to the original at any time. For instance, the user can apply a tonal adjustment to the image, leave the application, and then reopen the application and remove the tonal adjustment at another time. The edits stored in these instructions may be crops and rotations, full-image exposure, tonal, and color adjustments, localized adjustments, and special effects, as well as other edits that affect the pixels of the image. Some embodiments store these editing instructions in a particular order, so that users can view different versions of the image with only certain sets of edits applied.

In some embodiments, the edit instructions 2115 are implemented as a list 2160 of edit operations. The list 2160 includes edit operations such as edits 2161, 2162, 2163, 2164, and 2165. Each edit operation in the list 2160 specifies parameters necessary for carrying out the edit operation. For example, the edit operation 2162 in the list 2160 specifies an edit to the image that applies an exposure adjustment. In some embodiments, a set of edits are stored when a user-applied effect automatically triggers additional, different effects to be applied to the image. For example, a user-specified effect that expands the tonal range of the image may automatically trigger a brightness adjustment. The list 2160 in some embodiments links the automatically triggered edits to the user-specified edit so that the set of edits can be reverted together.

In some embodiments, the list 2160 records the sequence of edit operations undertaken by the user in order to create the final edited image. In some embodiments, the list 2160 stores the edit instructions in the order that the image editing application applies the edits to the image in order to generate an output image for display, as some embodiments define a particular order for the different possible edits provided by the application. For example, some embodiments define an exposure adjustment as one of the edit operations to be applied prior to certain other edit operations, such as localized adjustments and special effects. In some of these embodiments, the list 2160 stores the edit instructions for the exposure adjustment in a position (i.e., edit 2162) that would be applied before some of the other edit operations (e.g., edits 2163-2165).

The cached image versions 2140 store versions of the image that are commonly accessed and displayed, so that the application does not need to repeatedly generate these images from the full-size image data 2110. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image.

Finally, the image data structure 2100 includes additional data 2150 that the application might store with an image (e.g., locations and sizes of faces, etc.). In some embodiments, the additional data can include Exchangeable image file format (Exif) data, caption data, shared image data, tags on the image, or any other type of data. Exif data is stored by the camera that captured the image and includes various information such as camera settings, GPS data, timestamps, etc. Caption data includes a user-entered description of the image. A tag is item that enables the user to associate the image with various information that marks or identifies the image, for example, as a favorite, as flagged, as hidden, etc.

One of ordinary skill in the art will recognize that the image data structure 2100 is only one possible data structure that the application might use to store the required information for an image. For example, different embodiments might store additional or less information, store the information in a different order, etc.

Returning to FIG. 20, the GUI 2000 includes a thumbnail display area 2005, an image display area 2010, a first toolbar 2015, a second toolbar 2020, and a third toolbar 2025. The thumbnail display area 2005 displays thumbnails of the images in a selected collection. Thumbnails are small representations of a full-size image, and represent only a portion of an image in some embodiments. For example, the thumbnails in thumbnail display area 2005 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 1200×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600×1200 image were all located on the left side of the image, the application would use the leftmost 1200 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 2140 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above, or through other user input interactions). The selected thumbnails are displayed with a highlight or other indicator of selection. In thumbnail display area 2005, the thumbnail 2030 is selected. In addition, as shown, the thumbnail display area 2005 of some embodiments indicates a number of images in the collection that have been flagged (e.g., having a tag for the flag set to yes). In some embodiments, this text is selectable in order to display only the thumbnails of the flagged images.

The application displays selected images in the image display area 2010 at a larger resolution than the corresponding thumbnails. The images are not typically displayed at the full size of the image, as images often have a higher resolution than the display device. As such, the application of some embodiments stores a cached version 2140 of the image designed to fit into the image display area. Images in the image display area 2010 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 2015 displays title information (e.g., the name of the collection shown in the GUI, a caption that a user has added to the currently selected image, etc.). In addition, the toolbar 2015 includes a first set of GUI items 2035-2038 and a second set of GUI items 2040-2043.

The first set of GUI items includes a back button 2035, a grid button 2036, a help button 2037, and an undo button 2038. The back button 2035 enables the user to navigate back to a collection organization GUI, from which users can select between different collections of images (e.g., albums, events, journals, etc.). Selection of the grid button 2036 causes the application to move the thumbnail display area on or off of the GUI (e.g., via a slide animation). In some embodiments, users can also slide the thumbnail display area on or off of the GUI via a swipe gesture. The help button 2037 activates a context-sensitive help feature that identifies a current set of tools active for the user and provides help indicators for those tools that succinctly describe the tools to the user. In some embodiments, the help indicators are selectable to access additional information about the tools. Selection of the undo button 2038 causes the application to remove the most recent edit to the image, whether this edit is a crop, color adjustment, etc. In order to perform this undo, some embodiments remove the most recent instruction from the set of edit instructions 2115 stored with the image.

The second set of GUI items includes a sharing button 2040, an information button 2041, a show original button 2042, and an edit button 2043. The sharing button 2040 enables a user to share an image in a variety of different ways. In some embodiments, the user can send a selected image to another compatible device on the same network (e.g., WiFi or Bluetooth network), upload an image to an image hosting or social media website, and create a journal (i.e., a presentation of arranged images to which additional content can be added) from a set of selected images, among others.

The information button 2041 activates a display area that displays additional information about one or more selected images. The information displayed in the activated display area may include some or all of the Exif data stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data and sends this information to the website. The comment stream and, in some cases, additional information, are received from the website and displayed to the user.

The show original button 2042 enables the user to toggle between the original version of an image and the current edited version of the image. When a user selects the button, the application displays the original version of the image without any of the editing instructions 2115 applied. In some embodiments, the appropriate size image is stored as one of the cached versions 2140 of the image, making it quickly accessible. When the user selects the button again 2042 again, the application displays the edited version of the image, with the editing instructions 2115 applied.

The edit button 2043 allows the user to enter or exit edit mode. When a user has selected one of the sets of editing tools in the toolbar 2020, the edit button 2043 returns the user to the viewing and organization mode, as shown in FIG. 20. When the user selects the edit button 2043 while in the viewing mode, the application returns to the last used set of editing tools in the order shown in toolbar 2020. That is, the items in the toolbar 2020 are arranged in a particular order, and the edit button 2043 activates the rightmost of those items for which edits have been made to the selected image.

The toolbar 2020, as mentioned, includes five items 2045-2049, arranged in a particular order from left to right. The crop item 2045 activates a cropping and rotation tool that allows the user to align crooked images and remove unwanted portions of an image. The exposure item 2046 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 2047 activates a set of color tools that enable the user to modify the saturation and vibrancy, as well as color-specific saturations (e.g., blue pixels or green pixels) and white balance. In some embodiments, some of these tools are presented as a set of sliders. The brushes item 2048 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 2049 activates a set of special effects that the user can apply to the image. These effects include gradients, tilt shifts, non-photorealistic desaturation effects, grayscale effects, various filters, etc. In some embodiments, the application presents these effects as a set of items that fan out from the toolbar 2025.

As stated, the UI items 2045-2049 are arranged in a particular order. This order follows the order in which users most commonly apply the five different types of edits. Accordingly, the editing instructions 2115 are stored in this same order, in some embodiments. When a user selects one of the items 2045-2049, some embodiments apply only the edits from the tools to the left of the selected tool to the displayed image (though other edits remain stored within the instruction set 2115).

The toolbar 2025 includes a set of GUI items 2050-2054 as well as a settings item 2055. The auto-enhance item 2050 automatically performs enhancement edits to an image (e.g., removing apparent red-eye, balancing color, etc.). The rotation button 2051 rotates any selected images. In some embodiments, each time the rotation button is pressed, the image rotates 90 degrees in a particular direction. The auto-enhancement, in some embodiments, comprises a predetermined set of edit instructions that are placed in the instruction set 2115. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

The flag button 2052 tags any selected image as flagged. In some embodiments, the flagged images of a collection can be displayed without any of the unflagged images. The favorites button 2053 allows a user to mark any selected images as favorites. In some embodiments, this tags the image as a favorite and also adds the image to a collection of favorite images. The hide button 2054 enables a user to tag an image as hidden. In some embodiments, a hidden image will not be displayed in the thumbnail display area and/or will not be displayed when a user cycles through the images of a collection in the image display area. As discussed above by reference to FIG. 21, many of these features are stored as tags in the image data structure.

Finally, the settings button 2055 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the image viewing and editing GUI 2000 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

IV. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 22:
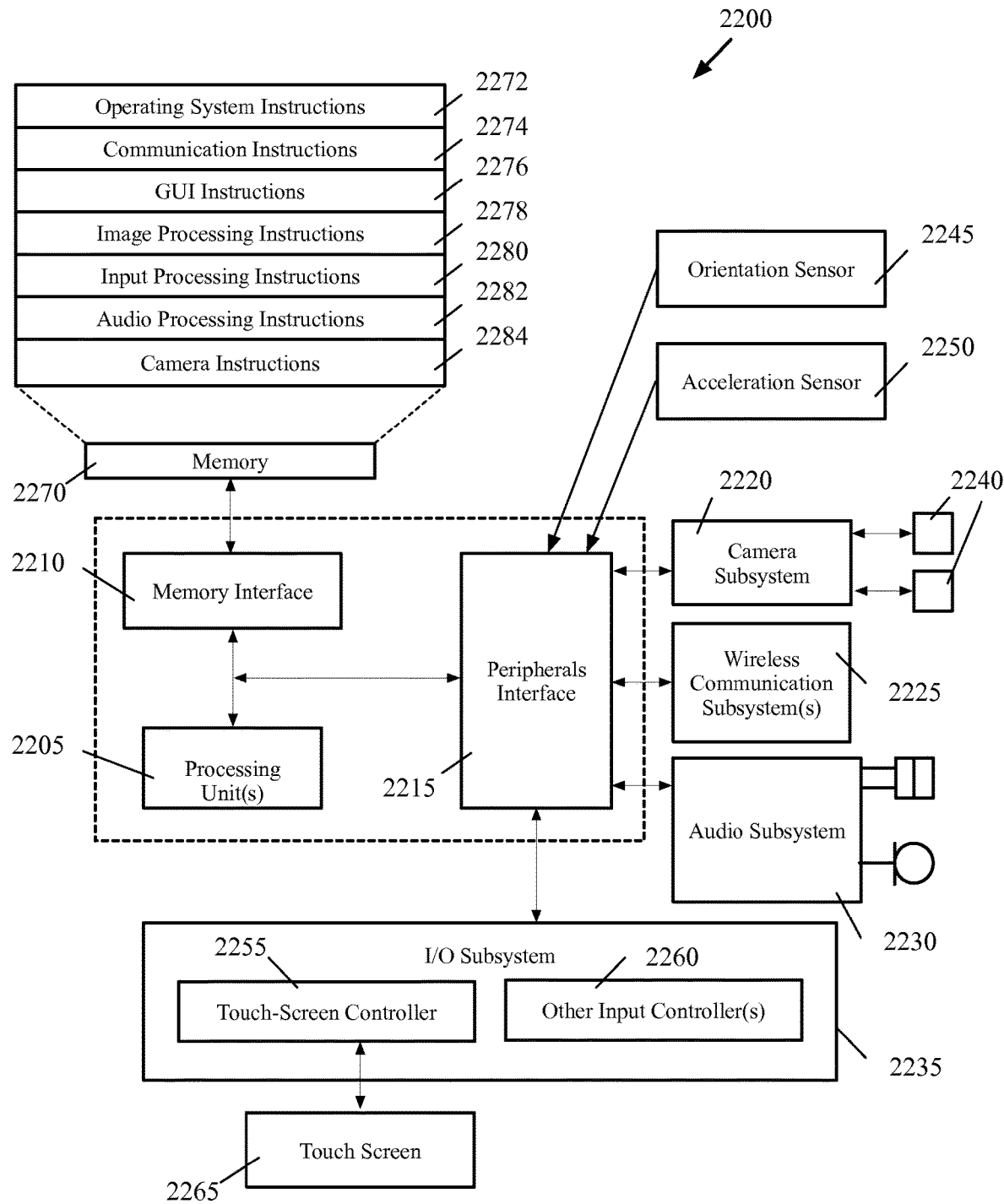
FIG. 22 illustrates an example of a mobile computing device architecture.

The image editing and viewing applications of some embodiments operate on mobile devices. FIG. 22 is an example of an architecture 2200 of such a mobile computing device. Examples of mobile computing devices include smartphones, tablets, laptops, etc. As shown, the mobile computing device 2200 includes one or more processing units 2205, a memory interface 2210 and a peripherals interface 2215.

The peripherals interface 2215 is coupled to various sensors and subsystems, including a camera subsystem 2220, a wireless communication subsystem(s) 2225, an audio subsystem 2230, an I/O subsystem 2235, etc. The peripherals interface 2215 enables communication between the processing units 2205 and various peripherals. For example, an orientation sensor 2245 (e.g., a gyroscope) and an acceleration sensor 2250 (e.g., an accelerometer) is coupled to the peripherals interface 2215 to facilitate orientation and acceleration functions.

The camera subsystem 2220 is coupled to one or more optical sensors 2240 (e.g., a charged coupled device (CCD) optical sensor, a complementary metal-oxide-semiconductor (CMOS) optical sensor, etc.). The camera subsystem 2220 coupled with the optical sensors 2240 facilitates camera functions, such as image and/or video data capturing. The wireless communication subsystem 2225 serves to facilitate communication functions. In some embodiments, the wireless communication subsystem 2225 includes radio frequency receivers and transmitters, and optical receivers and transmitters (not shown in FIG. 22). These receivers and transmitters of some embodiments are implemented to operate over one or more communication networks such as a GSM network, a Wi-Fi network, a Bluetooth network, etc. The audio subsystem 2230 is coupled to a speaker to output audio (e.g., to output different sound effects associated with different image operations). Additionally, the audio subsystem 2230 is coupled to a microphone to facilitate voice-enabled functions, such as voice recognition, digital recording, etc.

The I/O subsystem 2235 involves the transfer between input/output peripheral devices, such as a display, a touch screen, etc., and the data bus of the processing units 2205 through the peripherals interface 2215. The I/O subsystem 2235 includes a touch-screen controller 2255 and other input controllers 2260 to facilitate the transfer between input/output peripheral devices and the data bus of the processing units 2205. As shown, the touch-screen controller 2255 is coupled to a touch screen 2265. The touch-screen controller 2255 detects contact and movement on the touch screen 2265 using any of multiple touch sensitivity technologies. The other input controllers 2260 are coupled to other input/control devices, such as one or more buttons. Some embodiments include a near-touch sensitive screen and a corresponding controller that can detect near-touch interactions instead of or in addition to touch interactions.

The memory interface 2210 is coupled to memory 2270. In some embodiments, the memory 2270 includes volatile memory (e.g., high-speed random access memory), non-volatile memory (e.g., flash memory), a combination of volatile and non-volatile memory, and/or any other type of memory. As illustrated in FIG. 22, the memory 2270 stores an operating system (OS) 2272. The OS 2272 includes instructions for handling basic system services and for performing hardware dependent tasks.

The memory 2270 also includes communication instructions 2274 to facilitate communicating with one or more additional devices; graphical user interface instructions 2276 to facilitate graphic user interface processing; image processing instructions 2278 to facilitate image-related processing and functions; input processing instructions 2280 to facilitate input-related (e.g., touch input) processes and functions; audio processing instructions 2282 to facilitate audio-related processes and functions; and camera instructions 2284 to facilitate camera-related processes and functions. The instructions described above are merely exemplary and the memory 2270 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 22 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 22 may be split into two or more integrated circuits.

B. Computer System

Figure 23:
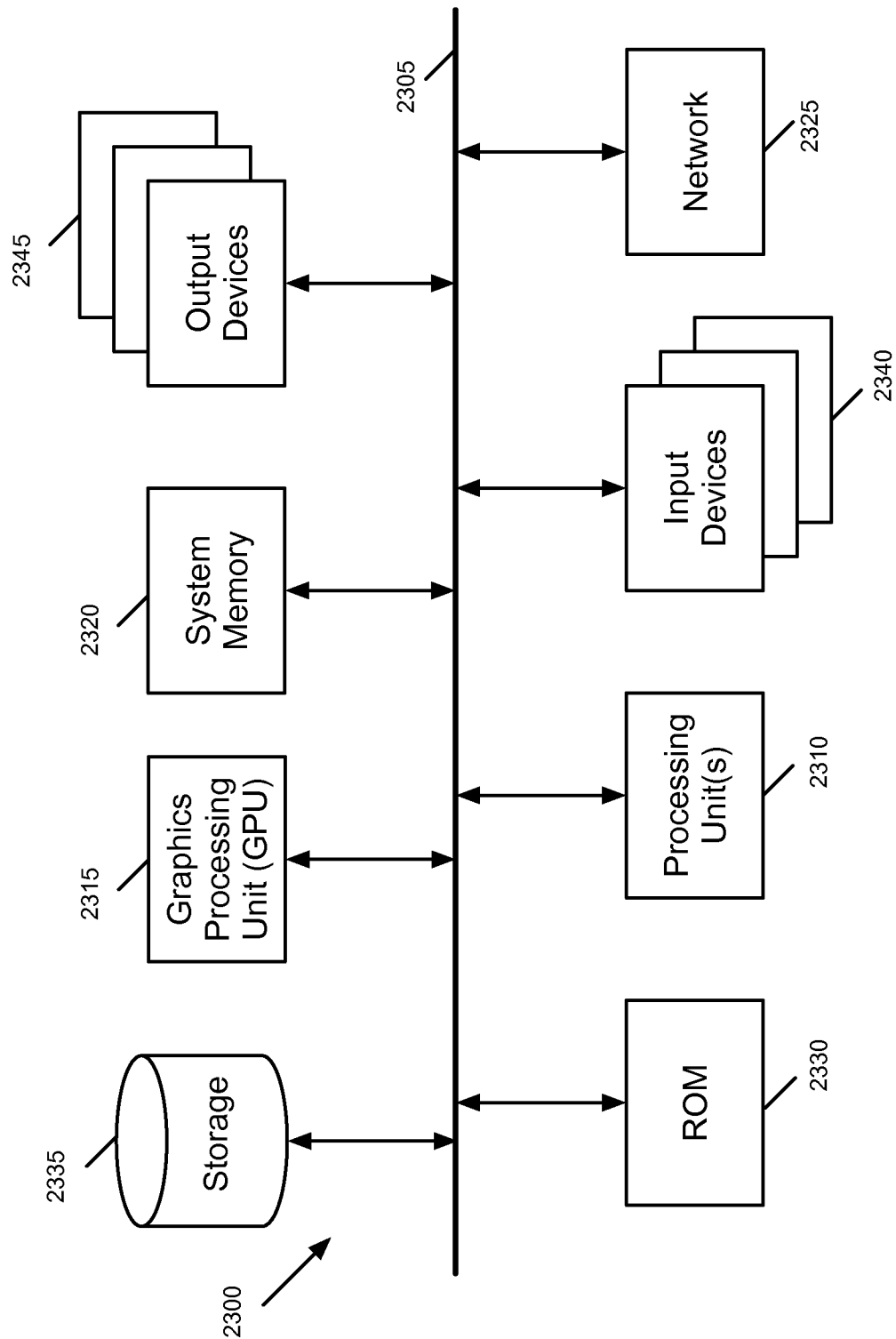
FIG. 23 conceptually illustrates another example of an electronic system with which some embodiments are implemented.

FIG. 23 conceptually illustrates another example of an electronic system 2300 with which some embodiments are implemented. The electronic system 2300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2300 includes a bus 2305, processing unit(s) 2310, a graphics processing unit (GPU) 2315, a system memory 2320, a network 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the GPU 2315, the system memory 2320, and the permanent storage device 2335.

From these various memory units, the processing unit(s) 2310 retrieves instructions to execute and data to process in order to execute the processes of the invention. The processing unit(s) may be a single processor or a multi-core processor in different embodiments. Some instructions are passed to and executed by the GPU 2315. The GPU 2315 can offload various computations or complement the image processing provided by the processing unit(s) 2310. In some embodiments, such functionality can be provided using CoreImage's kernel shading language.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments use a mass-storage device (such as a magnetic or optical disk and its corresponding disk drive) as the permanent storage device 2335.

Other embodiments use a removable storage device (such as a floppy disk, flash memory device, etc., and its corresponding drive) as the permanent storage device. Like the permanent storage device 2335, the system memory 2320 is a read-and-write memory device. However, unlike storage device 2335, the system memory 2320 is a volatile read-and-write memory, such a random access memory. The system memory 2320 stores some of the instructions and data that the processor needs at runtime. In some embodiments, the invention's processes are stored in the system memory 2320, the permanent storage device 2335, and/or the read-only memory 2330. For example, the various memory units include instructions for processing multimedia clips in accordance with some embodiments. From these various memory units, the processing unit(s) 2310 retrieves instructions to execute and data to process in order to execute the processes of some embodiments.

The bus 2305 also connects to the input and output devices 2340 and 2345. The input devices 2340 enable the user to communicate information and select commands to the electronic system. The input devices 2340 include alphanumeric keyboards and pointing devices (also called "cursor control devices"), cameras (e.g., webcams), microphones or similar devices for receiving voice commands, etc. The output devices 2345 display images generated by the electronic system or otherwise output data. The output devices 2345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 23, bus 2305 also couples electronic system 2300 to a network 2325 through a network adapter (not shown). In this manner, the computer can be a part of a network of computers (such as a local area network ("LAN"), a wide area network ("WAN"), or an Intranet), or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 18 and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a media editing application which when executed by at least one processing unit performs tonal adjustments of an image displayed in the media editing application using a slider track and a plurality of slider icons movably positioned along the slider track, said application comprising sets of instructions for:
   detecting a first movement of a slider icon in a first direction along the slider track;
   linearly modifying image pixel values of a first set of pixels of the displayed image based on the first movement;
   detecting a second movement of the slider icon in a second direction opposite to the first direction along the slider track after detecting the first movement of the slider icon; and
   responsive to detecting the second movement of the slider icon in the second direction opposite to the first direction, modifying image pixel values for a second set of pixels of the displayed image based on the second movement after linearly modifying the image pixel values of the first set of pixels, wherein the second set of pixels are modified non-linearly in a different manner than the first set of pixels in response to the second movement of the slider icon.

2. The non-transitory machine readable medium of claim 1, wherein the first movement of the slider icon expands a tonal range of the image.

3. The non-transitory machine readable medium of claim 1, wherein the second movement of the slider icon performs a shadow recovery operation that selectively lifts image pixel values of the second set of pixels in a shadow region of the image.

4. The non-transitory machine readable medium of claim 1, wherein the second set of pixels is within a shadow region of the image.

5. The non-transitory machine readable medium of claim 4, wherein the shadow region is defined by pixels distributed in the darkest half or darkest one third of the tonal range.

6. The non-transitory machine readable medium of claim 4, wherein the shadow region is determined based on weighting factors related to an overall darkness or lightness of the image.

7. The non-transitory machine readable medium of claim 1, wherein the second set of pixels is within a highlight region of the image, wherein the second movement of the slider icon reduces a brightness of the second set of pixels.

8. A non-transitory machine readable medium storing a media editing application which when executed by at least one processing unit controls a plurality of sliders on a single slider track for modifying properties of an image, the application comprising sets of instructions for:
receiving a user input to adjust a position of a particular slider associated with a first property of the image on the single slider track;
identifying an adjusted position on the single slider track of the particular slider;
based on the identified adjusted position of the particular slider, determining a plurality of adjusted positions on the single slider track to move a plurality of other sliders of the plurality of sliders associated with other properties of the image different from the first property; and
adjusting the image based on the adjusted positions of the particular slider and the plurality of other sliders,
wherein the adjusted positions of the plurality of other sliders are based on a set of rules for repositioning the plurality of other sliders in response to movement of the particular slider with at least one of the plurality of other sliders being moved in a direction opposite to movement of the particular slider along the single slider track, and
wherein each of the plurality of sliders have full range of motion along the single slider track.

9. The non-transitory machine readable medium of claim 8, wherein the application further comprises sets of instructions for:
receiving a user input to display a unified slider tool comprising the particular slider, the plurality of other sliders, and the single slider track; and
identifying initial positions of the particular slider and the plurality of other sliders on the single slider track, wherein the unified slider tool is displayed based on the initial positions of the sliders on the single slider track.

10. The non-transitory machine readable medium of claim 9, wherein the set of instructions for identifying the initial positions of the plurality of sliders comprises analyzing the properties of the image and determining values for each of the properties of the image represented by the plurality of sliders.

11. The non-transitory machine readable medium of claim 8, wherein the user input to adjust the position of the particular slider is a directional movement, wherein the application further comprises a set of instructions for converting the directional movement into a positional movement of the particular slider, wherein the set of instructions for identifying the adjusted position of the particular slider is performed based on the positional movement.

12. The non-transitory machine readable medium of claim 11, wherein the set of instructions for adjusting the image comprises a set of instructions for linearly modifying the first property of the image based on the directional movement.

13. The non-transitory machine readable medium of claim 12, wherein the application further comprises sets of instructions for:
detecting second directional movement of one of the plurality of other sliders in a second opposite direction along the single slider track, and
wherein the set of instructions for adjusting the image comprises a set of instructions for non-linearly modifying a second property of the image based on the second directional movement.

14. The non-transitory machine readable medium of claim 8, wherein the set of instructions for adjusting the image comprises a set of instructions for using a transform that specifies a mapping of a set of image values of the image to a set of adjusted image values based on the adjusted positions of the particular slider and the plurality of other sliders.

15. A non-transitory machine readable medium storing a media editing application which when executed by at least one processing unit performs tonal adjustments of an image displayed in an image display area of the media editing application using a slider track and a plurality of slider icons movably positioned along the slider track, said application comprising sets of instructions for:
displaying the slider track and a plurality of slider icons positioned along the slider track according to an exposed tonal range of the displayed image;
determining an unadvisable portion of the slider track that represents values for the tonal range that are beyond an advisable tonal range that may cause clipping;
detecting a movement of a slider icon along the identified unadvisable portion of the slider track; and
displaying a visual indication along the slider track that indicates that the slider icon is positioned outside of the advisable tonal range upon detecting the movement of the slider icon along the identified unadvisable portion of the slider track,
wherein initial positions of the slider icons on the slider track represent an initial visible tonal range of the displayed image.

16. The non-transitory machine readable medium of claim 15, wherein the advisable tonal range is a spectrum of image pixel values from a darkest pixel value to a lightest pixel value.

17. The non-transitory machine readable medium of claim 15, wherein the image displayed in the image display area appears distorted in response to the slider icon being moved along the identified unadvisable portion of the slider track, the application further comprising a set of instructions for clipping tonal values of the displayed image by assigning a same tonal value to multiple portions of the displayed image that had different tonal values prior to the clipping upon detecting the movement of the slider icon along the identified unadvisable portion of the slider track.

18. The non-transitory machine readable medium of claim 15, wherein the initial tonal range cannot be reduced by movement of any of the slider icons on the slider track.

19. The non-transitory machine readable medium of claim 15, wherein the initial visible tonal range of the image is a sub-range of the advisable tonal range which spans a greater range of image pixel values for the displayed image than the initial visible tonal range.

\* \* \* \* \*